US008893249B2

(12) United States Patent
Arai et al.

(10) Patent No.: US 8,893,249 B2
(45) Date of Patent: Nov. 18, 2014

(54) INTELLIGENT NETWORK STREAMING AND EXECUTION SYSTEM FOR CONVENTIONALLY CODED APPLICATIONS

(71) Applicant: Endeavors Technologies, Inc., Irvine, CA (US)

(72) Inventors: Daniel T. Arai, Sunnyvale, CA (US); Sameer Panwar, San Jose, CA (US); Manuel E. Benitez, Cupertino, CA (US); Anne M. Holler, Los Altos, CA (US); Lacky Shah, San Jose, CA (US)

(73) Assignee: Numecent Holdings, Inc., Irvine, CA (US)

( * ) Notice: Subject to any disclaimer, the term of this patent is extended or adjusted under 35 U.S.C. 154(b) by 0 days.

(21) Appl. No.: 13/685,484

(22) Filed: Nov. 26, 2012

(65) Prior Publication Data

US 2013/0179962 A1    Jul. 11, 2013

Related U.S. Application Data

(63) Continuation of application No. 11/453,301, filed on Jun. 13, 2006, now Pat. No. 8,438,298, which is a continuation of application No. 09/784,699, filed on Feb. 14, 2001, now Pat. No. 7,062,567.

(51) Int. Cl.
| | |
|---|---|
| G06F 21/34 | (2013.01) |
| H04L 29/08 | (2006.01) |
| G06F 21/10 | (2013.01) |
| G06F 9/445 | (2006.01) |
| H04L 29/06 | (2006.01) |

(52) U.S. Cl.
CPC ............ G06F 21/34 (2013.01); H04L 67/2852 (2013.01); H04L 67/16 (2013.01); H04L 67/34 (2013.01); G06F 2221/0784 (2013.01); H04L 67/2823 (2013.01); H04L 67/2847 (2013.01); G06F 21/10 (2013.01); G06F 8/65 (2013.01); *H04L 2463/101* (2013.01); *H04L 67/289* (2013.01); *H04L 63/10* (2013.01)
USPC ............................................................ 726/9

(58) Field of Classification Search
CPC ......... G06F 8/65; G06F 9/5083; G06F 21/34; H04L 29/08144
USPC ............................................... 709/231; 726/9
See application file for complete search history.

(56) References Cited

U.S. PATENT DOCUMENTS

| | | | |
|---|---|---|---|
| 4,562,306 A | 12/1985 | Chuo et al. | |
| 4,796,220 A | 1/1989 | Wolfe | |

(Continued)

FOREIGN PATENT DOCUMENTS

| | | |
|---|---|---|
| EP | 0813325 | 12/1997 |
| EP | 0658837 | 6/2000 |

(Continued)

OTHER PUBLICATIONS

U.S. Appl. No. 11/021,569, Office Action mailed Mar. 21, 2008.

(Continued)

*Primary Examiner* — Peter Shaw
(74) *Attorney, Agent, or Firm* — Sheppard, Mullin, Richter & Hampton LLP

(57) ABSTRACT

In a system that partitions an application program into page segments, a minimal portion of the application program is installed on a client system. The client prefetches page segments from the application server or the application server pushes additional page segments to the client. The application server begins streaming the requested page segments to the client when it receives a valid access token from the client. The client performs server load balancing across a plurality of application servers. If the client observes a non-response or slow response condition from an application server or license server, it switches to another application or license server.

19 Claims, 47 Drawing Sheets

(56) References Cited

U.S. PATENT DOCUMENTS

| | | | |
|---|---|---|---|
| 4,949,257 A | 8/1990 | Orbach | |
| 4,970,504 A | 11/1990 | Chen | |
| 4,999,806 A | 3/1991 | Chernow et al. | |
| 5,012,512 A | 4/1991 | Basso et al. | |
| 5,032,979 A | 7/1991 | Hecht et al. | |
| 5,047,928 A | 9/1991 | Wiedemer | |
| 5,063,500 A | 11/1991 | Shorter | |
| 5,109,413 A | 4/1992 | Comerford et al. | |
| 5,166,886 A | 11/1992 | Molnar et al. | |
| 5,210,850 A | 5/1993 | Kelly et al. | |
| 5,293,556 A | 3/1994 | Hill et al. | |
| 5,311,596 A | 5/1994 | Scott et al. | |
| 5,325,489 A | 6/1994 | Mitsuhira et al. | |
| 5,442,791 A | 8/1995 | Wrabetz et al. | |
| 5,481,611 A | 1/1996 | Owens et al. | |
| 5,495,411 A | 2/1996 | Ananda | |
| 5,533,123 A | 7/1996 | Force et al. | |
| 5,537,566 A | 7/1996 | Konno et al. | |
| 5,544,321 A | 8/1996 | Theimer et al. | |
| 5,546,526 A | 8/1996 | Li et al. | |
| 5,547,202 A | 8/1996 | Tsumura | |
| 5,548,645 A | 8/1996 | Ananda | |
| 5,553,139 A | 9/1996 | Ross et al. | |
| 5,553,143 A | 9/1996 | Ross et al. | |
| 5,555,376 A | 9/1996 | Theimer et al. | |
| 5,611,050 A | 3/1997 | Theimer et al. | |
| 5,629,980 A | 5/1997 | Stefik et al. | |
| 5,630,049 A | 5/1997 | Cardoza et al. | |
| 5,635,906 A | 6/1997 | Joseph | |
| 5,638,513 A | 6/1997 | Ananda | |
| 5,652,887 A | 7/1997 | Dewey et al. | |
| 5,666,293 A | 9/1997 | Metz et al. | |
| 5,696,965 A | 12/1997 | Dedrick | |
| 5,701,427 A | 12/1997 | Lathrop | |
| 5,706,440 A | 1/1998 | Compliment et al. | |
| 5,715,403 A | 2/1998 | Stefik | |
| 5,758,150 A | 5/1998 | Bell et al. | |
| 5,761,445 A | 6/1998 | Nguyen | |
| 5,764,906 A | 6/1998 | Edelstein et al. | |
| 5,764,918 A | 6/1998 | Poulter | |
| 5,765,152 A | 6/1998 | Erickson | |
| 5,765,153 A | 6/1998 | Benantar et al. | |
| 5,768,528 A | 6/1998 | Stumm | |
| 5,768,539 A | 6/1998 | Metz et al. | |
| 5,771,354 A | 6/1998 | Crawford | |
| 5,778,395 A | 7/1998 | Whiting et al. | |
| 5,790,753 A | 8/1998 | Krishnamoorthy et al. | |
| 5,805,809 A | 9/1998 | Singh et al. | |
| 5,809,144 A | 9/1998 | Sirbu et al. | |
| 5,812,865 A | 9/1998 | Theimer et al. | |
| 5,812,881 A | 9/1998 | Ku et al. | |
| 5,818,711 A | 10/1998 | Schwabe et al. | |
| 5,822,537 A | 10/1998 | Katseff et al. | |
| 5,832,289 A | 11/1998 | Shaw et al. | |
| 5,835,722 A | 11/1998 | Bradshaw et al. | |
| 5,838,910 A | 11/1998 | Domenikos et al. | |
| 5,839,910 A | 11/1998 | Meller et al. | |
| 5,855,020 A | 12/1998 | Kirsch | |
| 5,874,986 A | 2/1999 | Gibbon et al. | |
| 5,878,425 A | 3/1999 | Redpath | |
| 5,881,229 A | 3/1999 | Singh et al. | |
| 5,881,232 A | 3/1999 | Cheng et al. | |
| 5,892,915 A | 4/1999 | Duso et al. | |
| 5,892,953 A | 4/1999 | Bhagria et al. | |
| 5,895,454 A | 4/1999 | Harrington | |
| 5,895,471 A | 4/1999 | King et al. | |
| 5,901,315 A | 5/1999 | Edwards et al. | |
| 5,903,721 A | 5/1999 | Sixtus | |
| 5,903,732 A | 5/1999 | Reed et al. | |
| 5,903,892 A | 5/1999 | Hoffert et al. | |
| 5,905,868 A | 5/1999 | Baghai et al. | |
| 5,905,990 A | 5/1999 | Inglett | |
| 5,909,545 A | 6/1999 | Frese et al. | |
| 5,911,043 A | 6/1999 | Duffy et al. | |
| 5,918,015 A | 6/1999 | Suzuki et al. | |
| 5,923,885 A | 7/1999 | Johnson | |
| 5,925,126 A | 7/1999 | Hsieh et al. | |
| 5,926,552 A | 7/1999 | McKeon et al. | |
| 5,929,849 A | 7/1999 | Kikinis | |
| 5,931,907 A | 8/1999 | Davies et al. | |
| 5,933,603 A | 8/1999 | Vahalia et al. | |
| 5,933,822 A | 8/1999 | Braden-Harder et al. | |
| 5,940,591 A | 8/1999 | Boyle et al. | |
| 5,943,424 A | 8/1999 | Berger et al. | |
| 5,948,062 A | 9/1999 | Tzelnic et al. | |
| 5,948,065 A | 9/1999 | Eilert et al. | |
| 5,949,877 A | 9/1999 | Traw et al. | |
| 5,950,195 A | 9/1999 | Stockwell et al. | |
| 5,953,506 A | 9/1999 | Kalra et al. | |
| 5,956,717 A | 9/1999 | Kraay et al. | |
| 5,960,411 A | 9/1999 | Hartman et al. | |
| 5,960,439 A | 9/1999 | Hamner et al. | |
| 5,961,586 A | 10/1999 | Pedersen | |
| 5,961,591 A | 10/1999 | Jones et al. | |
| 5,963,444 A | 10/1999 | Shidara et al. | |
| 5,963,944 A | 10/1999 | Adams | |
| 5,968,176 A | 10/1999 | Nessett et al. | |
| 5,973,696 A | 10/1999 | Agranat et al. | |
| 5,987,454 A | 11/1999 | Hobbs | |
| 5,987,608 A | 11/1999 | Roskind | |
| 6,003,065 A | 12/1999 | Yan et al. | |
| 6,003,095 A | 12/1999 | Pekowski et al. | |
| 6,014,686 A | 1/2000 | Elnozahy et al. | |
| 6,018,619 A | 1/2000 | Allard et al. | |
| 6,026,166 A | 2/2000 | LeBourgeois | |
| 6,028,925 A | 2/2000 | Van Berkum et al. | |
| 6,038,379 A | 3/2000 | Fletcher et al. | |
| 6,038,610 A | 3/2000 | Belfiore et al. | |
| 6,047,323 A | 4/2000 | Krause | |
| 6,049,792 A | 4/2000 | Hart et al. | |
| 6,049,835 A | 4/2000 | Gagnon | |
| 6,061,738 A | 5/2000 | Osaku et al. | |
| 6,065,043 A | 5/2000 | Domenikos et al. | |
| 6,076,104 A | 6/2000 | McCue | |
| 6,081,842 A | 6/2000 | Shachar et al. | |
| 6,085,186 A | 7/2000 | Christianson et al. | |
| 6,085,193 A | 7/2000 | Malkin et al. | |
| 6,088,705 A | 7/2000 | Lightstone | |
| 6,092,194 A | 7/2000 | Touboul | |
| 6,094,649 A | 7/2000 | Bowen et al. | |
| 6,098,072 A | 8/2000 | Sluiman et al. | |
| 6,099,408 A | 8/2000 | Schneier et al. | |
| 6,101,482 A | 8/2000 | DiAngelo et al. | |
| 6,101,491 A | 8/2000 | Woods | |
| 6,101,537 A | 8/2000 | Edelstein et al. | |
| 6,108,420 A | 8/2000 | Larose et al. | |
| 6,115,741 A | 9/2000 | Domenikos et al. | |
| 6,138,271 A | 10/2000 | Keeley | |
| 6,154,878 A | 11/2000 | Saboff | |
| 6,157,948 A | 12/2000 | Inoue et al. | |
| 6,167,510 A | 12/2000 | Tran | |
| 6,167,522 A | 12/2000 | Lee et al. | |
| 6,173,311 B1 | 1/2001 | Hassett et al. | |
| 6,173,330 B1 | 1/2001 | Guo et al. | |
| 6,185,608 B1 | 2/2001 | Hon et al. | |
| 6,192,398 B1 | 2/2001 | Hunt | |
| 6,192,408 B1 | 2/2001 | Vahalia et al. | |
| 6,195,694 B1 | 2/2001 | Chen et al. | |
| 6,212,640 B1 | 4/2001 | Abdelnur et al. | |
| 6,219,693 B1 | 4/2001 | Napolitano et al. | |
| 6,226,412 B1 | 5/2001 | Schwab | |
| 6,226,665 B1 | 5/2001 | Deo et al. | |
| 6,253,234 B1 | 6/2001 | Hunt et al. | |
| 6,275,470 B1 | 8/2001 | Ricciulli | |
| 6,275,496 B1 | 8/2001 | Burns et al. | |
| 6,278,992 B1 | 8/2001 | Curtis et al. | |
| 6,281,898 B1 | 8/2001 | Nikolovska et al. | |
| 6,282,712 B1 | 8/2001 | Davis et al. | |
| 6,298,356 B1 | 10/2001 | Jawahar et al. | |
| 6,301,584 B1 | 10/2001 | Ranger | |
| 6,301,605 B1 | 10/2001 | Napolitano et al. | |
| 6,301,629 B1 | 10/2001 | Sastri et al. | |
| 6,301,685 B1 | 10/2001 | Shigeta | |
| 6,311,221 B1 | 10/2001 | Raz et al. | |

(56) References Cited

U.S. PATENT DOCUMENTS

| | | |
|---|---|---|
| 6,314,425 B1 | 11/2001 | Serbinis et al. |
| 6,321,260 B1 | 11/2001 | Takeuchi et al. |
| 6,330,561 B1 | 12/2001 | Cohen et al. |
| 6,343,287 B1 | 1/2002 | Kumar et al. |
| 6,347,398 B1 | 2/2002 | Parthasarathy et al. |
| 6,356,946 B1 | 3/2002 | Clegg et al. |
| 6,369,467 B1 | 4/2002 | Noro |
| 6,370,686 B1 | 4/2002 | Delo et al. |
| 6,374,402 B1 | 4/2002 | Schmeidler et al. |
| 6,385,696 B1 | 5/2002 | Doweck et al. |
| 6,418,554 B1 | 7/2002 | Delo et al. |
| 6,418,555 B2 | 7/2002 | Mohammed |
| 6,418,556 B1 | 7/2002 | Bennington et al. |
| 6,424,991 B1 | 7/2002 | Gish |
| 6,425,017 B1 | 7/2002 | Dievendorff et al. |
| 6,449,688 B1 | 9/2002 | Peters et al. |
| 6,453,334 B1 | 9/2002 | Vinson et al. |
| 6,457,076 B1 | 9/2002 | Cheng et al. |
| 6,508,709 B1 | 1/2003 | Karmarkar |
| 6,510,458 B1 | 1/2003 | Berstis et al. |
| 6,510,462 B2 | 1/2003 | Blumenau |
| 6,510,466 B1 | 1/2003 | Cox et al. |
| 6,524,017 B2 | 2/2003 | Lecocq et al. |
| 6,574,618 B2 | 6/2003 | Eylon et al. |
| 6,584,507 B1 | 6/2003 | Bradley et al. |
| 6,587,857 B1 | 7/2003 | Carothers et al. |
| 6,594,682 B2 | 7/2003 | Peterson et al. |
| 6,598,125 B2 | 7/2003 | Romm |
| 6,601,103 B1 | 7/2003 | Goldschmidt Iki et al. |
| 6,601,110 B2 | 7/2003 | Marsland |
| 6,605,956 B2 | 8/2003 | Farnworth et al. |
| 6,609,114 B1 | 8/2003 | Gressel et al. |
| 6,611,812 B2 | 8/2003 | Hurtado et al. |
| 6,622,137 B1 | 9/2003 | Ravid et al. |
| 6,622,171 B2 | 9/2003 | Gupta et al. |
| 6,636,961 B1 | 10/2003 | Braun et al. |
| 6,651,251 B1 | 11/2003 | Shoff et al. |
| 6,658,473 B1 * | 12/2003 | Block et al. .................. 709/226 |
| 6,687,745 B1 | 2/2004 | Franco et al. |
| 6,694,510 B1 | 2/2004 | Willems |
| 6,697,869 B1 | 2/2004 | Mallart et al. |
| 6,711,619 B1 | 3/2004 | Chandramohan et al. |
| 6,732,179 B1 | 5/2004 | Brown et al. |
| 6,735,631 B1 | 5/2004 | Oehrke et al. |
| 6,757,708 B1 | 6/2004 | Craig et al. |
| 6,757,894 B2 | 6/2004 | Eylon et al. |
| 6,763,370 B1 | 7/2004 | Schmeidler et al. |
| 6,772,209 B1 | 8/2004 | Chernock et al. |
| 6,775,779 B1 | 8/2004 | England et al. |
| 6,779,179 B1 | 8/2004 | Romm et al. |
| 6,785,768 B2 | 8/2004 | Peters et al. |
| 6,785,865 B1 | 8/2004 | Cote et al. |
| 6,801,507 B1 | 10/2004 | Humpleman et al. |
| 6,810,525 B1 | 10/2004 | Safadi et al. |
| 6,816,909 B1 | 11/2004 | Chang et al. |
| 6,816,950 B2 | 11/2004 | Nichols |
| 6,832,222 B1 | 12/2004 | Zimowski |
| 6,836,794 B1 | 12/2004 | Lucowsky et al. |
| 6,854,009 B1 | 2/2005 | Hughes |
| 6,891,740 B2 | 5/2005 | Williams |
| 6,918,113 B2 | 7/2005 | Patel et al. |
| 6,925,495 B2 | 8/2005 | Hedge et al. |
| 6,938,096 B1 | 8/2005 | Greschler et al. |
| 6,959,320 B2 | 10/2005 | Shah et al. |
| 6,970,866 B1 | 11/2005 | Pravetz et al. |
| 6,985,915 B2 | 1/2006 | Somalwar et al. |
| 7,024,677 B1 | 4/2006 | Snyder et al. |
| 7,028,305 B2 | 4/2006 | Schaefer et al. |
| 7,043,524 B2 | 5/2006 | Shah et al. |
| 7,051,315 B2 | 5/2006 | Artzi et al. |
| 7,062,567 B2 | 6/2006 | Benitez et al. |
| 7,093,077 B2 | 8/2006 | Cooksey et al. |
| 7,096,253 B2 | 8/2006 | Vinson et al. |
| 7,112,138 B2 | 9/2006 | Hendrick et al. |
| 7,130,616 B2 | 10/2006 | Janik |
| 7,137,072 B2 | 11/2006 | Bauer et al. |
| 7,171,390 B1 | 1/2007 | Song et al. |
| 7,191,441 B2 | 3/2007 | Abbott et al. |
| 7,192,352 B2 | 3/2007 | Walker et al. |
| 7,197,516 B1 | 3/2007 | Hipp et al. |
| 7,246,119 B2 | 7/2007 | Kuwata et al. |
| 7,451,196 B1 | 11/2008 | DeVries et al. |
| 2001/0003828 A1 | 6/2001 | Peterson et al. |
| 2001/0014878 A1 | 8/2001 | Mitra et al. |
| 2001/0027493 A1 | 10/2001 | Wallace |
| 2001/0034736 A1 * | 10/2001 | Eylon et al. .................. 707/200 |
| 2001/0037399 A1 * | 11/2001 | Eylon et al. .................. 709/231 |
| 2001/0037400 A1 | 11/2001 | Raz et al. |
| 2001/0042833 A1 | 11/2001 | Kenway |
| 2001/0044850 A1 | 11/2001 | Raz et al. |
| 2001/0044851 A1 | 11/2001 | Rothman et al. |
| 2002/0015106 A1 | 2/2002 | Taylor, Jr. |
| 2002/0019864 A1 | 2/2002 | Mayer |
| 2002/0035674 A1 | 3/2002 | Vetrivelkumaran et al. |
| 2002/0038374 A1 | 3/2002 | Gupta et al. |
| 2002/0042833 A1 | 4/2002 | Hendler et al. |
| 2002/0057893 A1 | 5/2002 | Wood et al. |
| 2002/0059402 A1 | 5/2002 | Belanger |
| 2002/0065848 A1 | 5/2002 | Walker et al. |
| 2002/0078170 A1 | 6/2002 | Brewer et al. |
| 2002/0078203 A1 | 6/2002 | Greschler et al. |
| 2002/0083183 A1 | 6/2002 | Pujare et al. |
| 2002/0083187 A1 | 6/2002 | Sim et al. |
| 2002/0087717 A1 | 7/2002 | Artzi et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0091901 A1 | 7/2002 | Romm |
| 2002/0116476 A1 | 8/2002 | Eyal et al. |
| 2002/0133491 A1 | 9/2002 | Sim et al. |
| 2002/0138640 A1 | 9/2002 | Raz et al. |
| 2002/0147849 A1 | 10/2002 | Wong et al. |
| 2002/0156911 A1 | 10/2002 | Croman et al. |
| 2002/0157089 A1 | 10/2002 | Patel et al. |
| 2002/0161908 A1 | 10/2002 | Benitez et al. |
| 2002/0174215 A1 | 11/2002 | Schaefer |
| 2003/0004882 A1 | 1/2003 | Holler et al. |
| 2003/0009538 A1 | 1/2003 | Shah et al. |
| 2003/0056112 A1 | 3/2003 | Vinson et al. |
| 2003/0105816 A1 | 6/2003 | Goswami |
| 2003/0138024 A1 | 7/2003 | Williamson et al. |
| 2003/0140160 A1 | 7/2003 | Raz et al. |
| 2004/0036722 A1 | 2/2004 | Warren |
| 2004/0128342 A1 | 7/2004 | Maes et al. |
| 2004/0133657 A1 | 7/2004 | Smith et al. |
| 2004/0199566 A1 | 10/2004 | Carlson et al. |
| 2004/0230784 A1 | 11/2004 | Cohen |
| 2004/0230971 A1 | 11/2004 | Rachman et al. |
| 2004/0267813 A1 | 12/2004 | Rivers-Moore et al. |
| 2004/0268361 A1 | 12/2004 | Schaefer |
| 2005/0010607 A1 | 1/2005 | Parker et al. |
| 2005/0010670 A1 | 1/2005 | Greschler et al. |
| 2005/0091534 A1 | 4/2005 | Nave et al. |
| 2005/0114472 A1 | 5/2005 | Tan |
| 2005/0193139 A1 | 9/2005 | Vinson et al. |
| 2005/0289617 A1 | 12/2005 | Safadi et al. |
| 2006/0010074 A1 | 1/2006 | Zeitsiff et al. |
| 2006/0031165 A1 | 2/2006 | Nave et al. |
| 2006/0047716 A1 | 3/2006 | Keith, Jr. |
| 2006/0048136 A1 | 3/2006 | DeVries et al. |
| 2006/0106770 A1 | 5/2006 | DeVries et al. |
| 2006/0123185 A1 | 6/2006 | DeVries et al. |
| 2006/0136389 A1 | 6/2006 | Cover et al. |
| 2006/0168294 A1 | 7/2006 | DeVries et al. |
| 2006/0218165 A1 | 9/2006 | DeVries et al. |
| 2006/0230175 A1 | 10/2006 | DeVries et al. |
| 2007/0038642 A1 | 2/2007 | Durgin et al. |
| 2007/0043550 A1 | 2/2007 | Tzruya |
| 2007/0067435 A1 | 3/2007 | Landis et al. |
| 2007/0074223 A1 | 3/2007 | Lescouet et al. |
| 2007/0126749 A1 | 6/2007 | Tzruya et al. |
| 2007/0129146 A1 | 6/2007 | Tzruya et al. |
| 2007/0129990 A1 | 6/2007 | Tzruya et al. |
| 2007/0130075 A1 | 6/2007 | Song et al. |

(56) References Cited

U.S. PATENT DOCUMENTS

| | | | |
|---|---|---|---|
| 2007/0130292 | A1 | 6/2007 | Tzruya et al. |
| 2007/0168309 | A1 | 7/2007 | Tzruya et al. |
| 2007/0196074 | A1 | 8/2007 | Jennings et al. |

FOREIGN PATENT DOCUMENTS

| | | |
|---|---|---|
| EP | 1020824 | 7/2000 |
| EP | 1143349 | 10/2001 |
| TW | 200644550 | 12/2006 |
| WO | 9840993 | 9/1998 |
| WO | 9850853 | 11/1998 |
| WO | 9957863 | 11/1999 |
| WO | 9960458 | 11/1999 |
| WO | 0004681 | 1/2000 |
| WO | 0031657 | 6/2000 |
| WO | 0031672 | 6/2000 |
| WO | 0056028 | 9/2000 |
| WO | 0127805 | 4/2001 |
| WO | 0146856 | 6/2001 |
| WO | 0244840 | 6/2002 |
| WO | 2006022745 | 3/2006 |
| WO | 2006047133 | 5/2006 |
| WO | 2006055445 | 5/2006 |
| WO | 2006102532 | 9/2006 |
| WO | 2006102621 | 9/2006 |

OTHER PUBLICATIONS

U.S. Appl. No. 11/021,569, Office Action mailed Oct. 28, 2008.
U.S. Appl. No. 11/100,956, Notice of Allowance mailed Apr. 10, 2009.
U.S. Appl. No. 11/100,956, Office Action mailed Apr. 7, 2008.
U.S. Appl. No. 11/100,956, Office Action mailed Sep. 26, 2007.
U.S. Appl. No. 11/273,862, Office Action mailed Jun. 8, 2009.
U.S. Appl. No. 11/273,862, Office Action mailed Feb. 25, 2010.
U.S. Appl. No. 11/274,442, Office Action mailed Dec. 10, 2008.
U.S. Appl. No. 11/371,627, Office Action mailed Feb. 20, 2008.
U.S. Appl. No. 11/388,381, Office Action mailed Dec. 9, 2008.
U.S. Appl. No. 11/388,381, Office Action mailed Mar. 29, 2010.
U.S. Appl. No. 11/453,301, Office Action mailed Apr. 1, 2011.
U.S. Appl. No. 11/453,301, Office Action mailed Aug. 6, 2009.
U.S. Appl. No. 11/453,301, Office Action mailed Apr. 7, 2010.
U.S. Appl. No. 11/453,301, Office Action mailed Sep. 22, 2010.
U.S. Appl. No. 11/453,301, Office Action mailed Sep. 28, 2011.
Bailey, Peter et al., "Chart of Darkness: Mapping a Large Intranet," Dept. of Computer Science, FEIT, The Australian National University, Canberra ACT 0200, Australia, pp. 1-23, http://research.microsoft.com/en-us/um/people/nickcr/pubs/bailey_tr00.pdf, Nov. 11, 1999.
Boneh et al., "An Attack on RSA Given a Small Fraction of the Private Key Bits," Advances in Cryptology—Asiacrypt '98, Lecture Notes in Computer Science, 25-34, V. 1514, http://crypto.stanford.edu/~dabo/abstracts/bits_of_d.html.
Brin, Sergey et al., "The Anatomy of a Large-Scale Hypertextual Web Search Engine", Computer Science Department, Stanford University, Stanford, CA 94305, USA, Proceedings of the Seventh International World Wide Web Conference, Published by Elsevier B.V., vol. 30, Issues 1-7, pp. 107-117, Apr. 1998.
Chu et al., "REFEREE: Trust Management for Web Applications," Proceedings of the Sixth International World Wide Web Conference, 1997, retrieved online on Jun. 15, 2006 at http://www.si.umich.edu/~presnick/papers/Referee/www6-referee.html.
Faupel, "Status of Industry Work on Signed Mobile Code," Joint European Networking Conference (JENC), May 1997, 313-1-313-8.
Fiedler et al., "UNIX System V. Release 4 Administration," Second Edition, 1991, 1-13, 37-116, 152-153, 175-200, 291-312, Hayden Books, Carmel, Indiana, USA.
George, Binto et al., "Secure Transaction Processing in Firm Real-Time Database Systems," SIGMOD International Conference on Management of Data 1997, 462-473, V26, Issue 2, Association of Computing Machinery (ACM) Press, Tucson, Arizona, United States, May 13, 1997.
Gralla, Preston, Chapter 44, "Shopping on the Internet" How the Internet Works, IEEE Personal Communications, Aug. 1999, 260-67, QUE-A division of Macmillon Computer Publishing, Millenium Edition.
Microsoft Corp., "Computer Dictionary," 3rd edition, 1997, pp. 119 & 305, Microsoft Press.
Microsoft Corp., "Understanding Universal Plug and Play", pp. 1-39, (Feb. 2000).
Morrow, Brian et al., "Indexing Within—The Lost Gold Within the Enterprise" Endeavors Technology, Aug. 22, 2000, pp. 1-6.
Mullender et al., "Amoeba:A Distributed Operating System for the 1990's," Computer Magazine, May 1990, 44-53, 23(5).
Nakayoshi et al., "A Secure Private File System with Minimal System Administration," Communications, Computers and Signal Processing, 1997 IEEE Pacific Rim Conference, 251-255, vol. 1.
O'Mahony, Donal, "Security Considerations in a Network Management Environment," 1994, 12-17, vol. 8, IEEE, USA.
Pyarali et al., "Design and Performance of an Object-Oriented Framework for High-Speed Electronic Medical Imaging," Fall 1996, Computing Systems Journal, 331-375, vol. 9, http://www.cs.wustl.edu/~schmidt/PDF/COOTS-96.pdf.
Rappaport, Avi, "Roberts & Spiders & Crawlers: How Web and Intranet Search Engines Follow Links to Build Indexes," Infoseek Software, pp. 1-38 (Oct. 1999).
Reinhardt, Robert B., "An Architectural Overview of UNIX Network Security," ARINC Research Corporation, Sep. 19, 1992, retrieved online on Jun. 15, 2006 at http://www.clusit.it/whitepapers/unixnet.pdf.
Sirbu, Marvin et al., "Netbill: An Internet Commerce System Optimized for Network-Delivered Services," IEEE Personal Communications, 2(4):34-39 (Aug. 1995).
Tardo & Valente, "Mobile Agent Security and Telescript," 4th International Conference of the IEEE Computer Society (IEEE CompCon1996), Feb. 1996.
International Application No. PCT/US2004/028195, Search Report and Written Opinion mailed May 2, 2006.
International Application No. PCT/US2005/041024, Search Report and Written Opinion mailed Feb. 27, 2007.
International Application No. PCT/US2006/010637, Search Report and Written Opinion mailed Sep. 25, 2007.
International Application No. PCT/US2006/010904, Search Report and Written Opinion mailed Dec. 26, 2007.
U.S. Appl. No. 09/098,075, filed Jun. 16, 1998.
U.S. Appl. No. 09/784,699, filed Feb. 14, 2001.
U.S. Appl. No. 09/826,607, filed Apr. 5, 2001.
U.S. Appl. No. 09/827,030, filed Apr. 5, 2001.
U.S. Appl. No. 09/847,813, filed May 1, 2001.
U.S. Appl. No. 09/858,260, filed May 15, 2001.
U.S. Appl. No. 09/996,180, filed Nov. 27, 2001.
U.S. Appl. No. 10/005,729, filed Nov. 6, 2001.
U.S. Appl. No. 10/010,147, filed Nov. 6, 2001.
U.S. Appl. No. 10/023,915, filed Dec. 14, 2001.
U.S. Appl. No. 10/228,680, filed Aug. 26, 2002.
U.S. Appl. No. 10/926,635, filed Aug. 25, 2004.
U.S. Appl. No. 10/988,014, filed Nov. 12, 2004.
U.S. Appl. No. 11/021,569, filed Dec. 22, 2004.
U.S. Appl. No. 11/100,956, filed Apr. 6, 2005.
U.S. Appl. No. 11/273,862, filed Nov. 14, 2005.
U.S. Appl. No. 11/274,442, filed Nov. 14, 2005.
U.S. Appl. No. 11/371,627, filed Mar. 8, 2006.
U.S. Appl. No. 11/388,381, filed Mar. 23, 2006.
U.S. Appl. No. 11/453,301, filed Jun. 13, 2006.
U.S. Appl. No. 12/062,766, filed Apr. 8, 2008.
U.S. Appl. No. 12/062,789, filed Apr. 8, 2008.
U.S. Appl. No. 12/509,210, filed Jul. 24, 2009.
U.S. Appl. No. 09/098,075, Notice of Allowance mailed Feb. 19, 2002.
U.S. Appl. No. 09/098,075, Office Action mailed Nov. 14, 2000.
U.S. Appl. No. 09/098,075, Office Action mailed Mar. 16, 2000.
U.S. Appl. No. 09/098,075, Office Action mailed May 22, 2001.

(56) References Cited

OTHER PUBLICATIONS

U.S. Appl. No. 09/098,075, Office Action mailed Aug. 30, 2000.
U.S. Appl. No. 09/784,699, Notice of Allowance mailed Dec. 23, 2005.
U.S. Appl. No. 09/784,699, Office Action mailed Oct. 3, 2005.
U.S. Appl. No. 09/784,699, Office Action mailed Mar. 7, 2005.
U.S. Appl. No. 09/784,699, Office Action mailed Jun. 16, 2004.
U.S. Appl. No. 09/826,607, Advisory Action mailed Oct. 23, 2006.
U.S. Appl. No. 09/826,607, Office Action mailed Oct. 6, 2004.
U.S. Appl. No. 09/826,607, Office Action mailed Jun. 19, 2006.
U.S. Appl. No. 09/826,607, Office Action mailed Nov. 20, 2005.
U.S. Appl. No. 09/826,607, Office Action mailed May 24, 2005.
U.S. Appl. No. 09/827,030, Notice of Allowance mailed Jan. 26, 2005.
U.S. Appl. No. 09/827,030, Office Action mailed Jun. 18, 2004.
U.S. Appl. No. 09/847,813, Office Action mailed Jul. 3, 2007.
U.S. Appl. No. 09/847,813, Office Action mailed Dec. 7, 2006.
U.S. Appl. No. 09/847,813, Office Action mailed Jan. 8, 2008.
U.S. Appl. No. 09/847,813, Office Action mailed Jul. 13, 2006.
U.S. Appl. No. 09/847,813, Office Action mailed Feb. 15, 2005.
U.S. Appl. No. 09/847,813, Office Action mailed Feb. 16, 2006.
U.S. Appl. No. 09/847,813, Office Action mailed Mar. 16, 2007.
U.S. Appl. No. 09/847,813, Office Action mailed Sep. 20, 2005.
U.S. Appl. No. 09/858,260, Notice of Allowance mailed May 10, 2005.
U.S. Appl. No. 09/858,260, Office Action mailed Sep. 7, 2004.
U.S. Appl. No. 09/996,180, Office Action mailed Feb. 24, 2005.
U.S. Appl. No. 10/005,729, Advisory Action mailed May 8, 2007.
U.S. Appl. No. 10/005,729, Office Action mailed Dec. 1, 2006.
U.S. Appl. No. 10/005,729, Office Action mailed Mar. 3, 2009.
U.S. Appl. No. 10/005,729, Office Action mailed Jun. 7, 2005.
U.S. Appl. No. 10/005,729, Office Action mailed Dec. 14, 2004.
U.S. Appl. No. 10/005,729, Office Action mailed Nov. 17, 2005.
U.S. Appl. No. 10/005,729, Office Action mailed Jan. 25, 2010.
U.S. Appl. No. 10/010,147, Notice of Allowance mailed Oct. 28, 2005.
U.S. Appl. No. 10/010,147, Office Action mailed Feb. 9, 2005.
U.S. Appl. No. 10/023,915 Notice of Allowance mailed Jul. 7, 2008.
U.S. Appl. No. 10/023,915, Advisory Action mailed May 30, 2008.
U.S. Appl. No. 10/023,915, Office Action mailed Jan. 3, 2007.
U.S. Appl. No. 10/023,915, Office Action mailed Apr. 5, 2006.
U.S. Appl. No. 10/023,915, Office Action mailed Jan. 8, 2008.
U.S. Appl. No. 10/023,915, Office Action mailed Jun. 29, 2005.
U.S. Appl. No. 10/228,680, Notice of Allowance mailed Aug. 19, 2005.
U.S. Appl. No. 10/228,680, Office Action mailed Feb. 10, 2005.
U.S. Appl. No. 10/228,680, Office Action mailed Apr. 28, 2005.
U.S. Appl. No. 10/926,635, Office Action mailed Dec. 12, 2007.
U.S. Appl. No. 10/926,635, Office Action mailed Jun. 21, 2007.
U.S. Appl. No. 10/988,014, Notice of Allowance mailed Mar. 21, 2007.
U.S. Appl. No. 10/988,014, Office Action mailed Oct. 16, 2006.
U.S. Appl. No. 11/021,569, Office Action mailed Sep. 18, 2007.

* cited by examiner

FIG. 31A

3101 Header

| 0 | 4 | 8 | 12 | 16 bytes |
|---|---|---|---|---|
| A/B Version | AppID (GUID) | | | |
| AppID cont. | Version No | Client OS bitmap | Client OS ServicePack | |
| Header Byte Size | Number Sections | Section 1 Type (Files) | Section 1 Byte Offset | Section 1 Byte Size |
| Section 2 (Registry) | Section 2 Byte Offset | Section 2 Byte Size | Section 3 (Prefetch) | |
| Section 3 Byte Offset | Section 3 Byte Size | Section 4 (Profile) | Section 4 Byte Offset | |
| Section 4 Byte Size | Section 5 (Comments) | Section 5 Byte Offset | Section 5 Byte Size | |
| Section 6 (Code) | Section 6 Byte Offset | Section 6 Byte Size | App Name Length | Application Name (x bytes) |

FIG. 31B

Section 1 Offset

3102 File

| 0 | 4 | 8 | x bytes |
|---|---|---|---|
| Flags | NumChildren | Directory Name Length | Directory Name (x bytes) |
| Flags | File version | File Name Length | Data Length | File Name (x bytes) |
| File Name (x bytes) cont. | Data Content (x bytes) | | |

FIG. 31C

Section 2 Offset

3103 Add/Remove Reg

| 0 | 4 | 8 | x bytes |
|---|---|---|---|
| Exist File | | | |
| Key Flag | Number Children | Value Type | Key Name Length | Key Name (x bytes) | Value Data (x bytes) |
| Key Flag | Value Type | Value Name Length | Value Name (x bytes) | Value Data (x bytes) |

Concurrent Requesting – Proxy First

Concurrent Requesting - Peer Catching First

INTELLIGENT NETWORK STREAMING AND EXECUTION SYSTEM FOR CONVENTIONALLY CODED APPLICATIONS

CROSS-REFERENCE TO RELATED APPLICATIONS

This application is a continuation of U.S. patent application Ser. No. 11/453,301, filed Jun. 13, 2006 and entitled "Intelligent Network Streaming and Execution System for Conventionally Coded Applications," which is a continuation of U.S. patent application Ser. No. 09/784,699, filed Feb. 14, 2001 and entitled "Intelligent Network Streaming and Execution System for Conventionally Coded Applications," now U.S. Pat. No. 7,062,567, which are incorporated herein by reference.

BACKGROUND OF THE INVENTION

1. Technical Field

The invention relates to the streaming of computer program object code across a network in a computer environment. More particularly, the invention relates to streaming and execution of existing applications across a network of servers streaming computer program object code and other related data to clients in a computer environment.

2. Description of the Prior Art

Retail sales models of computer application programs are fairly straight forward. The consumer either purchases the application program from a retailer that is either a brick and mortar or an ecommerce entity. The product is delivered to the consumer in a shrink-wrap form.

The consumer installs the program from a floppy disk or a CD-ROM included in the packaging. A serial number is generally provided that must be entered at installation or the first time the program is run. Other approaches require that the CD-ROM be present whenever the program is run. However, CD-ROMs are easily copied using common CDR technology.

Another approach is for the consumer to effectuate the purchase through an ecommerce entity. The application program is downloaded in its entirety to the consumer across the Internet. The consumer is emailed a serial number that is required to run the program. The consumer enters the serial number at the time the program is installed or the first time the program is run.

Once the application program is installed on a machine, it resides on the machine, occupying precious hard disk space, until it is physically removed. The installer portion of the program can also be installed on a server along with the installation files. Users within an intranet can install the program from the server, across the network, onto their machines. The program is a full installation of the program and resides on the user's machine until it is manually removed.

Trial versions of programs are also available online that are a partial or full installation of the application program. The program executes normally for a preset time period. At the end of the time period, the consumer is told that he must purchase the program and execution is terminated. The drawback to this approach is that there is an easy way for the consumer to fool the program. The consumer simply uninstalls the program and then reinstalls it, thereby restarting the time period.

Additionally, piracy problems arise once the application program is resident on the consumer's computer. Serial numbers for programs are easily obtained across the Internet. Software companies lose billions of dollars a year in revenue because of this type of piracy.

The above approaches fail to adequately protect software companies' revenue stream. These approaches also require the consumer to install a program that resides indefinitely on the consumer's hard disk, occupying valuable space even though the consumer may use the program infrequently.

The enterprise arena allows Application Service Providers (ASP) to provide browser-based implementations such as Tarantella offered by Santa Cruz Operation, Inc. in Santa Cruz, Calif. and Metaframe offered by Citrix Systems Inc. of Fort Lauderdale, Fla. A remote application portal site allows the user to click on an application in his browser to execute the application. The application runs on the portal site and GUI interfaces such as display, keystrokes and mouse clicks are transferred over the wire. The access to the program is password protected. This approach allows the provider to create an audit trail and to track the use of an application program.

AppStream Inc. of Palo Alto, Calif. uses Java code streamlets to provide streaming applications to the user. The system partitions a Web application program into Java streamlets. Java streamlets are then streamed to the user's computer on an as-needed basis. The application runs on the user's computer, but is accessed through the user's network browser.

The drawback to the browser-based approaches is that the user is forced to work within his network browser, thereby adding another layer of complexity. The browser or Java program manages the application program's run-time environment. The user loses the experience that the software manufacturer had originally intended for its product including features such as application invocation based on file extension associations.

It would be advantageous to provide an intelligent network streaming and execution system for conventionally coded applications that allows portions of application programs to be reliably streamed from a server to a client while the application program is concurrently running on the client using the client's own file system. It would further be advantageous to provide an intelligent network streaming and execution system for conventionally coded applications that allows the streaming process to continue through server failures.

SUMMARY OF THE INVENTION

The invention provides an intelligent network streaming and execution system for conventionally coded applications. The system allows for segments of an application program to be streamed in a reliable, fault tolerant manner, from a server to a client while the application program is concurrently running on the client using the clients own file system. In addition, the invention provides a system that does not require that the application program be recompiled or recoded to be streamed.

The invention provides a system that partitions an application program into page segments by observing the manner in which the application program is conventionally installed. A minimal portion of the application program is installed on a client system. The user launches the application program in the same ways that applications on other client file systems are started. From the point of view of the client's operating system and from the point of view of the application itself, that application is located locally on the client.

An application program server streams the page segments to the client as the application program executes on the client. The client stores the page segments in a cache. Page segments are requested by the client from the application server whenever a page fault occurs from the cache on behalf of the application program.

The client prefetches page segments from the application server or the application server pushes additional page segments to the client based on the pattern of page segment requests for that particular application program.

The user subscribes and unsubscribes to application programs through a subscription server. Whenever the user accesses an application program, a securely encrypted access token is obtained from a license server. The license server checks with the subscription server to see if the user has a valid subscription to the application program. The access token is sent to the client if the subscription is valid. The application server begins streaming the requested page segments to the client when it receives a valid access token from the client.

The client performs server load balancing across a plurality of application servers. Server failover and server quality of service problems are handled by the client via observation and information provided by the server components. If the client observes a non-response or slow response condition from an application server or license server, it switches to another application or license server.

Other aspects and advantages of the invention will become apparent from the following detailed description in combination with the accompanying drawings, illustrating, by way of example, the principles of the invention.

BRIEF DESCRIPTION OF THE DRAWINGS

FIG. 31a through 31h is a schematic diagram showing various components of the AppinstallBlock format according to the invention;

DETAILED DESCRIPTION OF THE INVENTION

Figure 1:
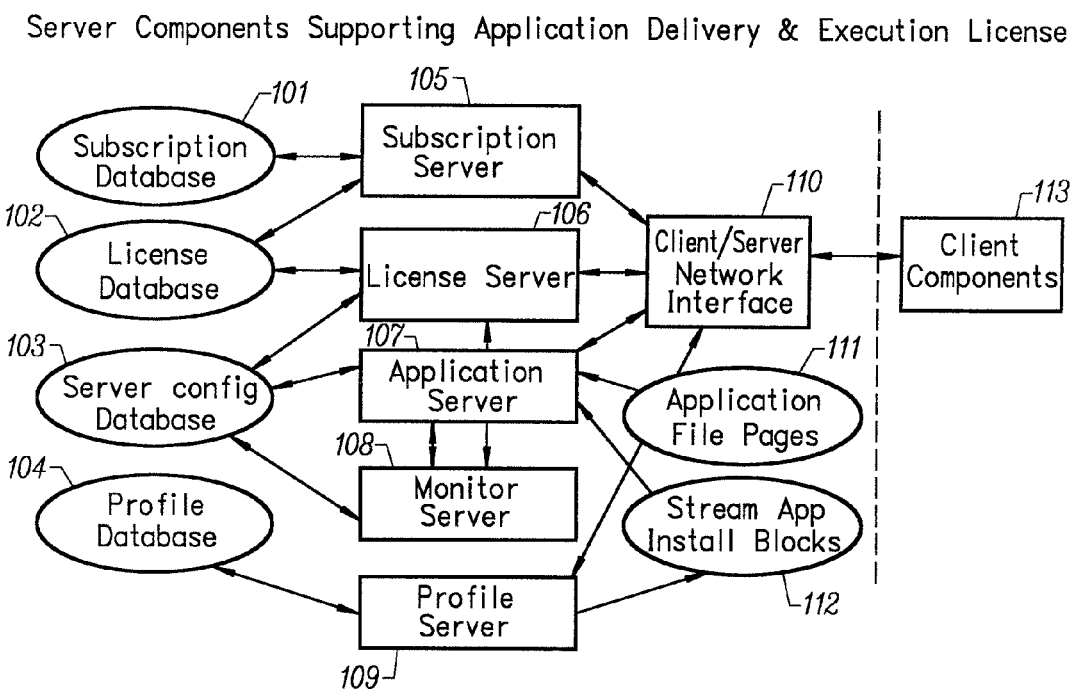
FIG. 1 is a block schematic diagram of a preferred embodiment of the invention showing components on the server that deal with users subscribing to and running applications according to the invention.

The invention is embodied in an intelligent network streaming and execution system for conventionally coded applications in a computer environment. A system according to the invention allows for segments of an application program to be streamed in a reliable, fault tolerant manner, from a server to a client while the application program is concurrently running on the client using the client's own file system. In addition, the invention provides a system that does not require that the application program be recompiled or recoded to be streamed.

The invention provides a highly efficient and secure application delivery system in conjunction with the adaptively optimized execution of applications across a network such as the Internet, a corporate intranet, or a wide area network. This is done in such a way that existing applications do not need to be recompiled or recoded. Furthermore, the invention is a highly scalable, load-balancing, and fault-tolerant system.

When using the invention, an end-user requests applications that are resident on remote systems to be launched and run on the end-user's local system. The end-user's local system is called the client or client system, e.g., a desktop, laptop, palmtop, or information appliance. A remote system is a called a server or server system and is located within a collection of one or more servers called a server cluster.

From the point of view of the client system, the application appears to be installed locally on the client even though it was initially installed on a different computer system. The applications execute locally on the client system and not on the server system. To achieve this result, the application is converted into a form suitable for streaming over the network. The streaming-enabled form of an application is called the Streamed Application Set (SAS) and the conversion process is termed the SAS Builder. The conversion of an application into its SAS form typically takes place on a system different from either an end-user client system or an Application Service Provider Server Cluster. This system is called the SAS Conversion System or, simply, the conversion system.

Components of the invention are installed on the client system to support activities such as the installation, invocation, and execution of a SAS-based application. Other components of the invention are installed on the server system to support activities such as the verification of end user application subscription and license data and the transfer and execution of a SAS-based application on the client system. Some of the client and some of the server components run in the kernel-mode while other components run in the usual user-mode.

The term Application Service Provider (ASP) refers to an entity that uses the server components on one or more server systems, i.e., an ASP Server Cluster, to deliver applications to end-user client systems. Such an entity could be, for example, a software manufacturer, an e-commerce vendor that rents or leases software, or a service department within a company. The invention enables an ASP to deliver applications across a network, in a highly efficient and secure way; the applications are adaptively optimized for execution on an end-user's client system.

A number of techniques are employed to increase the overall performance of the delivery of an application and its subsequent execution by minimizing the effect of network latency and bandwidth. Among the techniques employed are: the SAS Builder identifies sequences of frequently accessed application pages and uses this information when generating a SAS; individual SAS pages and sequences of SAS pages are compressed and cached in an in-memory cache on the server system; various aspects of the applications are monitored during their actual use on a client and the resulting profiling data is used by the client to pre-fetch (pull) and by the server to send (push) additional pages which have a high likelihood of being used prior to their actual use; and SAS pages are cached locally on a client for their immediate use when an application is invoked.

Aggregate profile data for an application, obtained by combining the profile data from all the end-user client systems running the application, is used to increase the system performance as well. A number of additional caching techniques that improve both system scalability and performance are also employed. The above techniques are collectively referred to as collaborative caching.

In an embodiment of the invention, the SAS Builder consists of three phases: installation monitoring, execution profiling, and application stream packaging. In the final SAS Builder phase, the Application Stream Packager takes the information gathered by the Application Install Monitor and the Application Execution Profiler and creates the SAS form of the application, which consists of a Stream Enabled Application Pages File and a Stream Enabled Application Install Block.

The Stream Enabled Application Install Block is used to install a SAS-based application on a client system while selected portions of the Stream Enabled Application Pages File are streamed to a client to be run on the client system. The Stream Enabled Application Install Block is the first set of data to be streamed from the server to the client and contains, among other things, the information needed by the client system to prepare for the streaming and execution of the particular application. Individual and aggregate client dynamic profile data is merged into the existing Stream Enabled Application Install Block on the server to optimize subsequent streaming of the application.

The invention employs a Client Streaming File System that is used to manage specific application-related file accesses during the execution of an application. For example, there are certain shared library files, e.g., "foo.dll", that need to be installed on the local file system, e.g., "c:\winnt\system32\foo.dll", for the application to execute. Such file names get added to a "spoof database". For the previous example, the spoof database would contain an entry saying that "c:\winnt\system32\foo.dll" is mapped to "z:\word\winnt\system32\foo.dll" where "z:" implies that this file is accessed by the Client Streaming File System. The Client Spoofer will then redirect all accesses to "c:\winnt\system32\foo.dll" to "z:\word\winnt\system32\foo.dll". In this manner, the client system gets the effect of the file being on the local machine whereas in reality the file is streamed from the server. Several different classes of files can be treated in this way, e.g., specific application registry entries and application-based networking calls when such calls cross a firewall.

Lastly, the invention incorporates a number of software anti-piracy techniques directed at combating the piracy of applications of the type described herein that are delivered to the end-user over a network for execution on a client system. Among the anti-piracy techniques included are: client-side fine-grained filtering of file accesses directed at remotely served files; filtering of file accesses based on where the code for the process that originated the request is stored; identification of crucial portions of application files and filtering file access depending on the portions of the application targeted; filtering of file accesses based on the surmised purpose of the file access, as determined by examining the program stack or flags associated with the request; and filtering of file accesses based on the surmised purpose of the file access, as determined by examining a history of previous file accesses by the same process.

As mentioned above, the invention provides server and client technology for streaming application delivery and execution. The invention includes secure license-based streaming delivery of applications over Internet/extranets/intranets utilizing client-based execution with client caching and server-based file accesses by page.

1. The invention provides many advantages over the present approaches, including:
   Secure license-based streaming delivery over Internet/extranets/intranets:
      reduces IT costs over client installation;
      supports rental model of app delivery, which opens new markets and increases user convenience over purchase and client installation; and
      enhances the opportunities to prevent software piracy over purchase and client installation.
   Client-based execution with client caching:
      increases typical application performance over server-based execution;
      reduces network latency and bandwidth usage over non-cached client execution; and
      allows existing applications to be run w/o rewrite/recompile/rebuild unlike other explicitly-distributed client/server application delivery approaches.
   Server-based file accesses:
      improve server-scaling over server-based execution;
      allow transparent failover to another server whereas server-based execution does not;
      make server load balancing easier than it is with server-based execution; and
      allow increased flexibility in server platform selection over server-based execution.
   Server-based file accesses by page:
      reduce network latency over complete file downloads;
      reduce network bandwidth overhead over complete file downloads; and
      reduce client cache footprint over complete file downloads.

2. Features of the Invention
A) Server Components Supporting Application Delivery and Execution.
   i) referring to FIG. 1, the server components include:
      a. Client/server network interface 110 that is common to the client 113 and the server. This is the communication mechanism through which the client and the server communicate.
      b. The Subscription Server 105—This is the server the client 113 connects to for subscribing and unsubscribing applications. This server then adds/deletes the subscription information to the Subscription Database 101 and also updates the License Database 102 with the information stating that the client 113 can/cannot run the subscribed information under the agreed upon licensing terms. This communication between the client 113 and the Subscription Server 105 happens over SSL that is an industry standard protocol for secure communication. The Subscription Server 105 is also contacted for updating any existing subscription information that is in the Subscription Database 101.
      c. The License Server 106—This is the server the client 113 connects to for getting a license to run an application after the client has subscribed to the application. This server validates the user and his subscriptions by consulting the License Database 102. If the client 113 does have a valid license, the License Server 106 sends an "Access token" to the client that is encrypted using an "encryption key" that the License Database 102 obtains from the Server Config Database 103. The "Access token" contains information like the Application ID and an expiration time. Along with the "Access token," the License Server 106 also sends a list of least loaded application servers that it obtains from the Server Config Database 103 and also the expiration time that was encoded in the "Access token". The client 113 uses this expiration time to know when to ask for a new token. This communication between the client 113 and the License Server 106 happens over SSL.
      d. The Application Server 107—Once the client 113 obtains an "Access token" to run an application, it connects to the Application Server 107 and presents to it the "Access token" along with the request for the application bits. Note that the "Access token" is opaque to the client 113 since it does not have the key to decrypt it. The Application Server 107 validates the "Access token" by decrypting it using a "decryption key" obtained from the Server Config Database 103 and checking the content against a predefined value like for example the Application ID and also by making sure that the expiration time in the "Access token" has not elapsed. It then serves the appropriate bits to the client 113 to enable it to run the application. The encryption and decryption keys could be something like a private key/public key pair or a symmetric key or any other means of providing security. Note that the keys are uniform across all the servers within an ASP.

e. The Monitor Server 108—It monitors the load in terms of percent of CPU utilization on the Application Servers 107 and the License Servers 106 on a periodic basis (for example—every minute) and adds that information to the Server Config Database 103.

f. The Profile Server 109—It receives profile information from the clients periodically. It adds this information to the Profile Database 104. The Profile Server 109 based on the profile information from different clients updates the App Prefetch Page List section of the Stream App Install Blocks 112.

ii) The data structures supporting the above server components include:

a. Subscription Database 101—This is the database that stores the user information in terms of username, list of apps subscribed, password, billing information, address, group, admin. The username is the primary key. The admin field identifies if this user has admin privileges for the group he belongs to.

b. License Database 102—This is the database that stores licensing information, i.e., which user can run what application and under which license. This database also keeps track of usage information i.e., which user has used which application for how long and how many times. The information looks like:

Username, application, time of usage, number of times run

Username, application, licensing policy

Username, application, is app running, no of instances, time of start

The username is the primary key. The licensing policy could be something simple like expiry date or something more complicated like number of instances simultaneously allowed within a group etc.

c. Server Config Database 103—This database stores information about which server can run which application, what is the load on all the servers, what is the encryption "key" to be used by the servers and all other information that is needed by the servers. The information looks like:

Server IP address, App/Slim server, application list, current load Encryption key, Decryption key The Server IP address is the primary key for the first table. The keys are common across all servers.

d. Profile Database 104—This database stores the profile information received by the profile server from the clients periodically. The information looks like:

Application ID, File ID, Block ID number of hits

The Application ID is the primary key.

e. Application File Pages 111—This is the one of the outputs of the "builder" as explained below and is put on the Application Server 107 so that it can serve the appropriate bits to the client.

f. Stream App Install Blocks 112—This is the other output of the "builder" and contains the information for successfully installing applications on the client for streaming applications.

Figure 2:
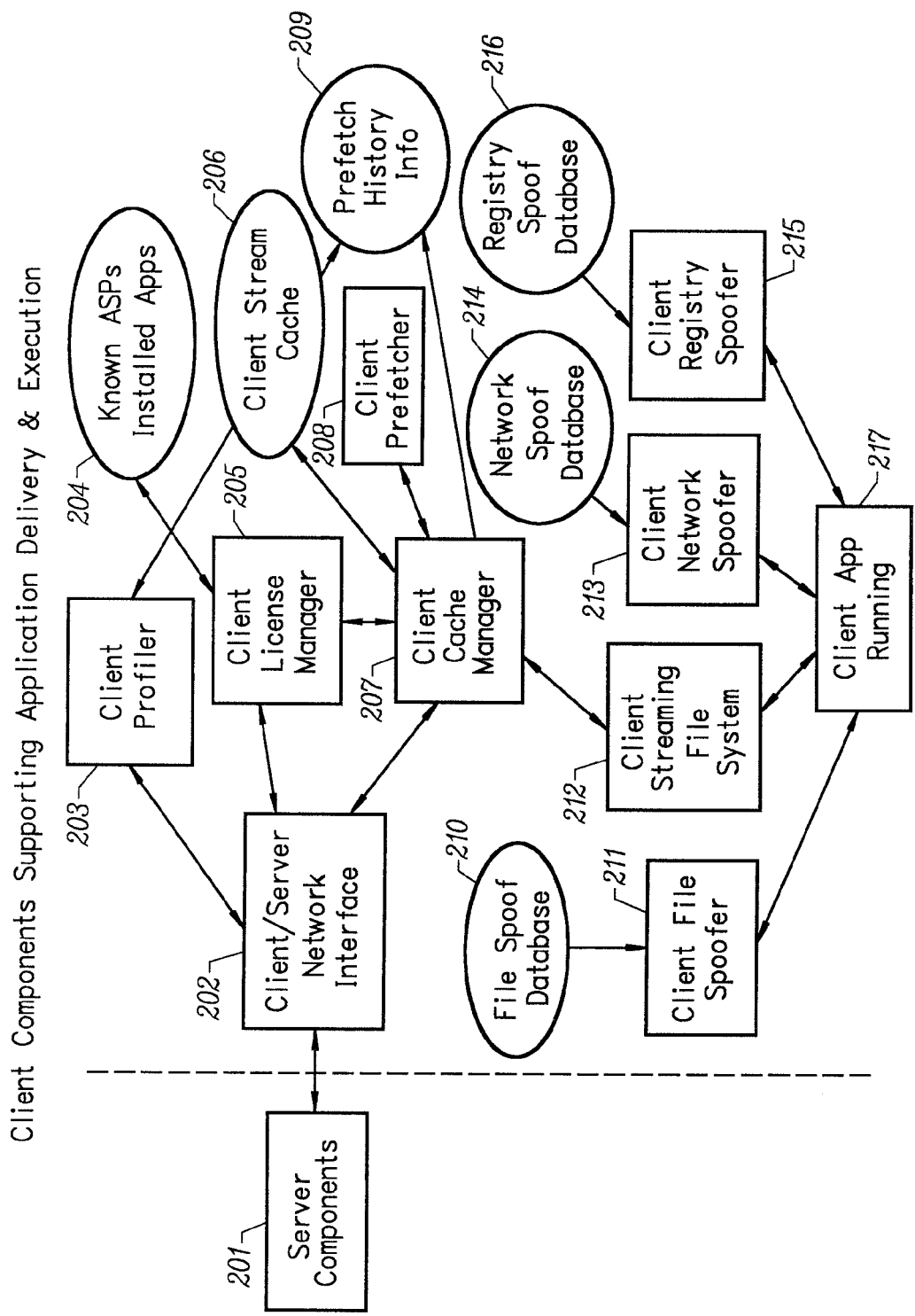
FIG. 2 is a block schematic diagram of a preferred embodiment of the invention showing the client components supporting application delivery and execution according to the invention.

B) Client Components Supporting Application Delivery & Execution.

i) With respect to FIGS. 1 and 2, these client components include:

a. Client/Server Network interface 202—This is the same interface as explained above.

b. Client License Manager 205—This component requests licenses ("Access tokens") from the License Server 106 when the client wants to run applications. The License Server 106 sends an "Access token" to the client that can be used to run the applications by presenting it to the Application Server 107. Along with the token, the License Server 106 also sends the expiry time of the token. The Client License Manager 205 renews the token just before the expiry period so that the client can continue running the application. When the application is complete, the Client License Manager 205 releases the token by sending a message to the License Server 106. In addition, when a user has subscribed to an application, the Client License Manager 205 first checks to make sure that the application is installed on the machine the user is trying to run the application from and if not requests for the application installation. It does this using a list of Installed Apps that it maintains.

c. Client Cache Manager 207—This component caches the application bits received from the Application Server 107 so that next time a request is made to the same bits, the request can be served by the cache instead of having to go to the Application Server 107. The Client Cache Manager 207 has a limited amount of space on the disk of the client machine that it uses for the cache. When the space is fully occupied, the Client Cache Manager 207 uses a policy to replace existing portions of the cache. This policy can be something like LRU, FIFO, random etc. The Client Cache Manager 207 is responsible for getting the application bits requested by the Client Streaming File System 212. If it does not have the bits cached, it gets them from the Application Server 107 through the network interface. However it also need to get the "Access token" from the Client License Manager 205 that it needs to send along with the request for the application bits. The Client Cache Manager 207 also updates the Prefetch History Info 209 with the requests it receives from the Client Streaming File System 212.

d. Client Streaming File System 212—This component serves all file system requests made by the application running on the client. The application makes calls like "read", "write" etc. to files that need to be streamed. These requests lead to page faults in the operating system and the page faults are handled by the Client Streaming File System 212 that in turn asks the Client Cache Manager 207 for the appropriate bits. The Client Cache Manager 207 will send those bits from the cache if they exist there or forward the request to the Application Server 107 through the network interface to get the appropriate bits.
   e. Client Prefetcher 208—This component monitors the requests made by the client to the Application Server 107 and uses heuristics to make additional requests to the Application Server 107 so that the bits can be obtained from the Application Server 107 before the client machine makes the request for them. This is mainly to hide the latency between the client and the Application Server 107. The history information of the requests is stored in the Prefetch History Info file 209.
   f. Client Profiler 203—At specific time intervals, the client profiler sends the profile information, which is the Prefetch History Info to the prefetch server at the ASP that can then update the App Prefetch Page Lists for the different applications accordingly.
   g. Client File Spoofer 211—Certain files on the client need to be installed at specific locations on the client system. To be able to stream these files from the Application Server 107, the Client Spoofer 211 intercepts all requests to these files made by a running application and redirects them to the Client Streaming File System 212 so that the bits can be streamed from the Application Server 107.
   h. Client Registry Spoofer 213—Similar to files, certain registry entries need to be different when the application being streamed is running and since it is undesirable to overwrite the existing registry value, the read of the registry value is redirected to the Client Registry Spoofer 215 which returns the right value. However, this is optional as it is very likely that overwriting the existing registry value will make the system work just fine.
   i. Client Network Spoofer 213—Certain applications make networking calls through a protocol like TCP. To make these applications work across firewalls, these networking calls need to be redirected to the Client Network Spoofer 213 which can tunnel these requests through a protocol like HTTP that works through firewalls.
ii) The data structures needed to support the above client components include:
   a. File Spoof Database 210—The list of files the requests to which need to be redirected to the Client Streaming File System 212. This information looks like (The source file name is the primary key):
      Source File Name, Target File Name
   b. Registry Spoof Database 216—List of registry entries and their corresponding values that need to be spoofed. Each entry looks like:
      Registry entry, new value
   c. Network Spoof Database 214—Like of IP addresses, the networking connections to which need to be redirected to the Client Network Spoofer 213. Each entry looks like (IP address is the primary key):
      IP address, Port number, new IP address, new Port number
   d. Client Stream Cache 206—The on-disk cache that persistently stores application bits.
   e. Known ASPs and Installed Apps 204—The list of ASP servers (Application, License and Subscription) and also the list of applications that are installed on the client.
   f. Prefetch History Info 209—The history of the requests made to the cache. This consists of which blocks were requested from which file for which application and how many times each block was requested. It also consists of predecessor-successor information indicating which block got requested after a particular block was requested.

In general, interfaces, servers, databases (including database interfaces, if applicable), managers, prefetchers, profilers, spoofers, installers, monitors, and other components are implemented as engines that can include a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As such, the various components of the systems described in this paper can be referred to as engines. For example, the client license manager 205, the client cache manager 207, the client streaming file system 212, the client prefetcher 208, and the client file spoofer 211 can respectively be described as a client license management engine, a client cache management engine, a client streaming file system engine, a client prefetching engine, and a client file spoofing engine.

Figure 3:
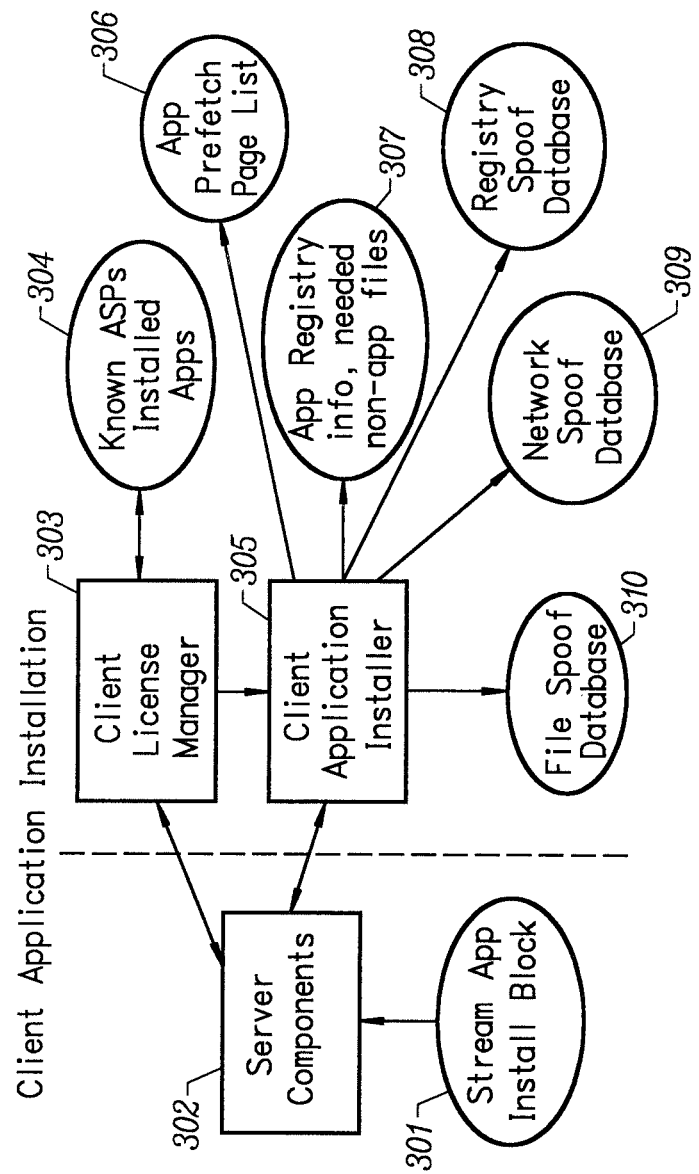
FIG. 3 is a block schematic diagram of a preferred embodiment of the invention showing the components needed to install applications on the client according to the invention.

C) Client Application Installation.
Referring to FIG. 3, the client application installation components include:
   i) Client License Manager 303—This is the same component explained above.
   ii) Client Application Installer 305—This component is invoked when the application needs to be installed. The Client Application Installer 305 sends a specific request to the Application Server 107 for getting the Stream App Install Block 301 for the particular application that needs to be installed. The Stream App Install Block 301 consists of the App Prefetch Page List 306, Spoof Database 308, 309, 310, and App Registry Info 307. The Client Application Installer 305 then updates the various Spoof Databases 308, 309, 31b and the Registry 307 with this information. It also asks the Client Prefetcher 208 to start fetching pages in the App Prefetch Page List 306 from the Application Server 107. These are the pages that are known to be needed by a majority of the users when they run this application.

Figure 4:
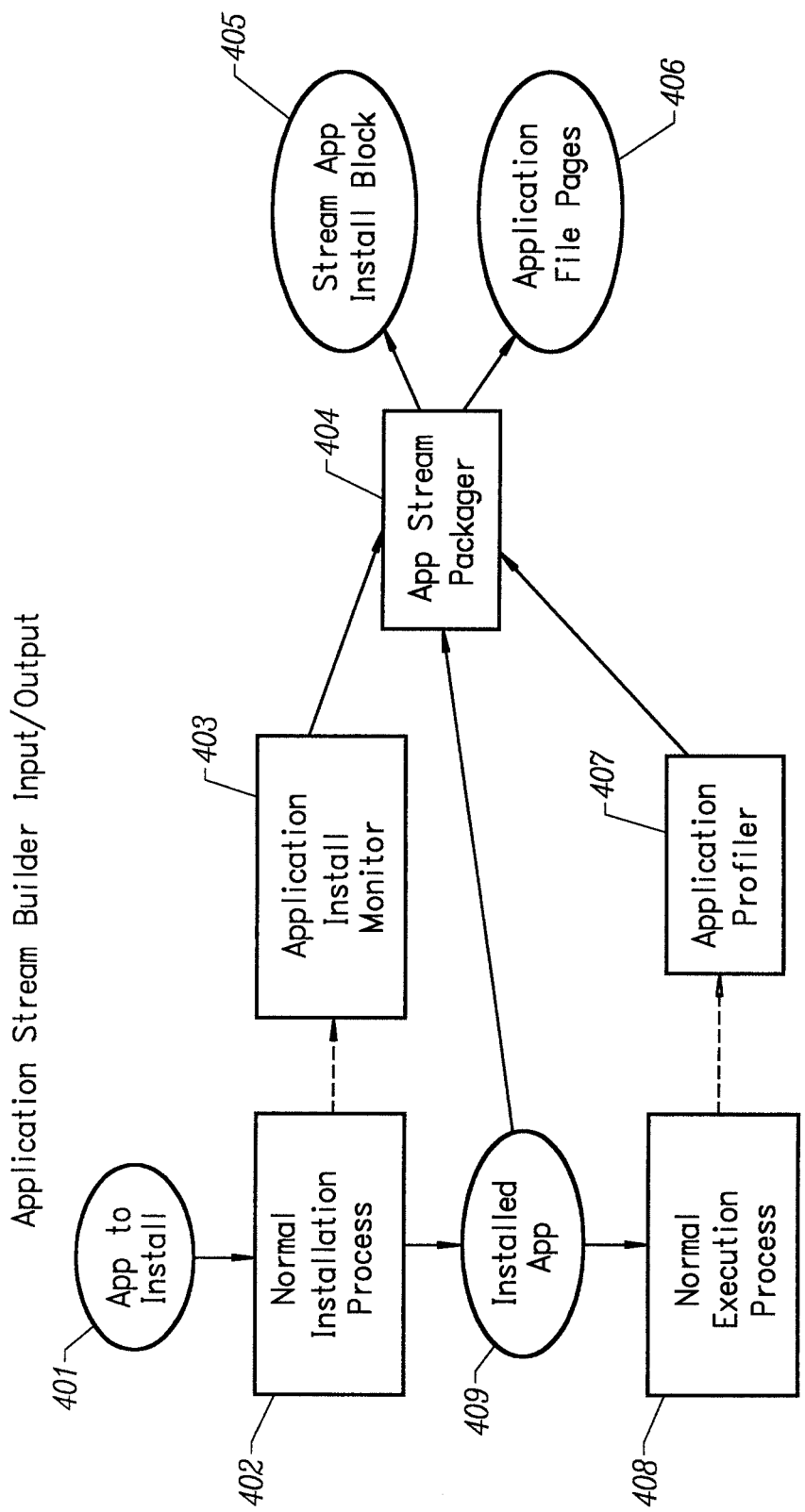
FIG. 4 is a block schematic diagram of the Builder that takes an existing application and extracts the Application File Pages for that application according to the invention.
Figure 5A:
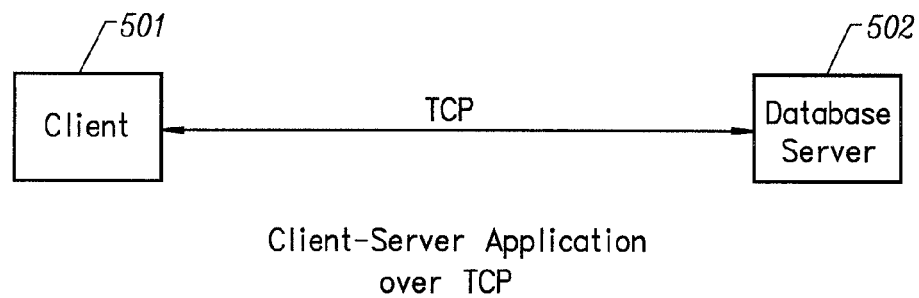
FIG. 5a is a block schematic diagram illustrating how the Client Network Spoofer is used to handle mapping TCP interfaces to HTTP interfaces according to the invention.
Figure 5B:
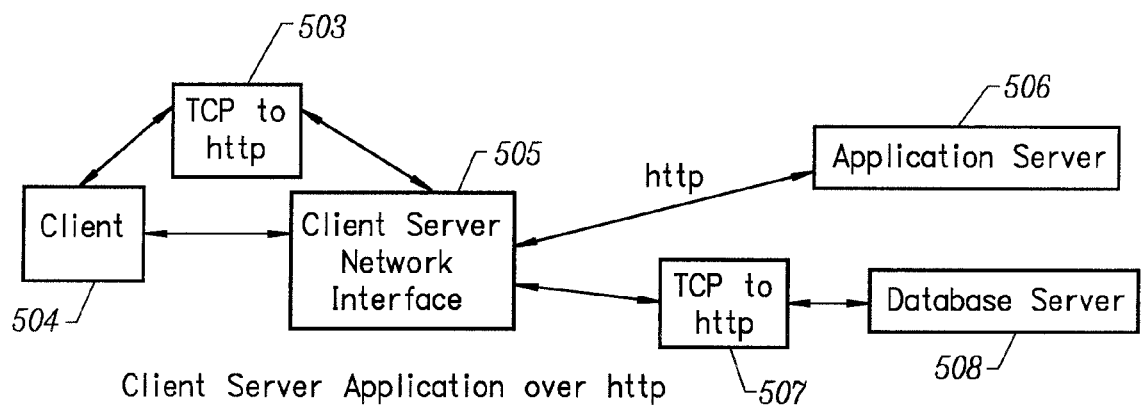
FIG. 5b is a block schematic diagram illustrating how the Client Network Spoofer is used to handle mapping TCP interfaces to HTTP interfaces according to the invention.

D) Application Stream Builder Input/Output.
With respect to FIG. 4, the Builder components include the following:
   i) Application Install Monitor 403—This component monitors the installation of an application 401 and figures out all the files that have been created during installation 402, registry entries that were created and all the other changes made to the system during installation.

ii) Application Profiler 407—After the application is installed, it is executed using a sample script. The Application Profiler 407 monitors the application execution 408 and figures out the application pages that got referenced during the execution.

iii) App Stream Packager 404—The App Stream Packager 404 takes the information gathered by the Application Profiler 407 and the Application Install Monitor 403 and forms the Application File Pages 406 and the Stream App Install Block 405 from that information.

E) Network Spoofing for Client-Server Applications.

Referring to FIGS. 1, 4, 5*a*, 5*b*, and 6*a*, the component that does the Network Spoofing is the TCP to HTTP converter 503, 507. The basic idea is to take TCP packets and tunnel them through HTTP on one side and do exactly the opposite on the other. As far as the client 501 and the server 502 are concerned the communication is TCP and so existing applications that run with that assumption work unmodified. This is explained in more detail below.

On the client side, the user launches an application that resides on the Client Streaming File System. That application may be started in the same ways that applications on other client file systems may be started, e.g., opening a data file associated with the application or selecting the application from the Star/Programs menu in a Windows system. From the point of view of the client's operating system and from the point of view of the application itself, that application is located locally on the client.

Whenever a page fault occurs on behalf of any application file residing on the Client Streaming File System 604, that file system requests the page from the Client Cache Manager 606. The Client Cache Manager 606, after ensuring via interaction with the Client License Manager 608 that the user's client system holds a license to run the application at the current time, checks the Client Stream Cache 611 and satisfies the page fault from that cache, if possible. If the page is not currently in the Client Stream Cache 611, the Client Cache Manager 606 makes a request to the Client/Server Network Interface 505, 609 to obtain that page from the Application File Pages stored on an Application Server 506.

The Client Prefetcher 606 tracks all page requests passed to the Client Cache Manager 606. Based on the pattern of those requests and on program locality or program history, the Client Prefetcher 606 asks the Client Cache Manager 606 to send additional requests to the Client/Server Network Interface 505, 609 to obtain other pages from the Application File Pages stored on the Application Server 506.

Files located on the Client Streaming File System 604 are typically identified by a particular prefix (like drive letter or pathname). However, some files whose names would normally imply that they reside locally are mapped to the Client Streaming File System 604, in order to lower the invention's impact on the user's local configuration. For instance, there are certain shared library files (dll's) that need to be installed on the local file system (c:\winnt\system32\foo.dll). It is undesirable to add that file on the user's system. The file name gets added to a "spoof database" which contains an entry saying that c:\winnt\system32\foo.dll is mapped to z:\word\winnt\system32\foo.dll where z: implies that it is the Client Streaming File System. The Client Spoofer 603 will then redirect all accesses to c:\winnt\system32\foo.dll to z:\word\winnt\system32\foo.dll. In this manner the client system gets the effect of the file being on the local machine whereas in reality the file is streamed from the server.

In a similar fashion the Client Spoofer 603 may also be used to handle mapping TCP interfaces to HTTP interfaces. There are certain client-server applications (like ERP/CRM applications) that have a component running on a client and another component running on a database server, Web server etc. These components talk to each other through TCP connections. The client application will make TCP connections to the appropriate server (for this example, a database server) when the client piece of this application is being streamed on a user's machine.

The database server could be resident behind a firewall and the only way for the client and the server to communicate is through a protocol like HTTP that can pass through firewalls. To enable the client to communicate with the database server, the client's TCP requests need to be converted to HTTP and sent to the database server. Those requests can be converted back to TCP so that the database server can appropriately process the requests just before the requests reach the database server. The Client Spoofer's 603 responsibility in this case is to trap all TCP requests going to the database server and convert it into HTTP requests and take all HTTP requests coming from the database server and convert them into TCP packets. Note that the TCP to HTTP converters 505, 507 convert TCP traffic to HTTP and vice versa by embedding TCP packets within the HTTP protocol and by extracting the TCP packets from the HTTP traffic. This is called tunneling.

When the Client License Manager 608 is asked about a client's status with respect to holding a license for a particular application and the license is not already being held, the Client License Manager 608 contacts the License Server 106 via the Client/Server Network Interface 609 and asks that the client machine be given the license. The License Server 106 checks the Subscription 101 and License 102 Databases and, if the user has the right to hold the license at the current time, it sends back an Access Token, which represents the right to use the license. This Access Token is renewed by the client on a periodic basis.

The user sets up and updates his information in the Subscription 101 and License 102 Databases via interacting with the Subscription Server 105. Whenever a user changes his subscription information, the Subscription Server 105 signals the user's client system since the client's Known ASPs and Installed Apps information potentially needs updating. The client system also checks the Subscription 101 and License 102 Databases whenever the user logs into any of his client systems set up for Streaming Application Delivery and Execution. If the user's subscription list in the Subscription 101 and License 102 Databases list applications that have not been installed on the user's client system, the user is given the opportunity to choose to install those applications.

Whenever the user chooses to install an application, the Client License Manager 608 passes the request to the Client Application Installer 607 along with the name of the Stream App Install Block to be obtained from the Application Server 107. The Client Application Installer 607 opens and reads that file (which engages the Client Streaming File System) and updates the Client system appropriately, including setting up the spoof database, downloading certain needed non-application-specific files, modifying the registry file, and optionally providing a list of applications pages to be prefetched to warm up the Client Stream Cache 611 with respect to the application.

The Application Stream Builder creates the Stream App Install Block 405 used to set up a client system for Streaming Application Delivery and Execution and it also creates the set of Application File Pages 406 sent to satisfy client requests by the Application Server 107. The process that creates this information is offline and involves three components. The Application Install Monitor 403 watches a normal installation of the application and records various information including registry entries, required system configuration, file placement, and user options. The Application Profiler 407 watches a normal execution of the application and records referenced pages, which may be requested to pre-warm the client's cache on behalf of this application. The Application Stream Packager 404 takes information from the other two Builder components, plus some information it compiles with respect to the layout of the installed application and forms the App Install Block 405 and the set of Application File Pages 406.

Server fail-over and server quality of service problems are handled by the client via observation and information provided by the server components. An ASP's Subscription Server provides a list of License Servers associated with that ASP to the client, when the user initiates/modifies his account or when the client software explicitly requests a new list. A License Server provides a list of Application Servers associated with an application to the client, whenever it sends the client an Access Token for the application.

Should the client observe apparent non-response or slow response from an Application Server, it switches to another Application Server in its list for the application in question. If none of the Application Servers in its list respond adequately, the client requests a new set for the application from a License Server. The strategy is similar in the case in which the client observes apparent non-response or slow response from a License Server; the client switches to another License Server in its list for the ASP in question. If none of the License Servers in its list responds adequately, the client requests a new set of License Servers from the ASP.

Server load balancing is handled by the server components in cooperation with the client. A server monitor component tracks the overall health and responsiveness of all servers. When a server is composing one of the server lists mentioned in the previous paragraph, it selects a set that is alive and relatively more lightly used than others. Client cooperation is marked by the client using the server lists provided by the servers in the expected way, and not unilaterally doing something unexpected, like continuing to use a server which does not appear in the most recent list provided.

Security issues associated with the server client relationship are considered in the invention. To ensure that the communication between servers and clients is private and that the servers in question are authorized via appropriate certification, an SSL layer is used. To ensure that the clients are licensed to use a requested application, user credentials (username+password) are presented to a License Server, which validates the user and his licensing status with respect to the application in question and issues an Access Token, and that Access Token is in turn presented to an Application Server, which verifies that the Token's validity before delivering the requested page. Protecting the application in question from piracy on the client's system is discussed in another section, below.

Client-Side Performance Optimization

This section focuses on client-specific portions of the invention. The invention may be applied to any operating system that provides a file system interface or block driver interface. A preferred embodiment of the invention is Windows 2000 compliant.

Figure 6A:
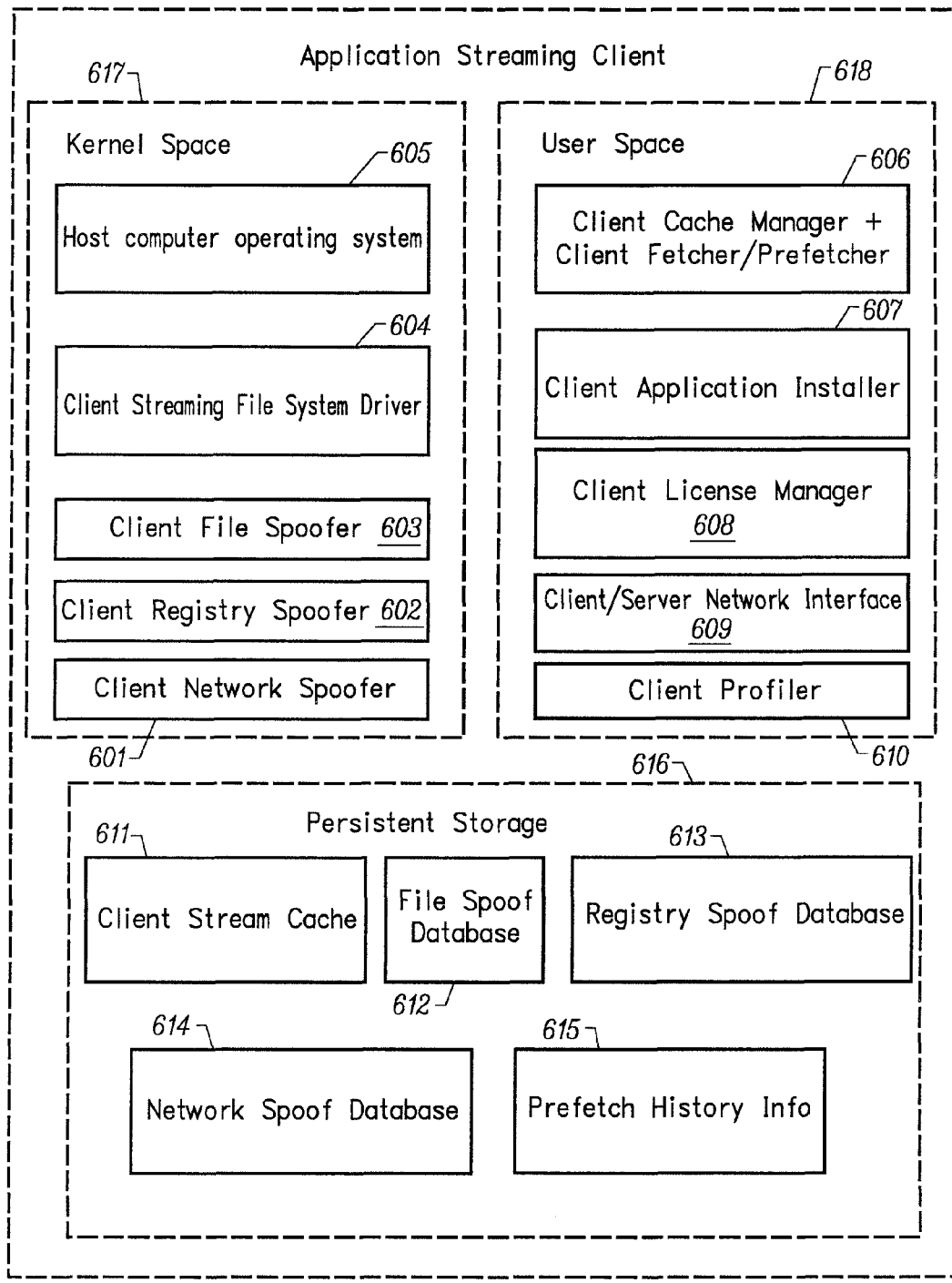
FIG. 6a is a block schematic diagram showing several different components of the client software according to the invention.

With respect to FIG. 6*a*, several different components of the client software are shown. Some components will typically run as part of the operating system kernel, and other portions will run in user mode.

The basis of the client side of the streamed application delivery and execution system is a mechanism for making applications appear as though they were installed on the client computer system without actually installing them.

Installed applications are stored in the file system of the client system as files organized in directories. In the state of the art, there are two types of file systems: local and network. Local file systems are stored entirely on media (disks) physically resident in the client machine. Network file systems are stored on a machine physically separate from the client, and all requests for data are satisfied by getting the data from the server. Network file systems are typically slower than local file systems. A traditional approach to use the better performance of a local file system is to install important applications on the local file system, thereby copying the entire application to the local disk. The disadvantages of this approach are numerous. Large applications may take a significant amount of time to download, especially across slower wide area networks. Upgrading applications is also more difficult, since each client machine must individually be upgraded.

The invention eliminates these two problems by providing a new type of file system: a streaming file system. The streaming file system allows applications to be run immediately by retrieving application file contents from the server as they are needed, not as the application is installed. This removes the download cost penalty of doing local installations of the application. The streaming file system also contains performance enhancements that make it superior to running applications directly from a network file system. The streaming file system caches file system contents on the local machine. File system accesses that hit in the cache are nearly as fast as those to a local file system. The streaming file system also has sophisticated information about application file access patterns. By using this knowledge, the streaming file system can request portions of application files from the server in advance of when they will actually be needed, thus further improving the performance of applications running on the application streaming file system.

In a preferred embodiment of the invention, the application streaming file system is implemented on the client using a file system driver and a helper application running in user mode. The file system driver receives all requests from the operating system for files belonging to the application streaming file system. The requests it handles are all of the standard file system requests that every file system must handle, including (but not limited to) opening and closing files, reading and writing files, renaming files, and deleting files. Each file has a unique identifier consisting of an application number, and a file number within that application. In one embodiment of the invention, the application number is 128 bits and the file number is 32 bits, resulting in a unique file ID that is 160 bits long. The file system driver is responsible for converting path names (such as "z:\program files\foo.exe") into file IDs (this is described below). Once the file system driver has made this translation, it basically forwards the request to the user-mode program to handle.

The user-mode program is responsible for managing the cache of application file contents on the local file system and contacting the application streaming server for file contents that it cannot satisfy out of the local cache. For each file system request, such as read or open, the user-mode process will check to see if it has the requested information in the cache. If it does, it can copy the data from the cache and return it to the file system driver. If it does not, it contacts the application streaming server over the network and obtains the information it needs. To obtain the contents of the file, the user-mode process sends the file identifier for the file it is interested in reading along with an offset at which to read and the number of bytes to read. The application streaming server will send back the requested data.

The file system can be implemented using a fragmented functionality to facilitate development and debugging. All of the functionality of the user-mode component can be put into the file system driver itself without significantly changing the scope of the invention. Such an approach is believed to be preferred for a client running Windows 95 as the operating system.

Directories are specially formatted files. The file system driver reads these from the user mode process just like any other files with reads and writes. Along with a header containing information about the directory (such as how long it is), the directory contains one entry for each file that it contains. Each entry contains the name of the file and its file identifier. The file identifier is necessary so that the specified file can be opened, read, or written. Note that since directories are files, directories may recursively contain other directories. All files in an application streaming file system are eventual descendents of a special directory called the "root". The root directory is used as the starting point for parsing file names.

Given a name like "z:/foo/bar/baz", the file system driver must translate the path "z:/foo/bar/baz" into a file identifier that can be used to read the file from the application streaming service. First, the drive letter is stripped off, leaving "/foo/bar/baz". The root directory will be searched for the first part of the path, in this case "foo". If the file "foo" is found in the root directory, and the file "foo" is a directory, then "foo" will be searched for the next portion of the path, "bar". The file system driver achieves this by using the file id for "foo" (found by searching the root directory) to open the file and read its contents. The entries inside "foo" are then searched for "bar", and this process continues until the entire path is parsed, or an error occurs.

In the following examples and text, the root directory is local and private to the client. Each application that is installed will have its own special subdirectory in the root directory. This subdirectory will be the root of the application. Each application has its own root directory.

The invention's approach is much more efficient than other approaches like the standard NFS approach. In those cases, the client sends the entire path "/foo/bar/baz" is sent to the server and the server returns the file id for that file. Next time there is a request for "/foo/bar/baz2" again the entire path needs to be sent. In the approach described here, once the request for "bar" was made, the file ids for all files within bar are sent back including the ids for "baz" and "baz2" and hence "baz2" will already be known to client. This avoids communication between the client and the server.

In addition, this structure also allows applications to be easily updated. If certain code segments need to be updated, then the code segment listing in the application root directory is simply changed and the new code segment subdirectory added. This results in the new and correct code segment subdirectory being read when it is referenced. For example if a file by the name of "/foo/bar/baz3" needs to be added, the root directory is simply changed to point to a new version of "foo" and that new version of "foo" points to a new version of "bar" which contains "baz3" in addition to the files it already contained. However the rest of the system is unchanged.

Client Features

Figure 6B:
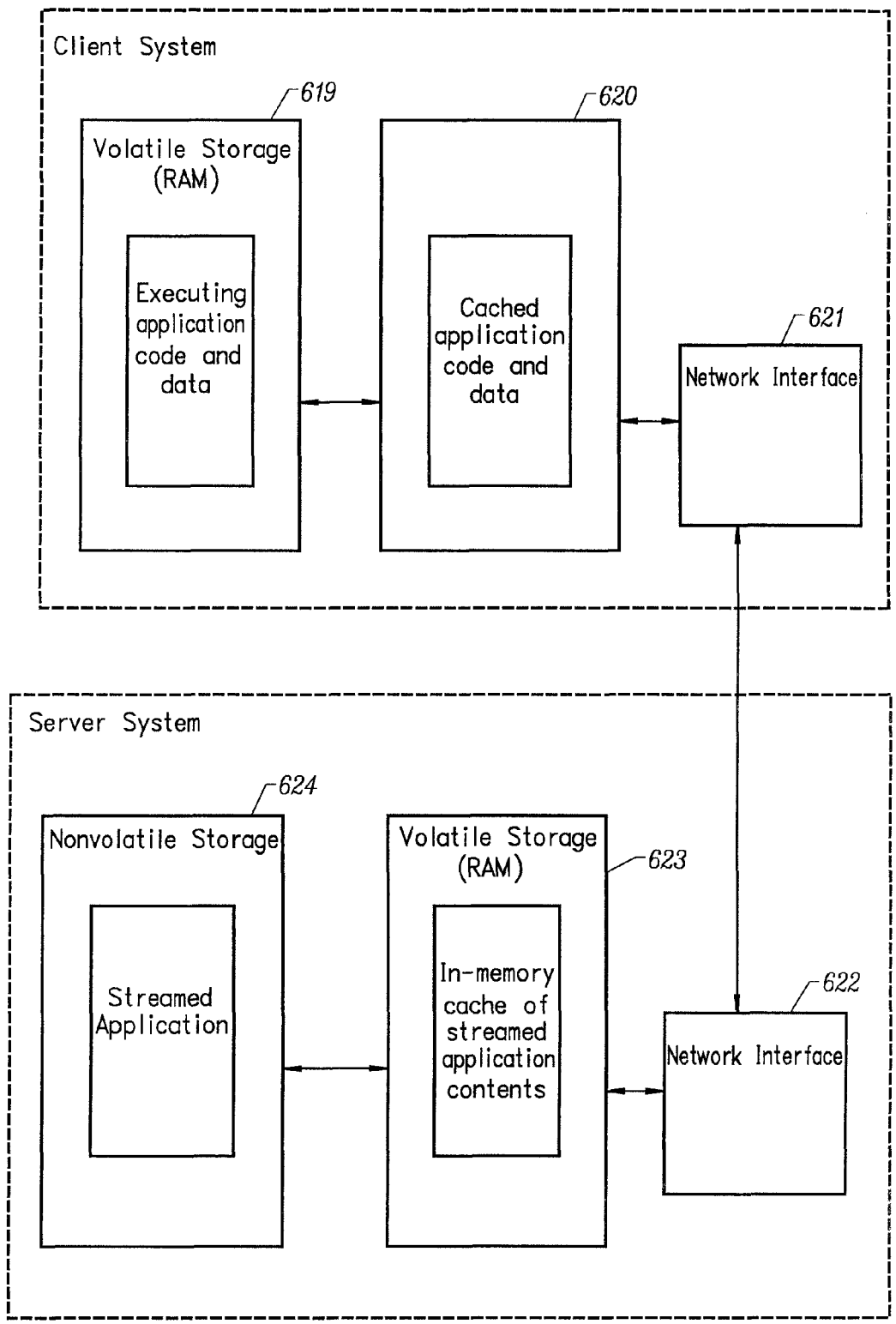
FIG. 6b is a block schematic diagram showing the use of volatile and non-volatile storage of code and data in the client and server according to the invention.

Referring to FIGS. 6a and 6b, a key aspect of the preferred embodiment of the invention is that application code and data are cached in the client's persistent storage 616, 620. This caching provides better performance for the client, as accessing code and data in the client's persistent storage 620 is typically much faster than accessing that data across a wide area network. This caching also reduces the load on the server, since the client need not retrieve code or data from the application server that it already has in its local persistent storage.

In order to run an application, its code and data must be present in the client system's volatile storage 619. The client software maintains a cache of application code and data that normally reside in the client system's nonvolatile memory 620. When the running application requires data that is not present in volatile storage 619, the client streaming software 604 is asked for the necessary code or data. The client software first checks its cache 611, 620 in nonvolatile storage for the requested code or data. If it is found there, the code or data are copied from the cache in nonvolatile storage 620 to volatile memory 619. If the requested code or data are not found in the nonvolatile cache 611, 620, the client streaming software 604 will acquire the code or data from the server system via the client's network interface 621, 622.

Application code and data may be compressed 623, 624 on the server to provide better client performance over slow networks. Network file systems typically do not compress the data they send, as they are optimized to operate over local area networks.

Figure 7A:
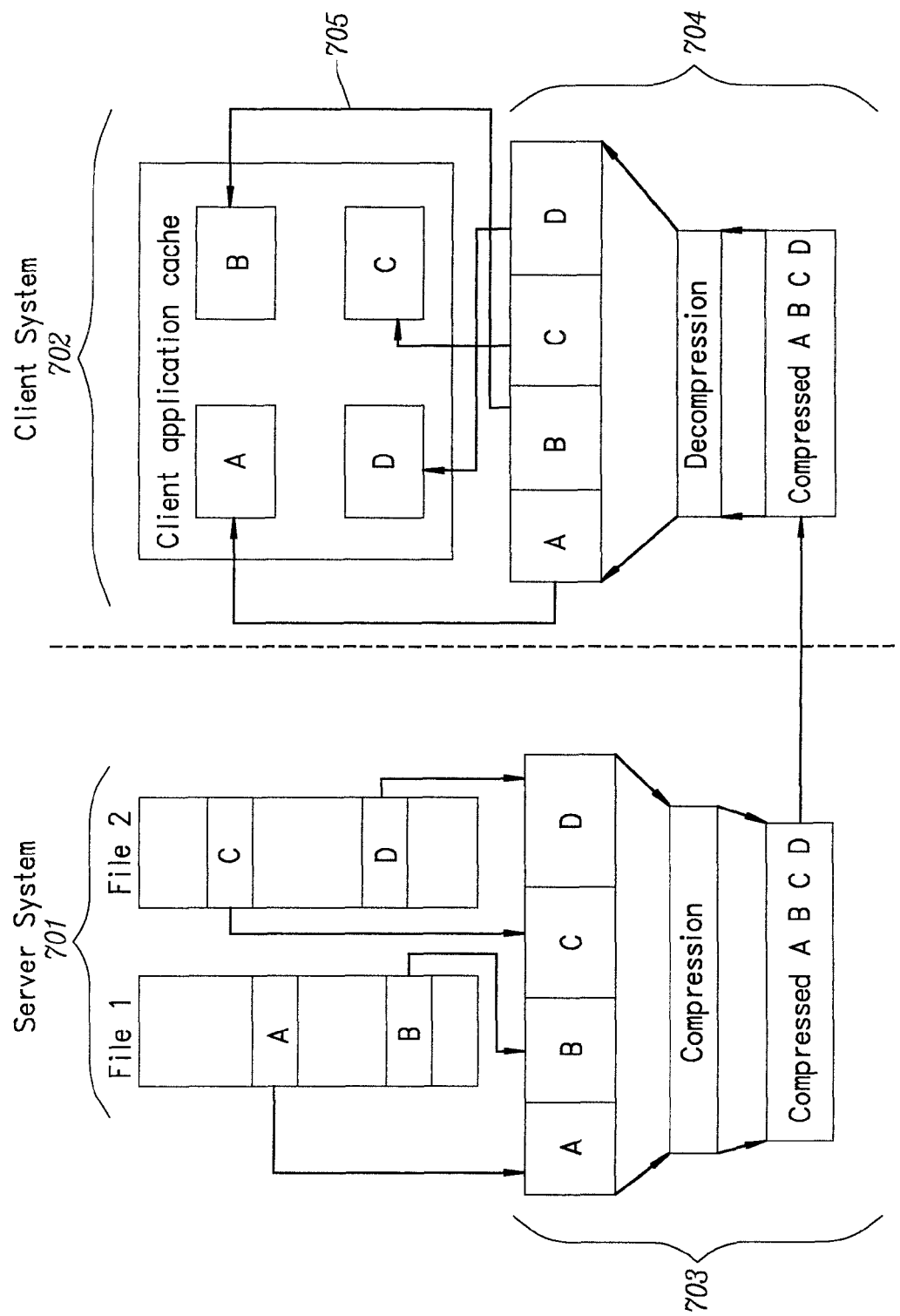
FIG. 7a is a block schematic diagram showing one of two ways in which data may be compressed while in transit between the server and client according to the invention.
Figure 7B:
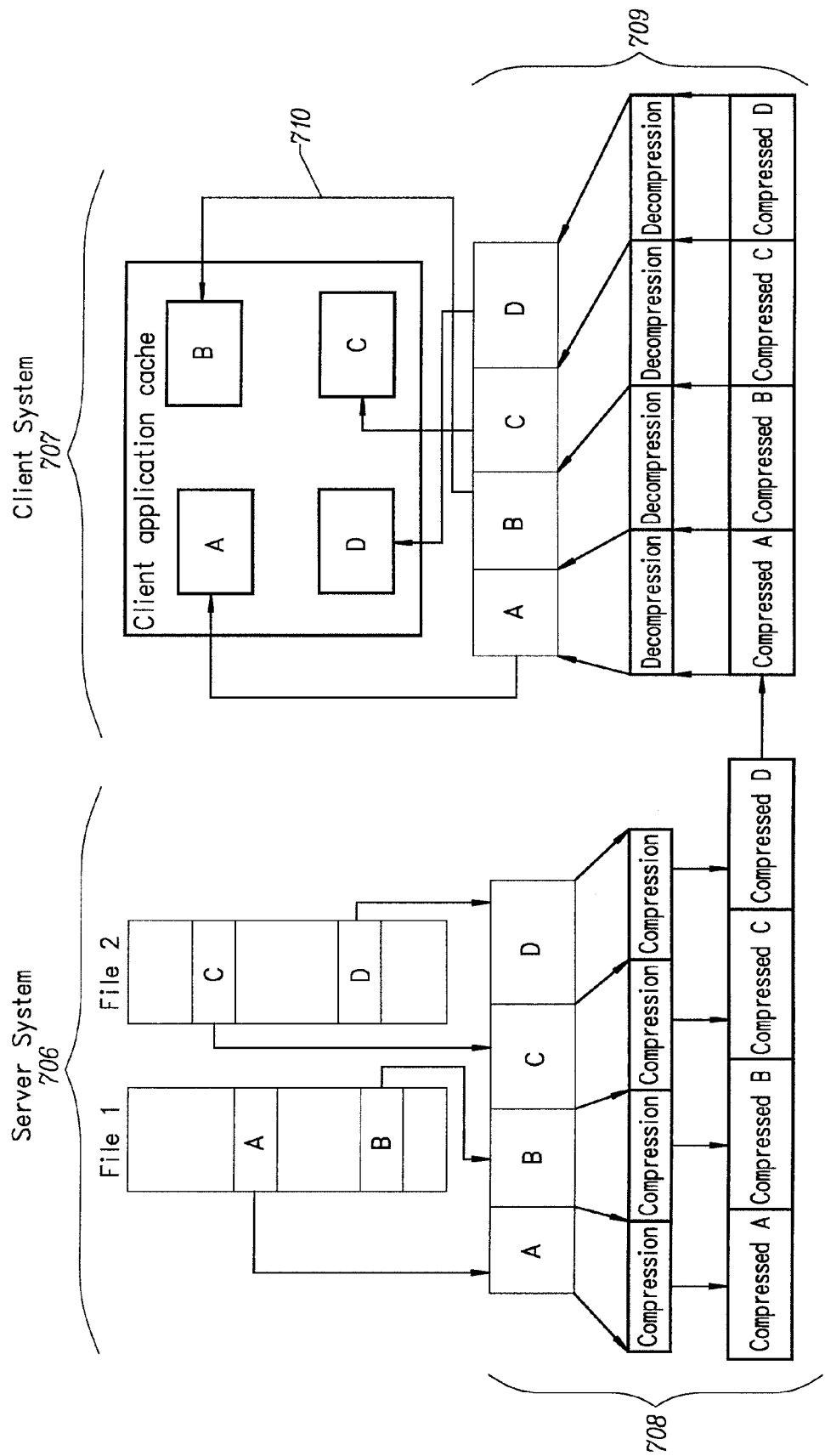
FIG. 7b is a block schematic diagram showing the other way in which data may be compressed while in transit between the server and client according to the invention.

FIGS. 7a & 7b demonstrate two ways in which data may be compressed while in transit between the server and client. With either mechanism, the client may request multiple pieces of code and data from multiple files at once. FIG. 7A illustrates the server 701 compressing the concatenation of A, B, C, and D 703 and sending this to the client 702. FIG. 7B illustrates the server 706 separately compressing A, B, C, and D 708 and sending the concatenation of these compressed regions to the client 707. In either case, the client 702, 707 will decompress the blocks to retrieve the original contents A, B, C, and D 704, 709 and these contents will be stored in the cache 705, 710.

The boxes marked "Compression" represent any method of making data more compact, including software algorithms and hardware. The boxes marked "Decompression" represent any method for expanding the compacted data, including software algorithms and hardware. The decompression algorithm used must correspond to the compression algorithm used.

The mechanism for streaming of application code and data may be a file system. Many network file systems exist. Some are used to provide access to applications, but such systems typically operate well over a local area network (LAN) but perform poorly over a wide area network (WAN). While this solution involves a file system driver as part of the client streaming software, it is more of an application delivery mechanism than an actual file system.

Figure 8:
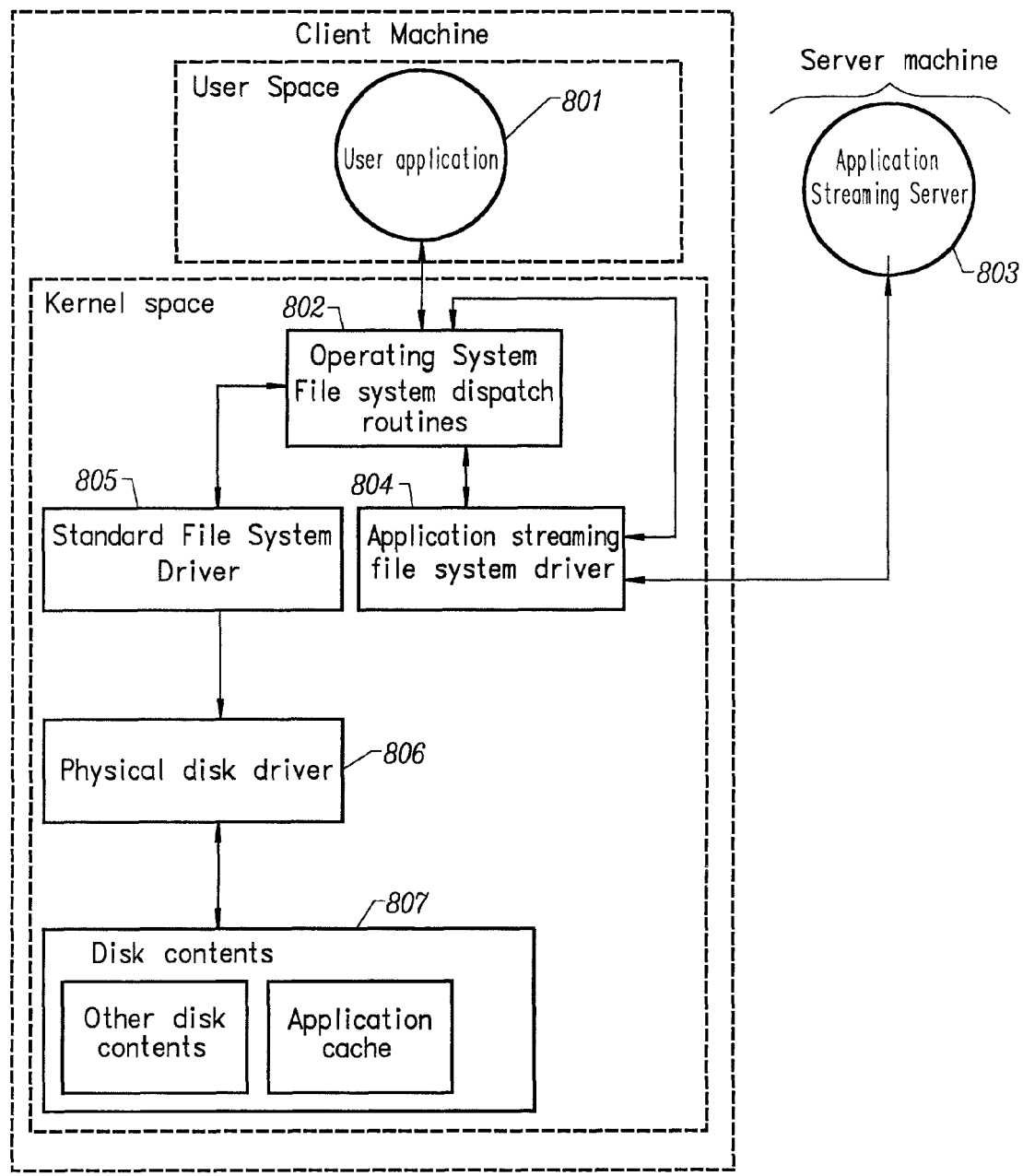
FIG. 8 is a block schematic diagram showing an organization of the streaming client software according to the invention.

With respect to FIG. 8, application code and data are installed onto the file system 802, 805, 806, 807 of a client machine, but they are executed from the volatile storage (main memory). This approach to streamed application delivery involves installing a special application streaming file system 803, 804. To the client machine, the streaming file system 803, 804 appears to contain the installed application 801. The application streaming file system 803 will receive all requests for code or data that are part of the application 801. This file system 803 will satisfy requests for application code or data by retrieving it from its special cache stored in a native file system or by retrieving it directly from the streaming application server 802. Code or data retrieved from the server 802 will be placed in the cache in case it is used again.

Figure 9:
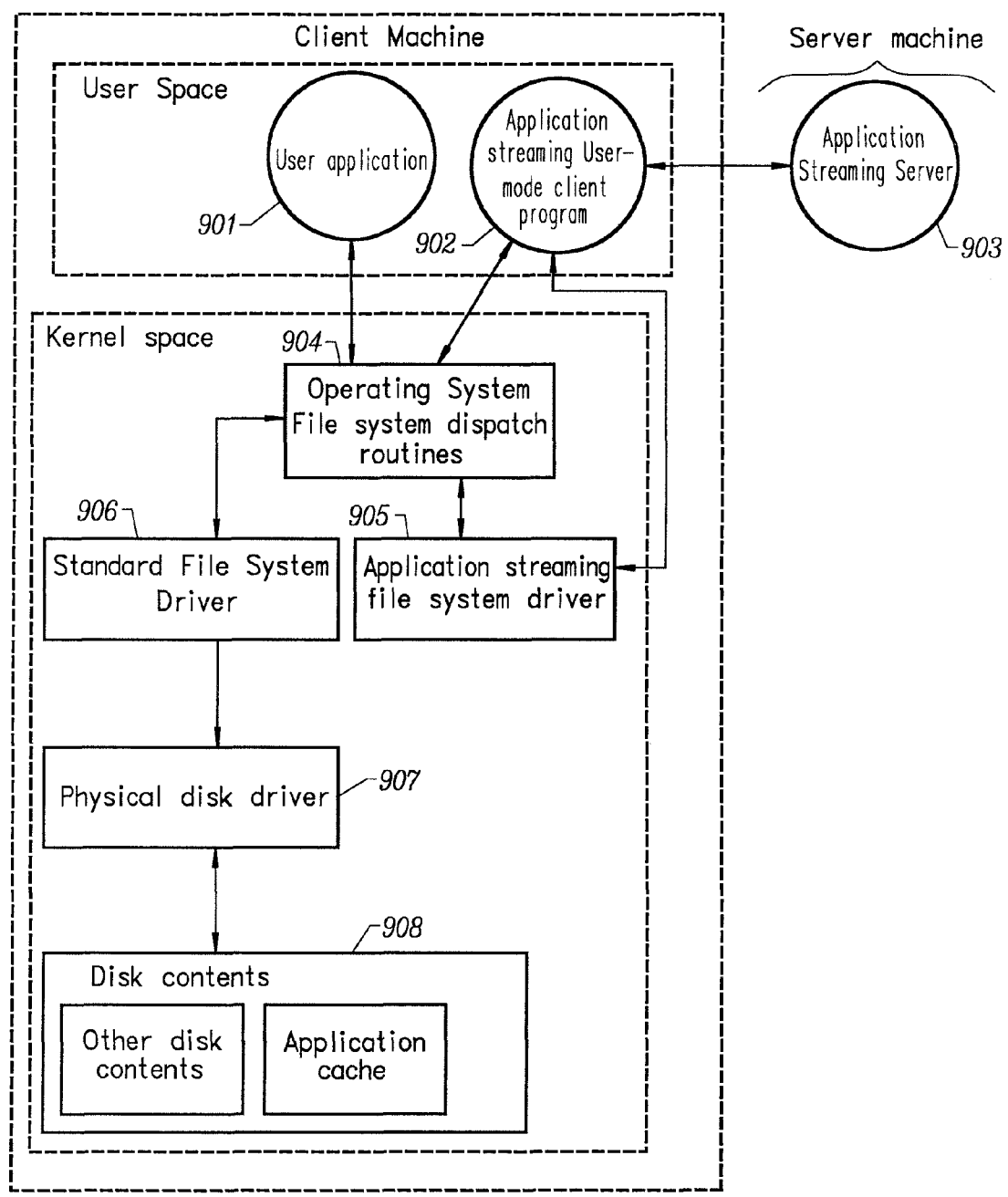
FIG. 9 is a block schematic diagram showing an alternative organization of the streaming client software according to the invention.

Referring to FIG. 9, an alternative organization of the streaming client software is shown. The client software is divided into the kernel-mode streaming file system driver 905 and a user-mode client 902. Requests made to the streaming file system driver 905 are all directed to the user-mode client 902, which handles the streams from the application streaming server 903 and sends the results back to the driver 905. The advantage of this approach is that it is easier to develop and debug compared with the pure-kernel mode approach. The disadvantage is that the performance will be worse than that of a kernel-only approach.

Figure 10:
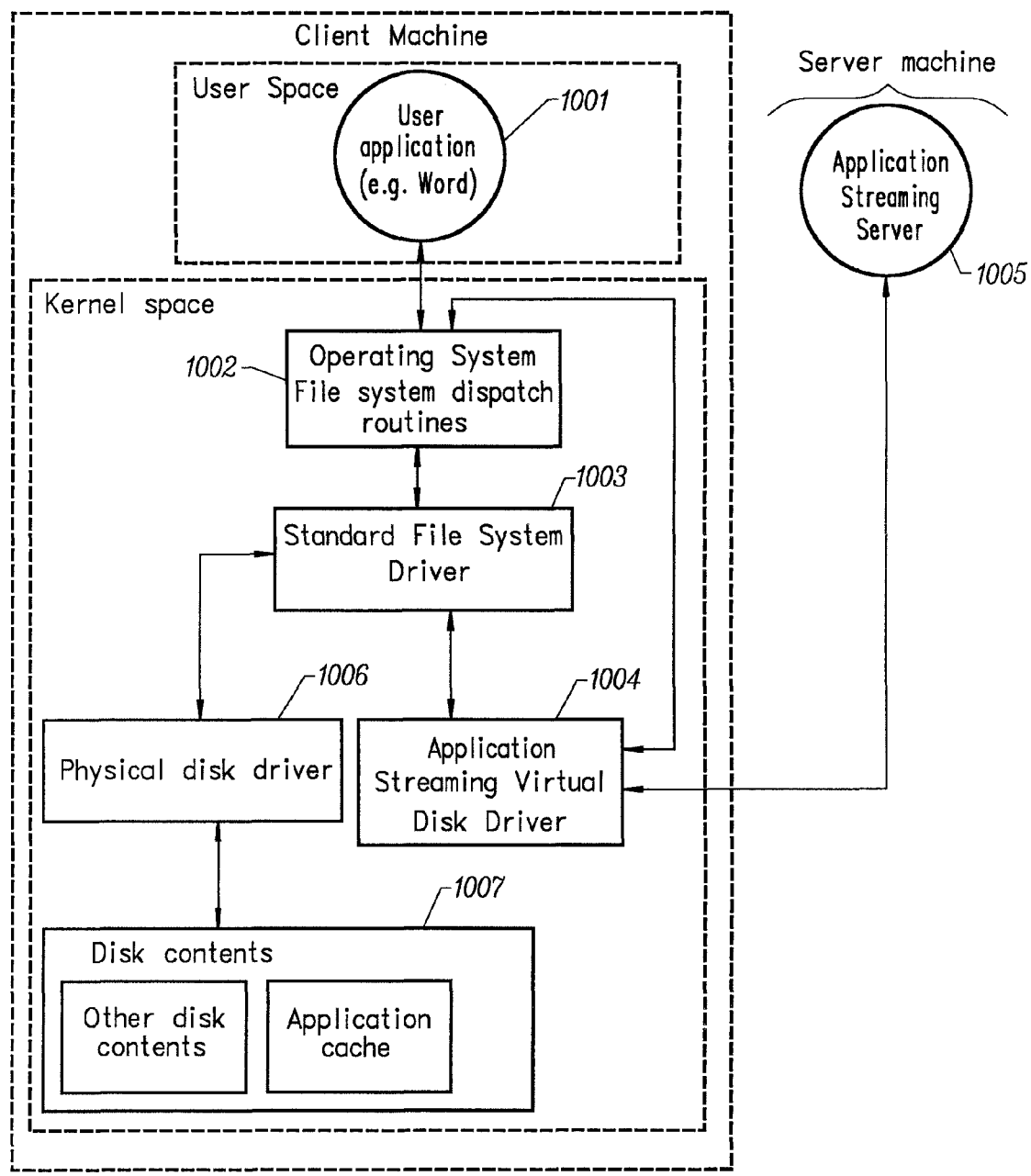
FIG. 10 is a block schematic diagram showing the application streaming software consisting of a streaming block driver according to the invention.
Figure 11:
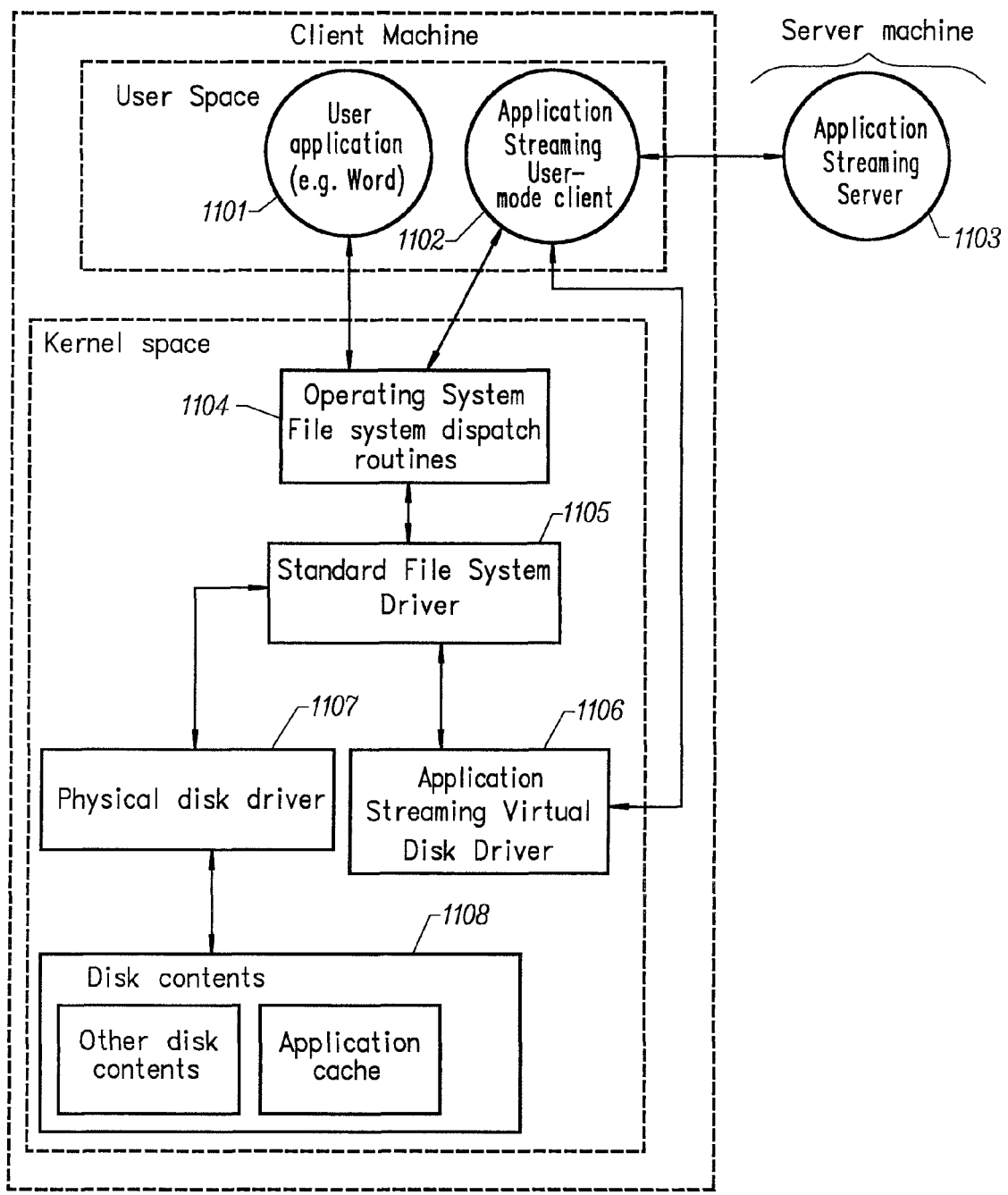
FIG. 11 is a block schematic diagram showing the application streaming software has been divided into a disk driver and a user mode client according to the invention.

As shown in FIGS. 10 and 11, the mechanism for streaming of application code and data may be a block driver 1004, 1106. This approach is an alternative to that represented by FIGS. 8 and 9.

With respect to FIG. 10, the application streaming software consists of a streaming block driver 1004. This block driver 1004 provides the abstraction of a physical disk to a native file system 1003 already installed on the client operating system 1002. The driver 1004 receives requests for physical block reads and writes, which it satisfies out of a cache on a standard file system 1003 that is backed by a physical disk drive 1006, 1007. Requests that cannot be satisfied by the cache go to the streaming application server 1005, as before.

Referring to FIG. 11, the application streaming software has been divided into a disk driver 1106 and a user mode client 1102. In a manner similar to that of FIG. 9, the disk driver 1106 sends all requests it gets to the user-mode client 1102, which satisfies them out of the cache 1107, 1108 or by going to the application streaming server 1103.

The persistent cache may be encrypted with a key not permanently stored on the client to prevent unauthorized use or duplication of application code or data. Traditional network file systems do not protect against the unauthorized use or duplication of file system data.

Figure 12:
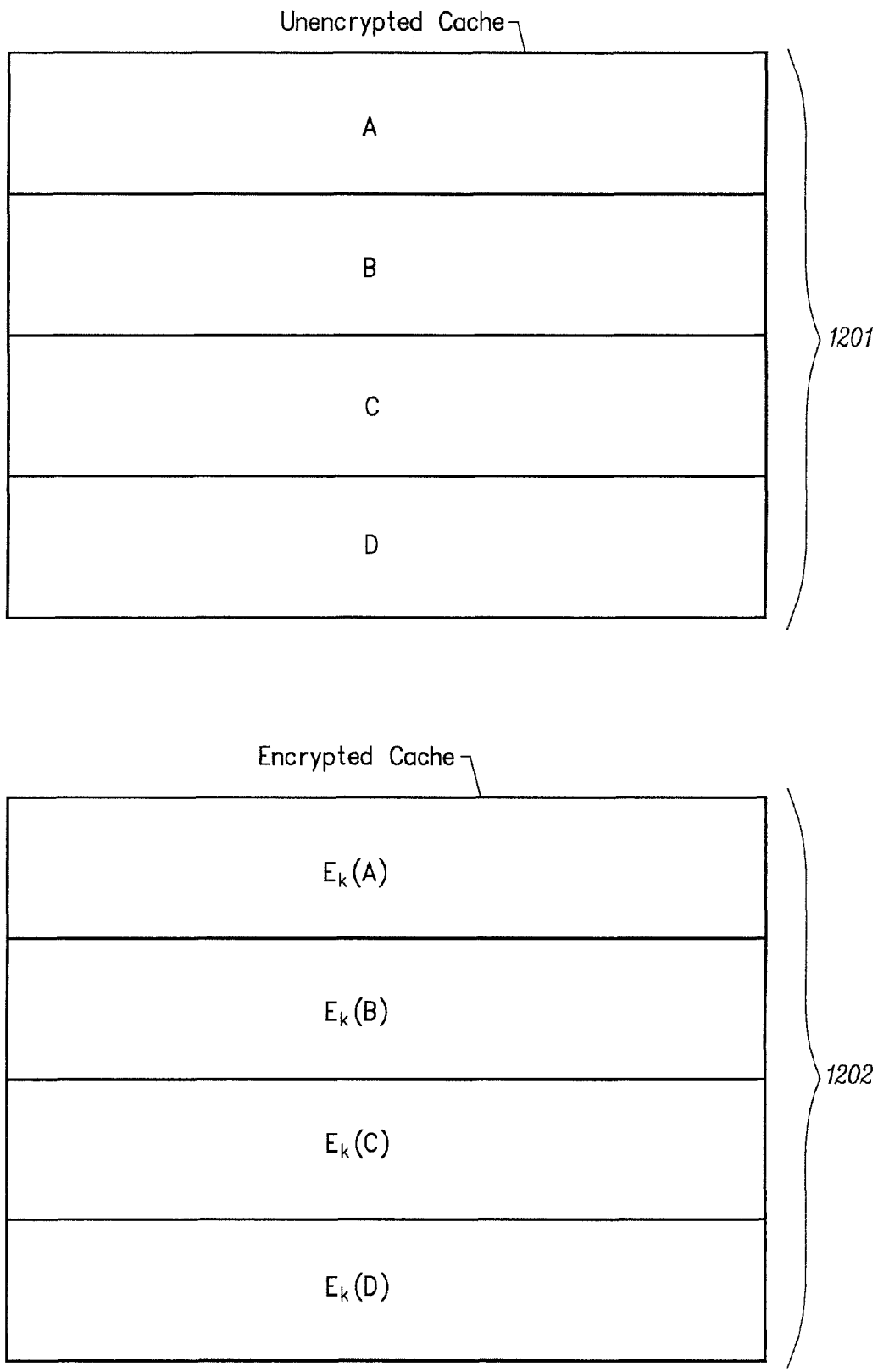
FIG. 12 is a block schematic diagram showing the unencrypted and encrypted client caches according to the invention.

With respect to FIG. 12, unencrypted and encrypted client caches. A, B, C, and D 1201 representing blocks of application code and data in their natural form are shown. $E_k(X)$ represents the encryption of block X with key k 1202. Any encryption algorithm may be used. The key k is sent to the client upon application startup, and it is not stored in the application's persistent storage.

Client-initiated prefetching of application code and data helps to improve interactive application performance. Traditional network file systems have no prefetching or simple locality based prefetching.

Figure 13:
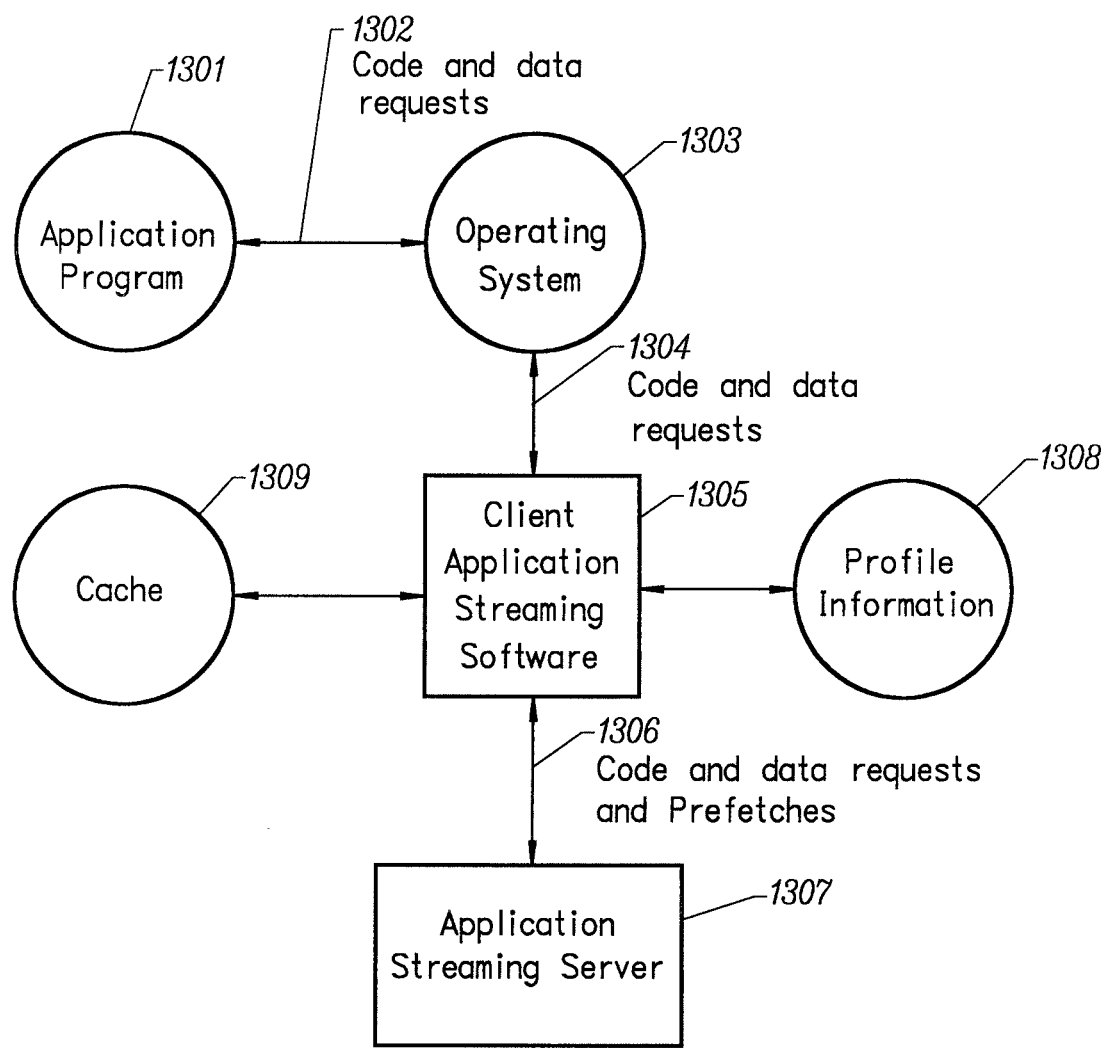
FIG. 13 is a block schematic diagram showing an application generating a sequence of code or data requests to the operating system according to the invention.

Referring to FIG. 13, the application 1301 generates a sequence of code or data requests 1302 to the operating system (OS) 1303. The OS 1303 directs these 1304 to the client application streaming software 1305. The client software 1305 will fetch the code or data 1306 for any requests that do not hit in the cache from the server 1307, via the network. The client software 1305 inspects these requests and consults the contents of the cache 1309 as well as historic information about application fetching patterns 1308. It will use this information to request additional blocks of code- and data that it expects will be needed soon. This mechanism is referred to as "pull prefetching."

Server-initiated prefetching of application code and data helps to improve interactive application performance. Traditional network file systems have no prefetching or simple locality based prefetching.

Figure 14:
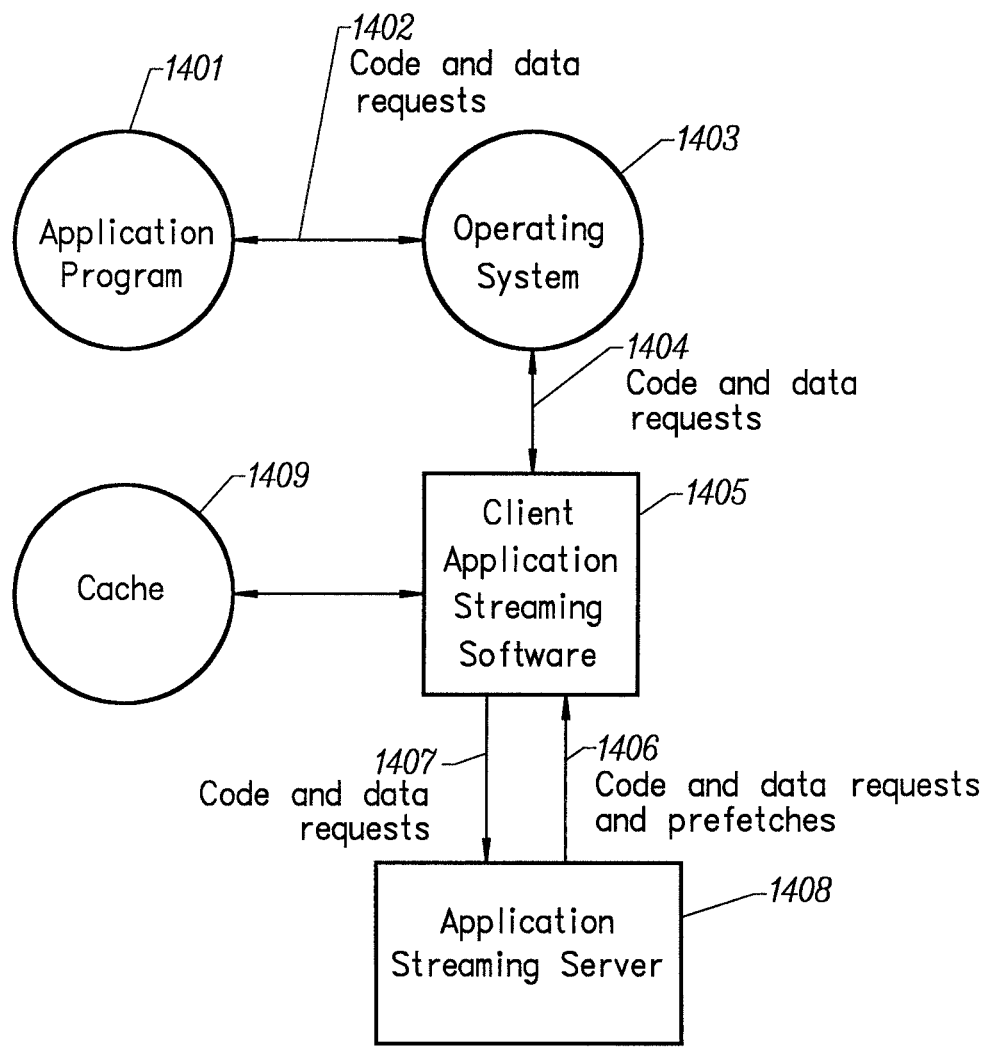
FIG. 14 is a block schematic diagram showing server-based prefetching according to the invention.

With respect to FIG. 14, the server-based prefetching is shown. As in FIG. 13, the client application streaming software 1405 makes requests for blocks 1407 from the application streaming server 1408. The server 1408 examines the patterns of requests made by this client and selectively returns to the client additional blocks 1406 that the client did not request but is likely to need soon. This mechanism is referred to as "push prefetching."

A client-to-client communication mechanism allows local application customization to travel from one client machine to another without involving server communication. Some operating systems have a mechanism for copying a user's configuration and setup to another machine. However, this mechanism typically doesn't work outside of a single organization's network, and usually will copy the entire environment, even if only the settings for a single application are desired.

Figure 15:
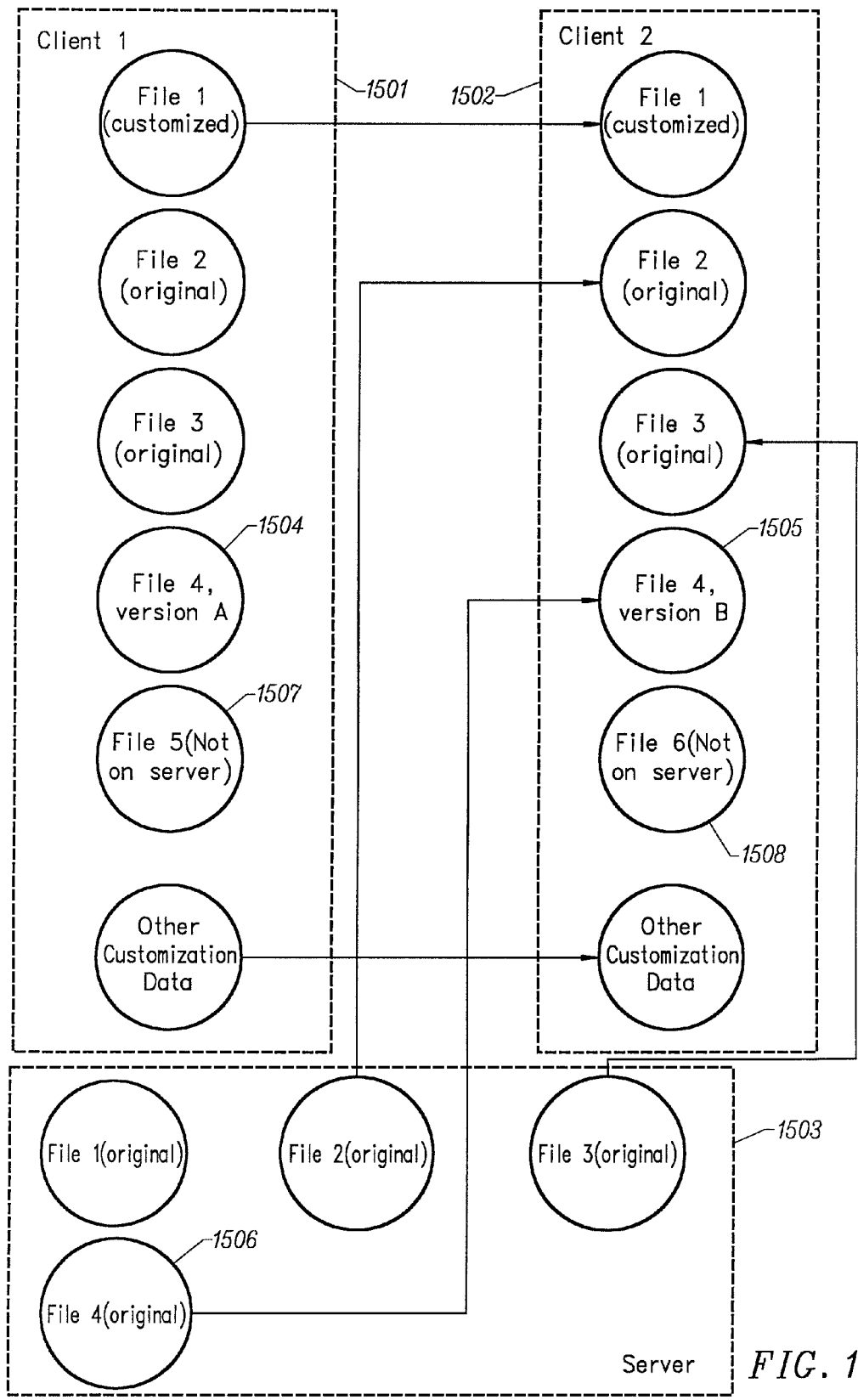
FIG. 15 is a block schematic diagram showing a client-to-client communication mechanism that allows local application customization to travel from one client machine to another without involving server communication according to the invention.

Referring to FIG. 15, a client-to-client mechanism is demonstrated. When a user wishes to run an application on a second machine, but wishes to retain customizations made previously on the first, the client software will handle this by contacting the first machine to retrieve customized files and other customization data. Unmodified files will be retrieved as usual from the application streaming server.

Here, File 4 exists in three different versions. The server 1503 provides one version of this file 1506, client 1 1501 has a second version of this file 1504, and client 2 1502 has a third version 1505. Files may be modified differently for each client.

The clients may also contain files not present on the server or on other clients. File 5 1507 is one such file; it exists only on client 1 1501. File 6 1508 only exists on client 2 1502.

Local Customization

A local copy-on-write file system allows some applications to write configuration or initialization files where they want to without rewriting the application, and without disturbing the local customization of other clients. Installations of applications on file servers typically do not allow the installation directories of applications to be written, so additional reconfiguration or rewrites of applications are usually necessary to allow per-user customization of some settings.

Figure 16:
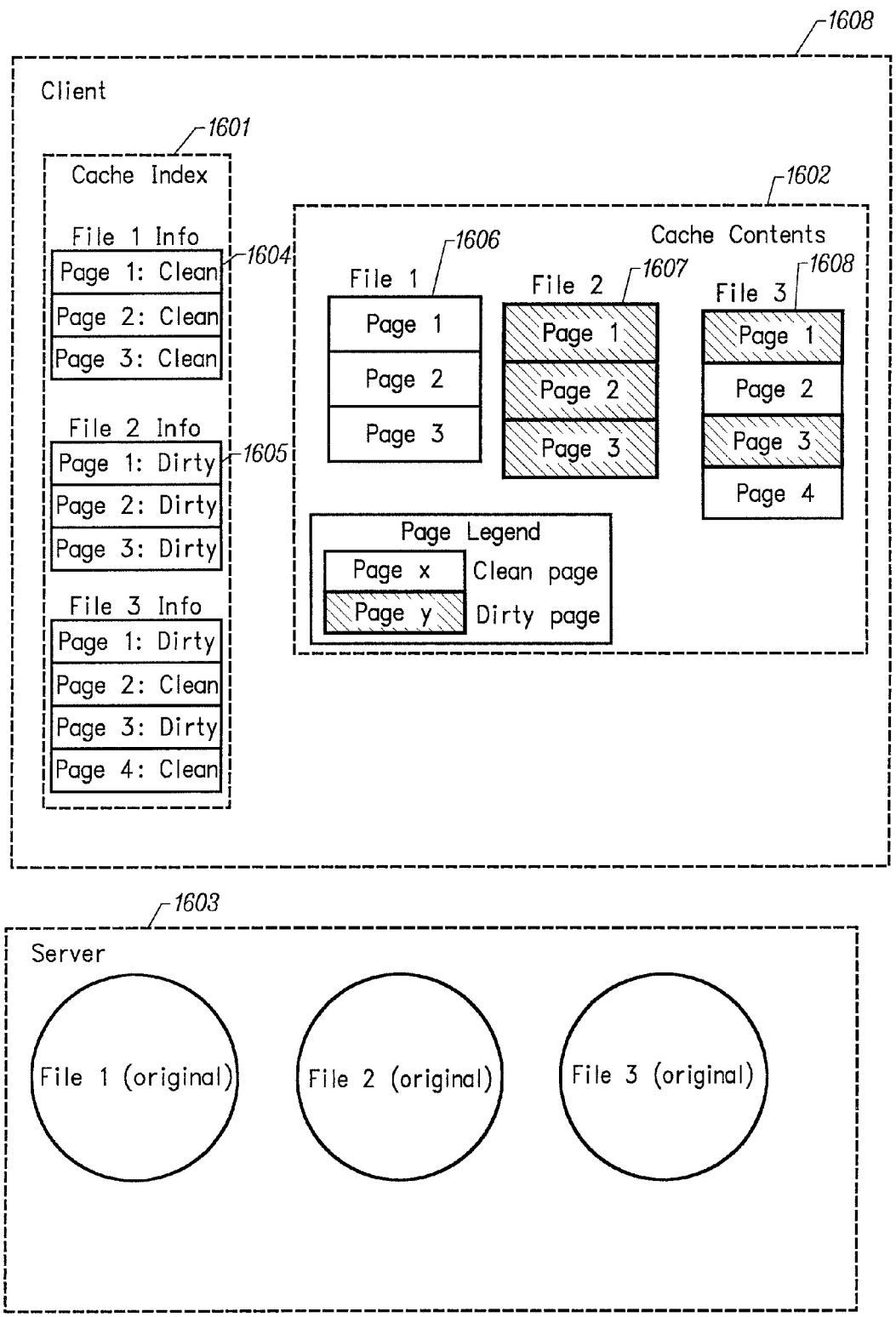
FIG. 16 is a block schematic diagram showing a client cache with extensions for supporting local file customization according to the invention.

With respect to FIG. 16, the cache 1602 with extensions for supporting local file customization is shown. Each block of data in the cache is marked as "clean" 1604 or "dirty" 1605. Pages marked as dirty have been customized by the client 1609, and cannot be removed from the cache 1602 without losing client customization. Pages marked as clean may be purged from the cache 1602, as they can be retrieved again from the server 1603. The index 1601 indicates which pages are clean and dirty. In FIG. 16, clean pages are white, and dirty pages are shaded. File 1 1606 contains only clean pages, and thus may be entirely evicted from the cache 1602. File 2 1607 contains only dirty pages, and cannot be removed at all from the cache 1602. File 3 1608 contains some clean and some dirty pages 1602. The clean pages of File 3 1608 may be removed from the cache 1602, while the dirty pages must remain.

Selective Write Protection

The client streaming software disallows modifications to certain application files. This provides several benefits, such as preventing virus infections and reducing the chance of accidental application corruption. Locally installed files are typically not protected in any way other than conventional backup. Application file servers may be protected against writing by client machines, but are not typically protected against viruses running on the server itself. Most client file systems allow files to be marked as read-only, but it is typically possible to change a file from read-only to read-write. The client application streaming software will not allow any data to be written to files that are marked as not modifiable. Attempts to mark the file as writeable will not be successful.

Error Detection and Correction

The client streaming software maintains checksums of application code and data and can repair damaged or deleted files by retrieving another copy from the application streaming server. Traditional application delivery mechanisms do not make any provisions for detecting or correcting corrupted application installs. The user typically detects a corrupt application, and the only solution is to completely reinstall the application. Corrupt application files are detected by the invention automatically, and replacement code or data are invisibly retrieved by the client streaming software without user intervention.

When a block of code or data is requested by the client operating system, the client application streaming software will compute the checksum of the data block before it is returned to the operating system. If this checksum does not match that stored in the cache, the client will invalidate the cache entry and retrieve a fresh copy of the page from the server.

File Identifiers

Applications may be patched or upgraded via a change in the root directory for that application. Application files that are not affected by the patch or upgrade need not be downloaded again. Most existing file systems do not cache files locally.

Each file has a unique identifier (number). Files that are changed or added in the upgrade are given new identifiers never before used for this application. Files that are unchanged keep the same number. Directories whose contents change are also considered changes. If any file changes, this will cause its parent to change, all the way up to the root directory.

Upgrade Mechanism

When the client is informed of an upgrade, it is told of the new root directory. It uses this new root directory to search for files in the application. When retrieving an old file that hasn't changed, it will find the old file identifier, which can be used for the existing files in the cache. In this way, files that do not change can be reused from the cache without downloading them again. For a file that has changed, when the file name is parsed, the client will find a new file number. Because this file number did not exist before the upgrade, the client will not have this file in the cache, and will stream the new file contents when the file is freshly accessed. This way it always gets the newest version of files that change.

The client application streaming software can be notified of application upgrades by the application streaming server. These upgrades can be marked as mandatory, in which case the client software will force the application to be upgraded.

The client will contact the application streaming server when it starts the application. At this time, the streaming application server can inform the client of any upgrades. If the upgrade is mandatory, the client will be informed, and it will automatically begin using the upgraded application by using the new root directory.

Multicast Technique

A broadcast or multicast medium may be used to efficiently distribute applications from one application streaming server to multiple application streaming clients. Traditional networked application delivery mechanisms usually involve installing application code and data on a central server and having client machines run the application from that server. The multicast mechanism allows a single server to broadcast or multicast the contents of an application to many machines simultaneously. The client machines will receive the application via the broadcast and save it in their local disk cache. The entire application can be distributed to a large number of client machines from a single server very efficiently.

The multicast network is any communication mechanism that has broadcast or multicast capability. Such media include television and radio broadcasts and IP multicasting on the Internet. Each client that is interested in a particular application may listen to the multicast media for code and data for that application. The code and data are stored in the cache for later use when the application is run.

These client techniques can be used to distribute data that changes rarely. Application delivery is the most appealing use for these techniques, but they could easily be adopted to distribute other types of slowly changing code and data, such as static databases.

Load Balancing and Fault Tolerance for Streamed Applications

Figure 17:
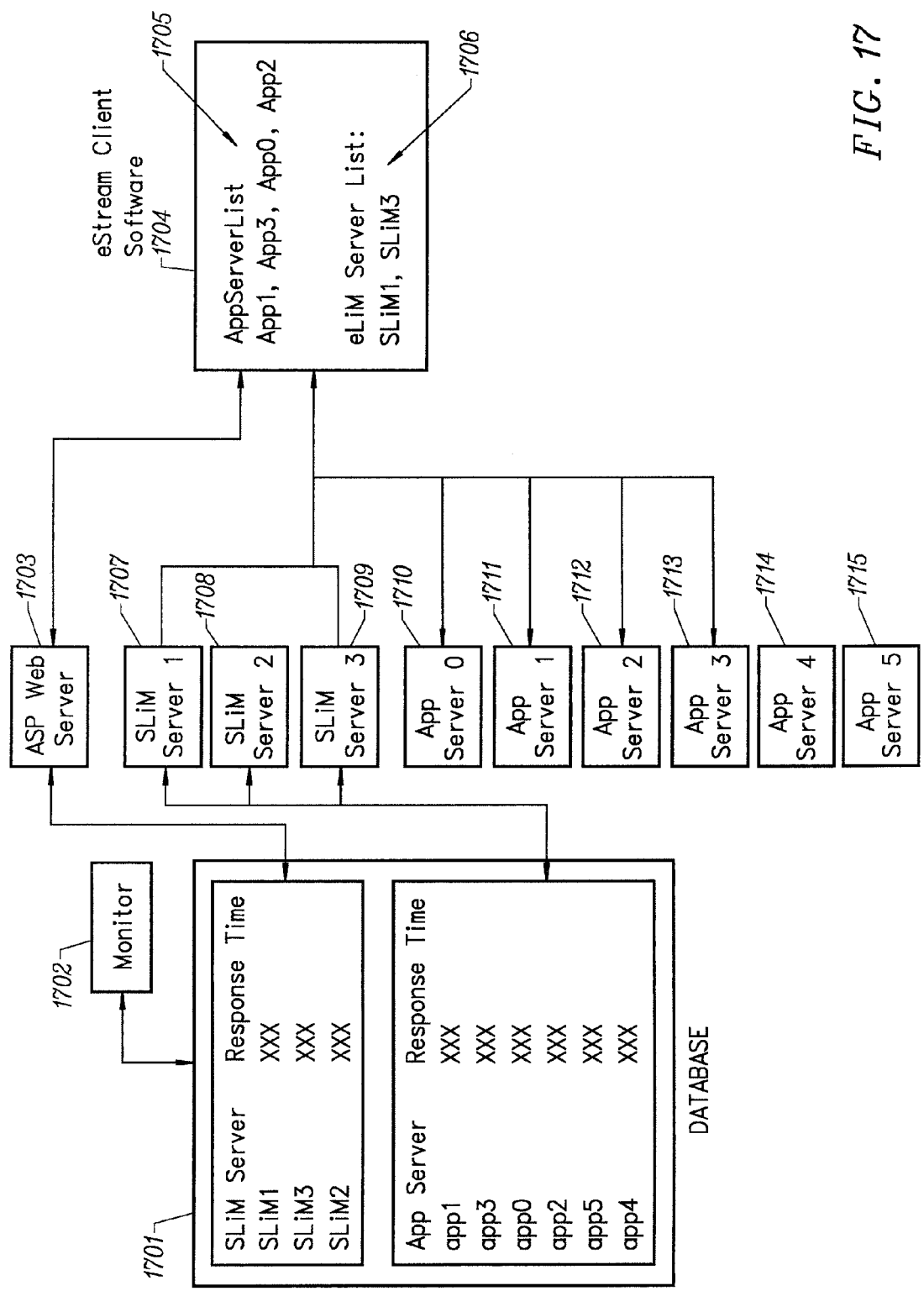
FIG. 17 is a block schematic diagram showing aspects of a preferred embodiment of the invention related to load balancing and hardware fail over according to the invention.

This section focuses on load balancing (and thereby scalability) and hardware fail over. Throughout this discussion reference should be made to FIG. 17. Load balancing and fault tolerance are addressed in the invention by using a smart client and smart server combination. A preferred embodiment of the invention that implements these features includes three types of servers (described below): app servers; SLM servers; and an ASP Web server. These are organized as follows:

1: ASP Web server 1703—This is the Web server that the user goes to for subscribing to applications, creating accounts etc. Compared to the other two types of servers it is characterized by: lowest traffic, fewest number of them, & least likely to go down.

2: SLM Servers 1707—subscription license manager servers—These keep track of which user has subscribed to what applications under what license etc. Compared to the other two types of servers it is characterized by: medium traffic, manageable number, and less likely to go down.

3: App Servers 1710—These are the servers to which the users go to for application pages. Compared to the other two types of servers it is characterized by: highest traffic, most number of them, most likely to go down either due to hardware failure or application re-configuration.

Server Lists

Clients 1704 subscribe and unsubscribe to applications via the ASP Web server 1703. At that point, instead of getting a primary and a secondary server that can perform the job, the ASP Web server 1703 gives them a non-prioritized list of a large number of SLM servers 1706 that can do the job. When the application starts to run, each client contacts the SLM servers 1707, 1708, 1709 and receive its application server list 1705 that can serve the application in question and also receive the access tokens that can be used to validate themselves with the application servers 1710-1715. All access tokens have an expiration time after which they need to be renewed.

Server Selection

Having gotten a server list for each type of server 1705, 1706, the client 1704 will decide which specific server to send its request to. In a basic implementation, a server is picked randomly from the list, which will distribute the clients load on the servers very close to evenly. An alternative preferred implementation will do as follows:

a) Clients will initially pick servers from the list randomly, but they will also keep track of the overall response time they get from each request; and b) As each client learns about response times for each server, it can be more intelligent (rather than random) and pick the most responsive server. It is believed that the client is better suited at deciding which server is most responsive because it can keep track of the round trip response time.

Client-Side Hardware Fail Over

The server selection logic provides hardware failover in the following manner:

a) If a server does not respond, i.e., times out, the client 1704 will pick another server from its list 1705, 1706 and re-send the request. Since all the servers in the client's server list 1705, 1706 are capable of processing the client's request, there are no questions of incompatibility.

b) If a SAS client 1704 gets a second time out, i.e., two servers are down, it re-sends the request to multiple servers from its list 1705, 1706 in parallel. This approach staggers the timeouts and reduces the overall delay in processing a request.

c) In case of a massive hardware failure, all servers in the client's list 1705, 1706 may be down. At this point, the client will use the interfaces to refresh its server list. This is where the three tiers of servers become important:

1) If the client 1704 want to refresh its App server list 1705, it will contact an SLM server 1707, 1709 in its list of SLM servers 1706. Again, the same random (SLM) server selection order is utilized here. Most of the time, this request will be successful and the client will get an updated list of app servers.

2) If for some reason all of the SLM servers 1707, 1709 in the client's list 1706 are down, it will contact the ASP Web server 1703 to refresh its SLM server list 1706.

This 3-tiered approach significantly reduces the impact of a single point of failure—the ASP Web server 1703, effectively making it a fail over of a fail over.

Server Load Balancing

In a preferred embodiment of the invention, a server side monitor 1702 keeps track of the overall health and response times for each server request. The Monitor performs this task for all Application and SLM servers. It posts prioritized lists of SLM servers and app servers 1701 that can serve each of the apps in a database shared by the monitor 1702 and all servers. The monitor's algorithm for prioritizing server lists is dominated by the server's response time for each client request. If any servers fail, the monitor 1702 informs the ASP 1703 and removes it from the server list 1701. Note that the server lists 1705, 1706 that the client 1704 maintains are subsets of lists the monitor 1702 maintains in a shared database 1701.

Since all servers can access the shared database 1701, they know how to 'cut' a list of servers to a client. For example, the client starts to run an SAS application or it wants to refresh its app server list: It will contact an SLM server and the S L M server will access the database 1701 and cut a list of servers that are most responsive (from the server's prospective).

In this scheme, the server monitor 1702 is keeping track of what it can track the best: how effectively servers are processing client requests (server's response time). It does not track the network propagation delays etc. that can significantly contribute to a client's observed response time.

ASP Managing Hardware Failovers

The foregoing approaches provide an opportunity for ASPs to better manage massive scale failures. Specifically, when an ASP 1703 realizes that massive numbers of servers are down, it can allocate additional resource on a temporary basis. The ASP 1703 can update the central database 1701 such that clients will receive only the list that the ASP 1703 knows to be up and running. This includes any temporary resources added to aid the situation. A particular advantage of this approach is that ASP 1703 doesn't need special actions, e.g., emails or phone support, to route clients over to these temporary resources; the transition happens automatically.

Handling Client Crashes and Client Evictions

To prevent the same user from running the same application from multiple machines, the SLM servers 1707, 1708, 1709 track what access tokens have been handed to what users. The SAS file system tracks the beginning and end of applications. The user's SAS client software asks for an access token from the SLM servers 1707, 1708, 1709 at the beginning of an application if it already does not have one and it releases the access token when the application ends. The SLM server makes sure that at a given point only one access token has been given to a particular user. In this manner, the user can run the application from multiple machines, but only from one at a particular time. However, if the user's machine crashes before the access token has been relinquished or if for some reason the ASP 1703 wants to evict a user, the access token granted to the user must be made invalid. To perform this, the SLM server gets the list of application servers 1705 that have been sent to the client 1704 for serving the application and sends a message to those application servers 1710, 1711, 1713, 1714 to stop serving that particular access token. This list is always maintained in the database so that every SLM server can find out what list is held by the user's machine. The application servers before servicing any access token must check with this list to ensure that the access token has not become invalid. Once the access token expires, it can be removed from this list.

Server-Side Performance Optimization

This section describes approaches that can be taken to reduce client-side latency (the time between when an application page is needed and when it is obtained) and improve Application Server scalability (a measure of the number of servers required to support a given population of clients). The former directly affects the perceived performance of an application by an end user (for application features that are not present in the user's cache), while the latter directly affects the cost of providing application streaming services to a large number of users.

Application Server Operation

The basic purpose of the Application Server is to return Application File Pages over the network as requested by a client the Application Server holds a group of Stream Application Sets from which it obtains the Application File Pages that match a client request. The Application Server is analogous to a typical network file system (which also returns file data), except it is optimized for delivery of Application file data, i.e., code or data that belong directly to the application, produced by the software provider, as opposed to general user file data (document files and other content produced by the users themselves). The primary differences between the Application Server and a typical network file system are:

1. The restriction to handle only Application file data allows the Application Server to only service read requests, with writes being disallowed or handled on the client itself in a copy-on-write manner;

2. Access checks occur at the application level, that is a client is given all-or-none access to files for a given software application;

3. The Application Server is designed to operate across the Internet, as opposed to typical network file systems, which are optimized to run over LANs. This brings up additional requirements of handling server failures, maximizing network bandwidth and minimizing latency, and handling security; and 4. The Application Server is application-aware, unlike typical network file systems, which treat all software application files the same as all other files. This allows the Application Server to use and collect per-application access profile information along with other statistics.

To service a client request, the Application Server software component keeps master copies of the full Application Stream Sets on locally accessible persistent storage. In main memory, the Application Server maintains a cache of commonly accessed Application File Pages. The primary steps taken by the Application Server to service a client request are:

1. Receive and decode the client request;
2. Validate the client's privilege to access the requested data, e.g., by means of a Kerberos-style ticket issued by a trusted security service;
3. Look up the requested data in the main memory cache, and failing that, obtain it from the master copy on disk while placing it in the cache; and
4. Return the File Pages to the client over the network.

The techniques used to reduce latency and improve server scalability (the main performance considerations) are described below.

Server Optimization Features

Read-Only File System for Application Files

Because virtually all application files (code and data) are never written to by users, virtually the entire population of users have identical copies of the application files. Thus a system intending to deliver the application files can distribute a single, fixed image across all servers. The read-only file system presented by the Application Server represents this sharing, and eliminates the complexities of replication management, e.g. i coherency, that occur with traditional network file systems. This simplification enables the Application Servers to respond to requests more quickly, enables potential caching at intervening nodes or sharing of caches across clients in a peer-to-peer fashion, and facilitates fail over, since with the read-only file system the Application File Pages as identified by the client (by a set of unique numbers) will always globally refer to the same content in all cases.

Per-page Compression

Figure 18:
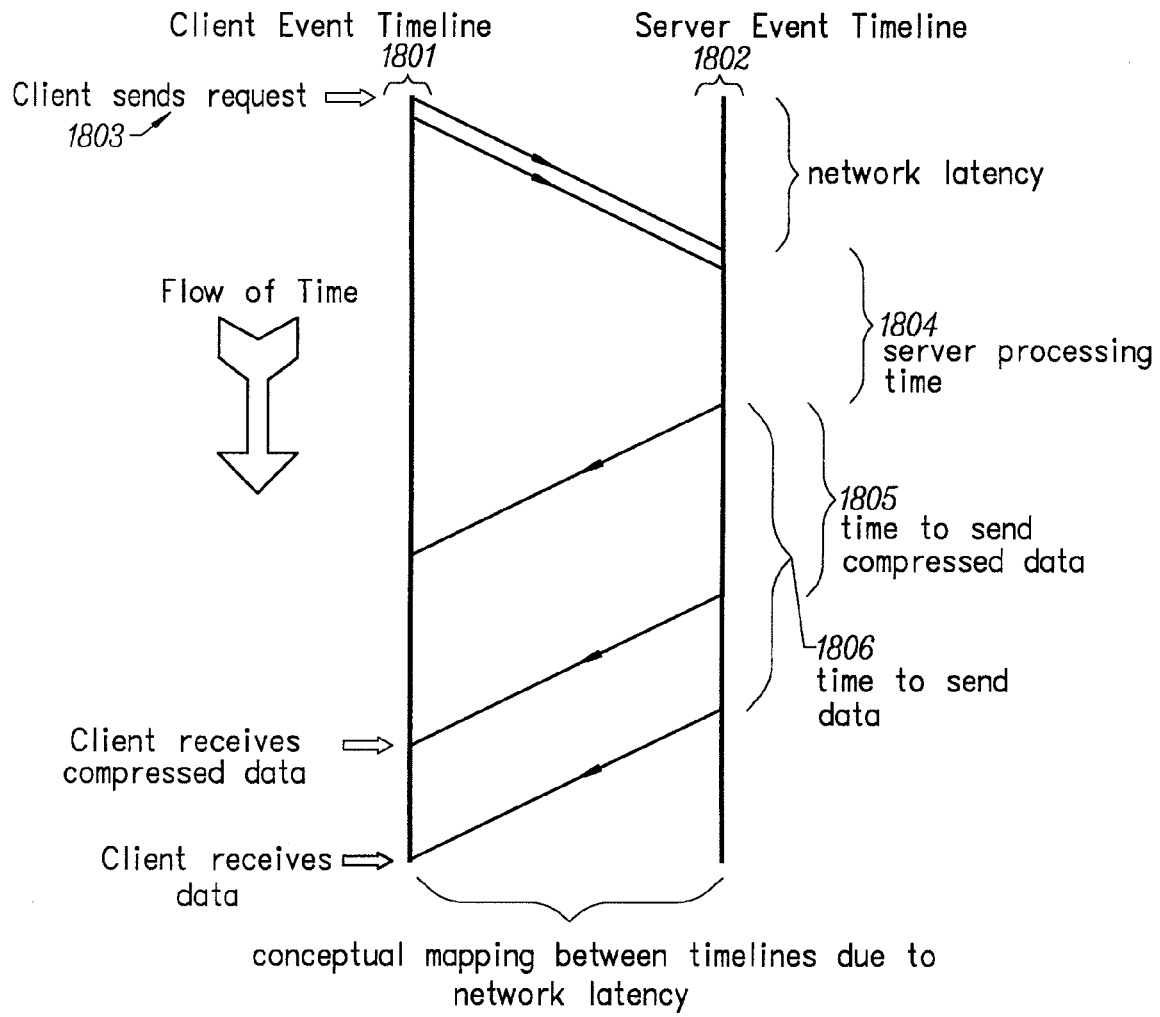
FIG. 18 is a block schematic diagram showing the benefits to the use of compression in the streaming of Application File Pages according to the invention.

Overall latency observed by the client can be reduced under low-bandwidth conditions by compressing each Application File Page before sending it. Referring to FIG. 18, the benefits of the use of compression in the streaming of Application File Pages, is illustrated. The client 1801 and server 1802 timelines are shown for a typical transfer of data versus the same data sent in a compressed form. The client requests the data from the server 1803. The server processes the request 1804 and begins sending the requested data. The timelines then diverge due to the ability to stream the compressed data 1805 faster than the uncompressed data 1806.

Figure 19:
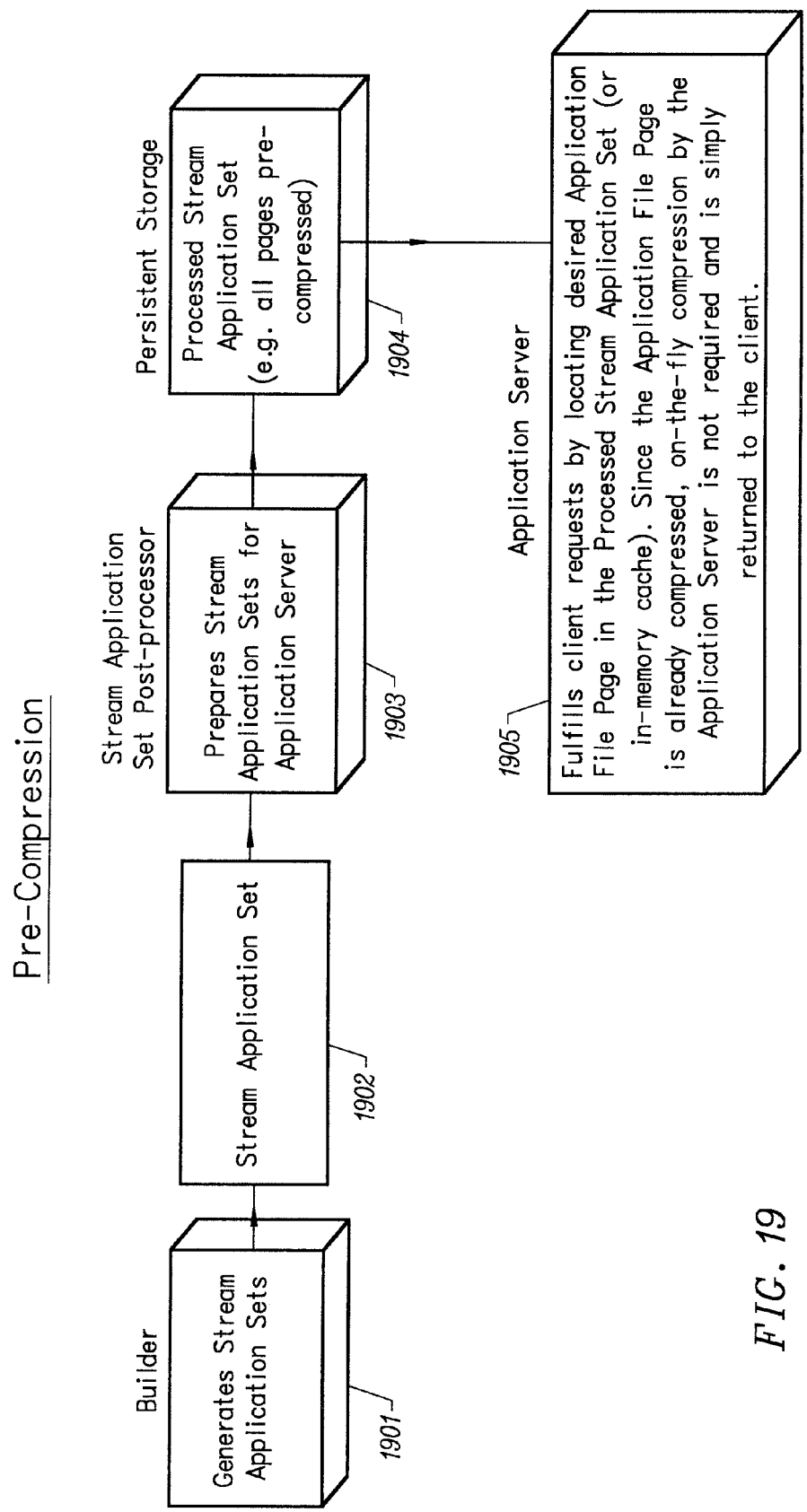
FIG. 19 is a block schematic diagram showing pre-compression of Application File Pages according to the invention.

With respect to FIG. 19, the invention's pre-compression of Application File Pages process is shown. The Builder generates the stream application sets 1901, 1902 which are then pre-compressed by the Stream Application Set Post-Processor 1903. The Stream Application Set Post-Processor 1903 stores the compressed application sets in the persistent storage device 1904. Any client requests for data are serviced by the Application Server which sends the pre-compressed data to the requesting client 1905. The reduction in size of the data transmitted over the network reduces the time to arrival (though at the cost of some processing time on the client to decompress the data). When the bandwidth is low relative to processing power, e.g., 256 kbps with a Pentium-III-600, this can reduce latency significantly.

Page-Set Compression

Figure 20:
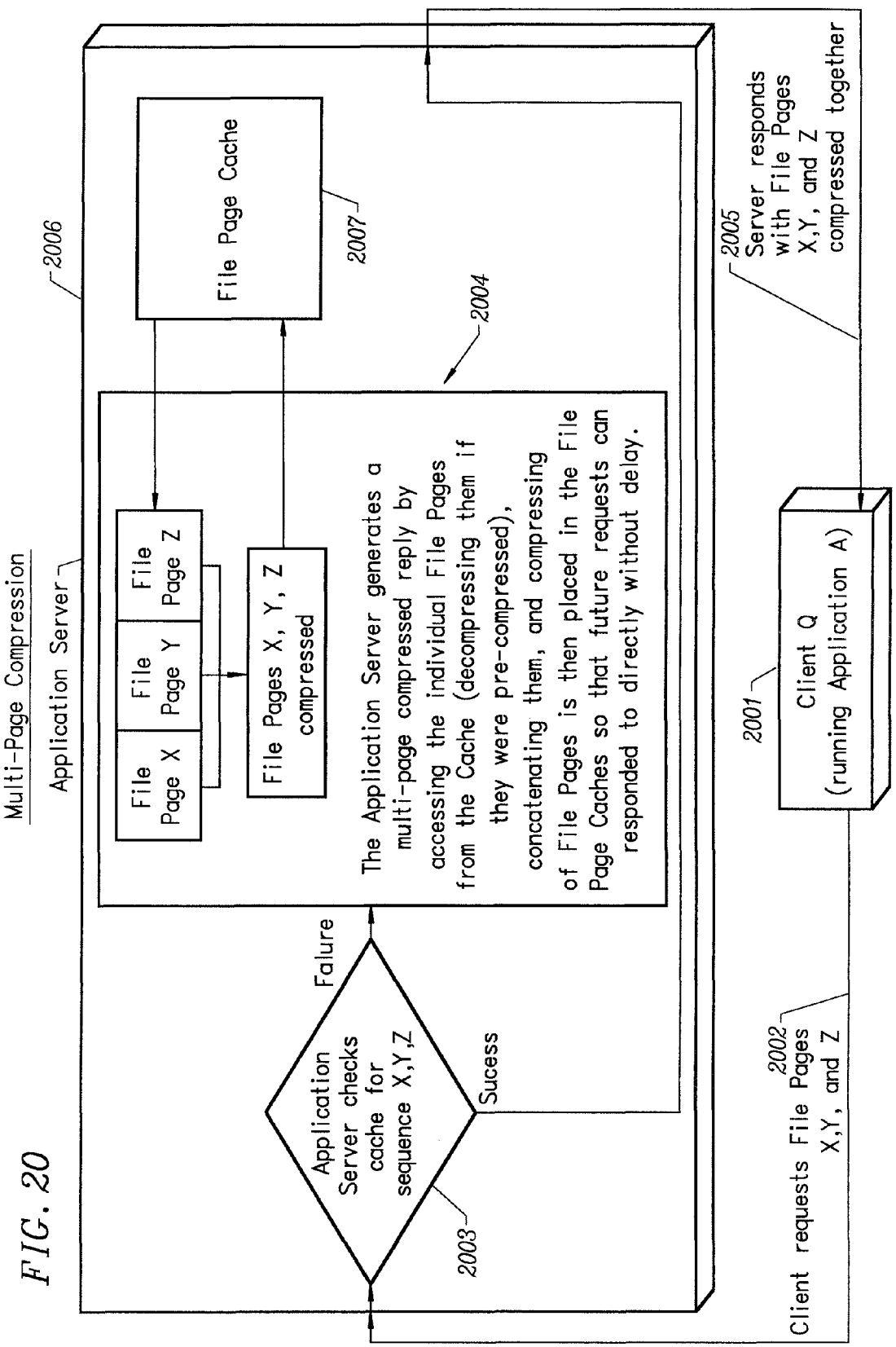
FIG. 20 is a block schematic diagram showing multi-page compression of Application File Pages according to the invention.

When pages are relatively small, matching the typical virtual memory page size of 4 kB, adaptive compression algorithms cannot deliver the same compression ratios that they can for larger blocks of data, e.g., 32 kB or larger. Referring to FIG. 20, when a client 2001 requests multiple Application File Pages at one time 2002, the Application Server 2006 can concatenate all the requested pages and compress the entire set at once 2004, thereby further reducing the latency the client will experience due to the improved compression ratio. If the pages have already been compressed 2003, then the request is fulfilled from the cache 2007 where the compressed pages are stored. The server 2006 responds to the client's request through the transfer of the compressed pages 2005.

Post-Processing of Stream Application Sets

The Application Server may want to perform some post processing of the raw Stream Application Sets in order to reduce its runtime-processing load, thereby improving its performance. One example is to pre-compress all Application File Pages contained in the Stream Application Sets, saving a great deal of otherwise repetitive processing time. Another possibility is to rearrange the format to suit the hardware and operating system features, or to reorder the pages to take advantage of access locality.

Static and Dynamic Profiling

Figure 21:
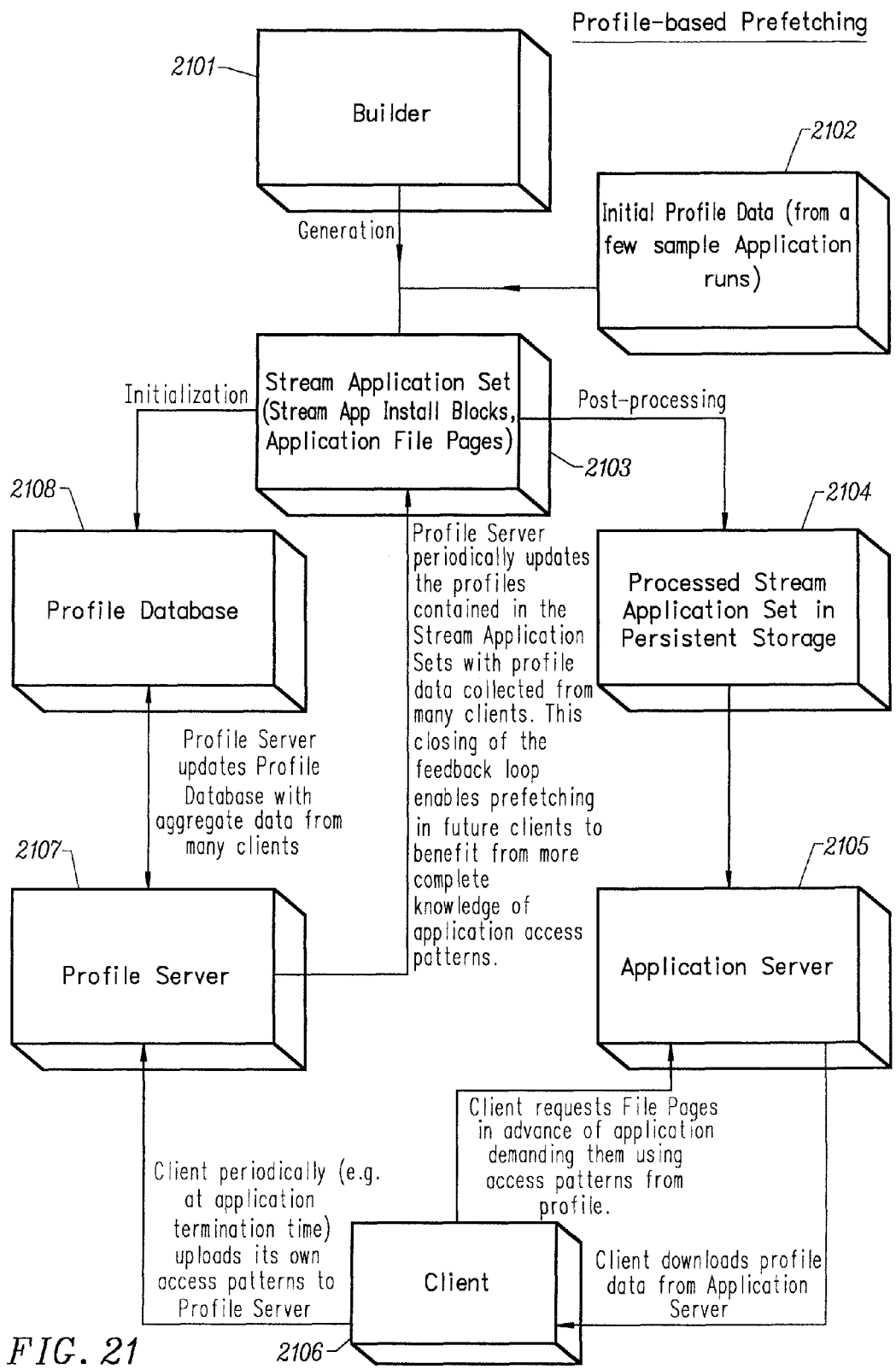
FIG. 21 is a block schematic diagram showing profile-based prefetching according to the invention.

With respect to FIG. 21, since the same application code is executed in conjunction with a particular Stream Application Set 2103 each time, there will be a high degree of temporal locality of referenced Application File Pages, e.g., when a certain feature is invoked, most if not all the same code and data is referenced each time to perform the operation. These access patterns can be collected into profiles 2108, which can be shipped to the client 2106 to guide its prefetching (or to guide server-based 2105 prefetching), and they can be used to pre-package groups of Application File Pages 2103, 2104 together and compress them offline as part of a post-processing step 2101, 2102, 2103. The benefit of the latter is that a high compression ratio can be obtained to reduce client latency without the cost of runtime server processing load (though only limited groups of Application File Pages will be available, so requests which don't match the profile would get a superset of their request h terms of the pre-compressed groups of Application File Pages that are available).

Fast Server-Side Client Privilege Checks

Figure 22:
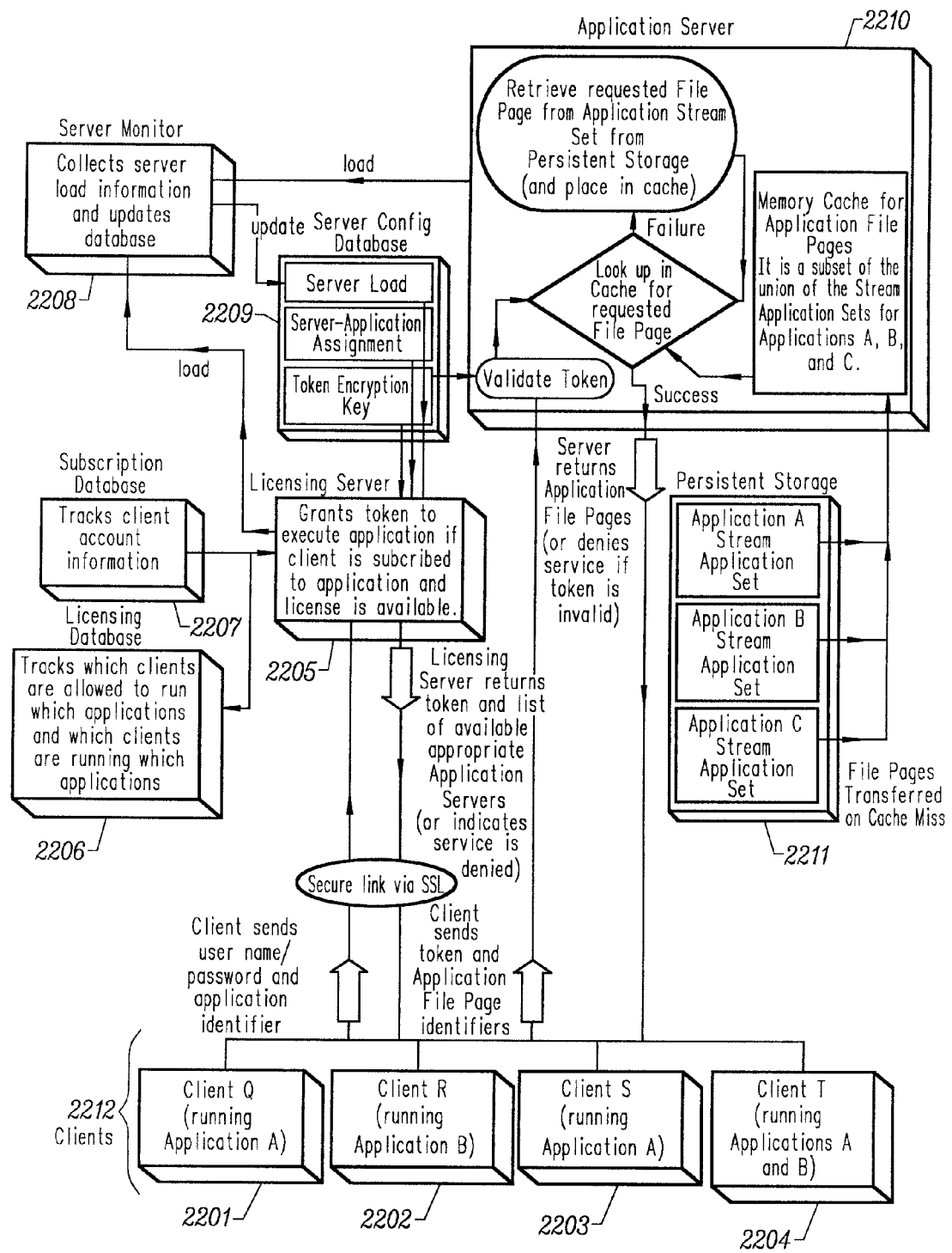
FIG. 22 is a block schematic diagram showing the use of tokens and a License Server according to the invention.

Referring to FIG. 22, having to track individual user's credentials, i.e., which Applications they have privileges to access, can limit server scalability since ultimately the per-user data must be backed by a database, which can add latency to servicing of user requests and can become a central bottleneck. Instead, a separate License Server 2205 is used to offload per-user operations to grant privileges to access application data, and thereby allow the two types of servers 2205, 2210 to scale independently. The License Server 2205 provides the client an Access Token (similar to a Kerberos ticket) that contains information about what application it represents rights for along with an expiration time. This simplifies the operations required by the Application Server 2210 to validate a client's privileges 2212. The Application Server 2210 needs only to decrypt the Access Token (or a digest of it) via a secret key shared 2209 with the License Server 2205 (thus verifying the Token is valid), then checking the validity of its contents, e.g., application identifier, and testing the expiration time. Clients 2212 presenting Tokens for which all checks pass are granted access. The Application Server 2210 needs not track anything about individual users or their identities, thus not requiring any database operations. To reduce the cost of privilege checks further, the Application Server 2210 can keep a list of recently used Access Tokens for which the checks passed, and if a client passes in a matching Access Token, the server need only check the expiration time, with no further decryption processing required.

Connection Management

Before data is ever transferred from a client to a server, the network connection itself takes up one and a half network round trips. This latency can adversely impact client performance if it occurs for every client request. To avoid this, clients can use a protocol such as HTTP 1.1, which uses persistent connections, i.e., connections stay open for multiple requests, reducing the effective connection overhead. Since the client-side file system has no knowledge of the request patterns, it will simply keep the connection open as long as possible. However, because traffic from clients may be bursty, the Application Server may have more open connections than the operating system can support, many of them being temporarily idle. To manage this, the Application Server can aggressively close connections that have been idle for a period of time, thereby achieving a compromise between the client's latency needs and the Application Server's resource constraints. Traditional network file systems do not manage connections in this manner, as LAN latencies are not high enough to be of concern.

Application Server Memory Usage/Load Balancing

File servers are heavily dependent on main memory for fast access to file data (orders of magnitude faster than disk accesses). Traditional file servers manage their main memory as cache of file blocks, keeping the most commonly accessed ones. With the Application Server, the problem of managing main memory efficiently becomes more complicated due to there being multiple servers providing a shared set of applications. In this case, if each server managed its memory independently, and was symmetric with the others, then each server would only keep those file blocks most common to all clients, across all applications. This would cause the most common file blocks to be in the main memory of each and every Application server, and since each server would have roughly the same contents in memory, adding more servers won't improve scalability by much, since not much more data will be present in memory for fast access. For example, if there are application A (accessed 50% of the time), application B (accessed 40% of the time), and application C (accessed 10% of the time), and application A and B together consume more memory cache than a single Application Server has, and there are ten Application Servers, then none of the Application Servers will have many blocks from C in memory, penalizing that application, and doubling the number of servers will improve C's performance only minimally. This can be improved upon by making the Application Servers asymmetric, in that a central mechanism, e.g., system administrator, assigns individual Application Servers different Application Stream Sets to provide, in accordance with popularity of the various applications. Thus, in the above example, of the ten servers, five can be dedicated to provide A, four to B, and one to C, (any extra memory available for any application) making a much more effective use of the entire memory of the system to satisfy the actual needs of clients. This can be taken a step further by dynamically (and automatically) changing the assignments of the servers to match client accesses over time, as groups of users come and go during different time periods and as applications are added and removed from the system. This can be accomplished by having servers summarize their access patterns, send them to a central control server, which then can reassign servers as appropriate.

Conversion of Conventional Applications to Enable Streamed Delivery and Execution The Streamed Application Set Builder is a software program. It is used to convert locally installable applications into a data set suitable for streaming over the network. The streaming-enabled data set is called the Streamed Application Set (SAS). This section describes the procedure used to convert locally installable applications into the SAS.

The application conversion procedure into the SAS consists of several phases. In the first phase, the Builder program monitors the installation process of a local installation of the desired application for conversion. The Builder monitors any changes to the system and records those changes in an intermediate data structure. After the application is installed locally, the Builder enters the second phase of the conversion. In the second phase, the Builder program invokes the installed application executable and obtains sequences of frequently accessed file blocks of this application. Both the Builder program and the client software use the sequence data to optimize the performance of the streaming process. Once the sequencing information is obtained, the Builder enters the final phase of the conversion. In this phase, the Builder gathers all data obtained from the first two phases and processes the data into the Streamed Application Set.

Detailed descriptions of the three phases of the Builder conversion process are described in the following sections. The three phases consist of installation monitoring (IM), application profiling (AP), and SAS packaging (SP). In most cases, the conversion process is general and applicable to all types of systems. In places where the conversion is OS dependent, the discussion is focused on the Microsoft Windows environment. Issues on conversion procedure for other OS environments are described in later sections.

Installation Monitoring (IM)

In the first phase of the conversion process, the Builder Installation Monitor (IM) component invokes the application installation program that installs the application locally. The IM observes all changes to the local computer during the installation. The changes may involve one or more of the following: changes to system or environment variables; and modifications, addition, or deletion of one or more files. The IM records all changes to the variables and files in a data structure to be sent to the Builder's Streamed Application Packaging component. In the following paragraphs, detailed description of the Installation Monitor is described for Microsoft Windows environment.

In Microsoft Windows system, the Installation Monitor (IM) component consists of a kernel-mode driver subcomponent and a user-mode subcomponent. The kernel-mode driver is hooked into the system registry and file system function interface calls. The hook into the registry function calls allows the IM to monitor system variable changes. The hook into the file system function calls enables the IM to observe file changes.

Installation Monitor Kernel-Mode Subcomponent (IM-KM)

Figure 23:
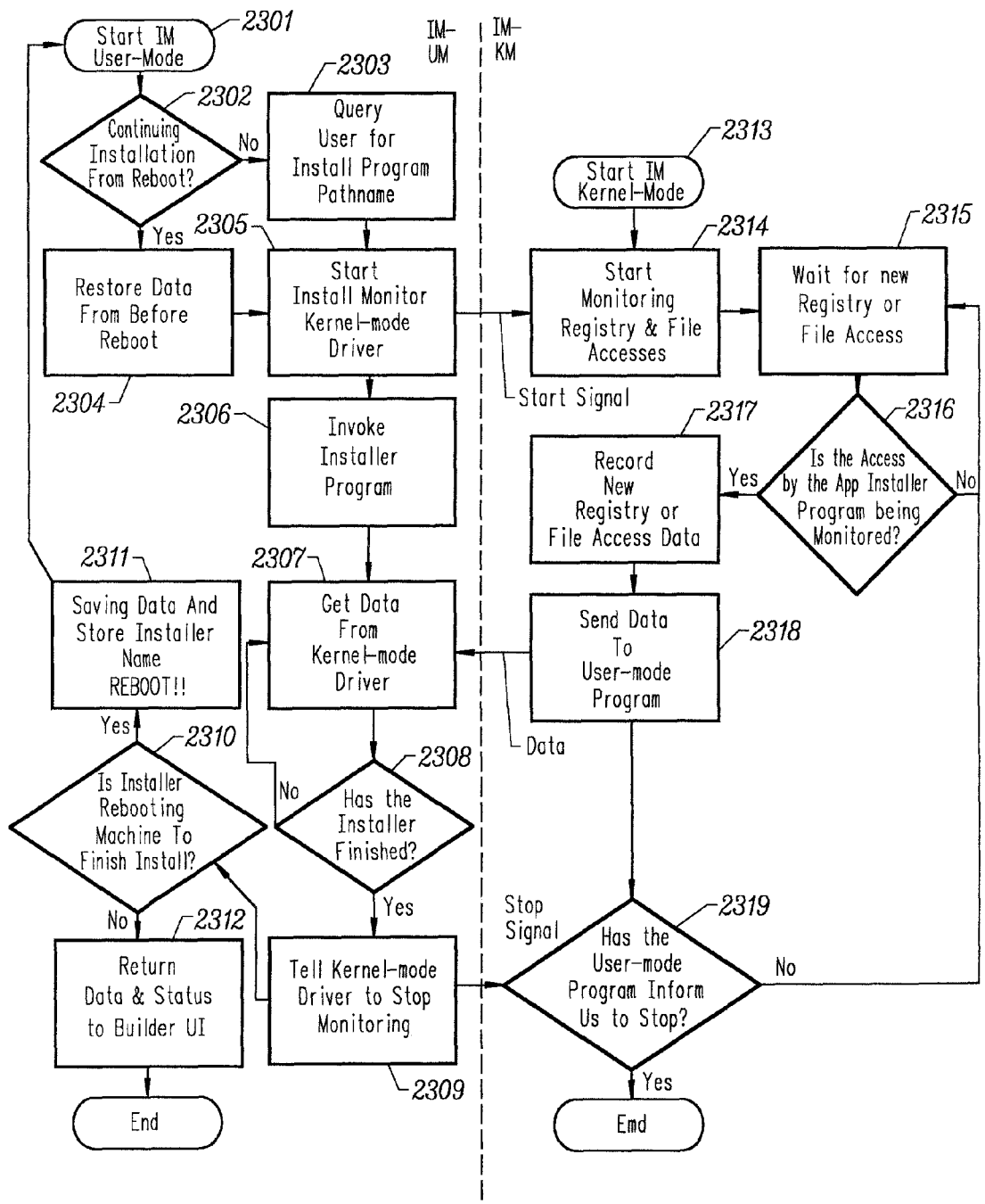
FIG. 23 is a block schematic diagram showing a flowchart for the Builder Install Monitor according to the invention.

With respect to FIG. 23, the IM-KM subcomponent monitors two classes of information during an application installation: system registry modifications and file modifications. Different techniques are used for each of these classes.

To monitor system registry modifications 2314, the IM-KM component replaces all kernel-mode API calls in the System Service Table that write to the system registry with new functions defined in the IM-KM subcomponent. When an installation program calls one of the API functions to write to the registry 2315, the IM-KM function is called instead, which logs the modification data 2317 (including registry key path, value name and value data) and then forwards the call to the actual operating system defined function 2318. The modification data is made available to the IM-UM subcomponent through a mechanism described below.

To monitor file modifications, a filter driver is attached to the file system's driver stack. Each time an installation program modifies a file on the system, a function is called in the IM-KM subcomponent, which logs the modification data (including file path and name) and makes it available to the IM-UM using a mechanism described below.

The mechanisms used for monitoring registry modifications and file modifications will capture modifications made by any of the processes currently active on the computer system. While the installation program is running, other processes that, for example, operate the desktop and service network connections may be running and may also modify files or registry data during the installation. This data must be removed from the modification data to avoid inclusion of modifications that are not part of the application installation. The IM-KM uses process monitoring to perform this filtering.

To do process monitoring, the IM-KM installs a process notification callback function that is called each time a process is created or destroyed by the operating system. Using this callback function, the operating system sends the created process ID as well as the process ID of the creator (or parent) process. The IM-KM uses this information, along with the process ID of the IM-UM, to create a list of all of the processes created during the application installation. The IM-KM uses the following algorithm to create this list:

1. Before the installation program is launched by the IM-UM, the IM-UM passes its own process ID to the IM-KM. Since the IM-UM is launching the installation application, the IM-UM will be the ancestor (parent, grandparent, etc.) of any process (with one exception—the Installer Service described below) that modifies files or registry data as part of the application installation.
2. When the installation is launched and begins the creating processes, the IM-KM process monitoring logic is notified by the operating system via the process notification callback function.
3. If the creator (parent) process ID sent to the process notification callback function is already in the process list, the new process is included in the list.

When an application on the system modifies either the registry or files, and the IM-KM monitoring logic captures the modification data, but before making it available to the IM-UM, it first checks to see if the process that modified the registry or file is part of the process list. It is only made available to the IM-UM if it is in the process list.

It is possible that a process that is not a process ancestor of the IM-UM will make changes to the system as a proxy for the installation application. Using interprocess communication, an installation program may request than an Installer Service make changes to the machine. In order for the IM-KM to capture changes made by the Installer Service, the process monitoring logic includes a simple rule that also includes any registry or file changes that have been made by a process with the same name as the Installer Service process. On Windows 2000, for example, the Installer Service is called "msi.exe".

Installation Monitor User-Mode Subcomponent (IM-UM)

The IM kernel-mode (IM-KM) driver subcomponent is controlled by the user-mode subcomponent (IM-UM). The IM-UM sends messages to the IM-KM to start 2305 and stop 2309 the monitoring process via standard I/O control messages known as IOCTLs. The message that starts the IM-KM also passes in the process ID of the IM-UM to facilitate process monitoring described in the IM-KM description.

When the installation program 2306 modifies the computer system, the IM-KM signals a named kernel event. The IM-UM listens for these events during the installation. When one of these events is signaled, the IM-UM calls the IM-KM using an IOCTL message. In response, the IM-KM packages data describing the modification and sends it to the IM-UM 2318.

The IM-UM sorts this data and removes duplicates. Also, it parameterizes all local-system-specific registry keys, value names, and values. For example, an application will often store paths in the registry that allow it to find certain files at run-time. These path specifications must be replaced with parameters that can be recognized by the client installation software.

A user interface is provided for the IM-UM that allows an operator of the Builder to browse through the changes made to the machine and to edit the modification data before the data is packaged into an SAS.

Once the installation of an application is completed 2308, the IM-UM forwards data structures representing the file and registry modifications to the Streamed Application Packager 2312.

Monitoring Application Configuration

Using the techniques described above for monitoring file modifications and monitoring registry modifications, the builder can also monitor a running application that is being configured for a particular working environment. The data acquired by the IM-UM can be used to duplicate the same configuration on multiple machines, making it unnecessary for each user to configure his/her own application installation.

An example of this is a client server application for which the client will be streamed to the client computer system. Common configuration modifications can be captured by the IM and packed into the SAS. When the application is streamed to the client machine, it is already configured to attach to the server and begin operation.

Application Profiling (AP)

Figure 24:
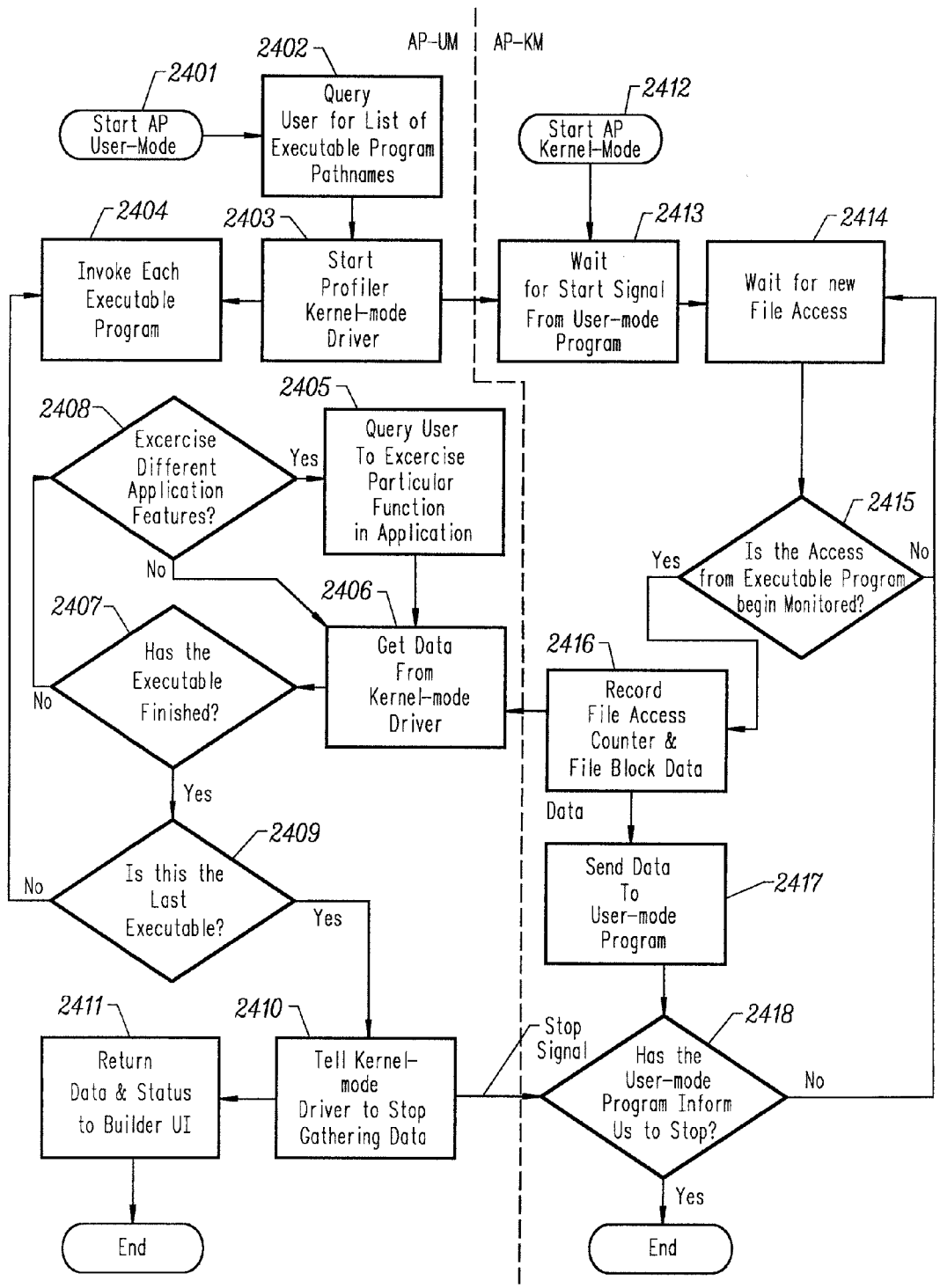
FIG. 24 is a block schematic diagram showing a flowchart for the Builder Application Profiler according to the invention.

Referring to FIG. 24, in the second phase of the conversion process, the Builder's Application Profiler (AP) component invokes the application executable program that is installed during the first phase of the conversion process. Given a particular user input, the executable program file blocks are accessed in a particular sequence. The purpose of the AP is to capture the sequence data associated with some user inputs. This data is useful in several ways.

First of all, frequently used file blocks can be streamed to the client machine before other less used file blocks. A frequently used file block is cached locally on the client cache before the user starts using the streamed application for the first time. This has the effect of making the streamed application as responsive to the user as the locally installed application by hiding any long network latency and bandwidth problems.

Secondly, the frequently accessed files can be reordered in the directory to allow faster lookup of the file information. This optimization is useful for directories with large number of files. When the client machine looks up a frequently used file in a directory, it finds this file early in the directory search. In an application run with many directory queries, the performance gain is significant.

Finally, the association of a set of file blocks with a particular user input allows the client machine to request minimum amount of data needed to respond to that particular user command. The profile data association with a user command is sent from the server to the client machine in the Appinstall-Block during the 'preparation' of the client machine for streaming. When the user on a client machine invokes a particular command, the codes corresponding to this command are prefetched from the server.

The Application Profiler (AP) is not as tied to the system as the Installation Monitor (IM) but there are still some OS dependent issues. In the Windows system, the AP still has two subcomponents: kernel-mode (AP-KM) subcomponent and the user-mode (AP-UM) subcomponent. The AP-UM invokes the converting application executable. Then AP-UM starts the AP-KM 2403, 2413 to track the sequences of file block accesses by the application 2414. Finally when the application exits after the pre-specified amount of sequence data is gathered, the AP-UM retrieves the data from AP-KM 2406, 2417 and forwards the data to the Streamed Application Packager 2411.

Streamed Application Set Packaging (SP)

Figure 25:
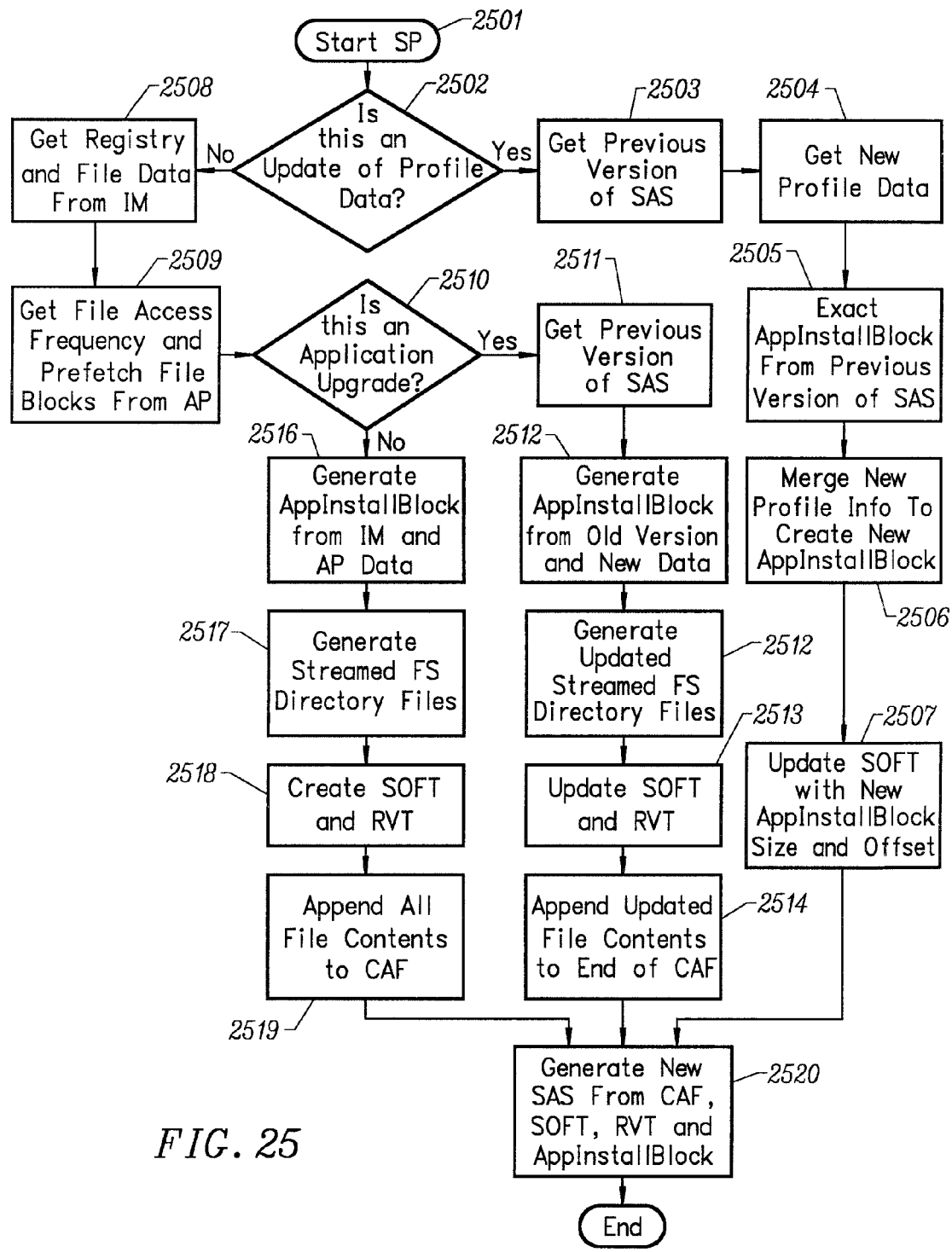
FIG. 25 is a block schematic diagram showing a flowchart for the Builder SAS Packager according to the invention.

With respect to FIG. 25, in the final phase of the conversion process, the Builder's Streamed Application Set Packager (SP) component processes the data structure from IM and AP to create a data set suitable for streaming over the network. This converted data set is called the Streamed Application Set 2520 and is suitable for uploading to the Streamed Application Servers for subsequent downloading by the stream client. FIG. 23 shows the control flow of the SP module.

Each file included in a Streamed Application Set 2520 is assigned a file number that identifies it within the SAS.

The Streamed Application Set 2520 consists of the three sets of data from the Streamed Application Server's perspective. The three types of data are the Concatenation Application File (CAF) 2519, 2515, the Size Offset File Table (SOFT) 2518, 2514, 2507, and the Root Versioning Table (RVT) 2518, 2514.

The CAF 2519, 2515 consists of all the files and directories needed to stream to the client. The CAF can be further divided into two subsets: initialization data set and the runtime data set.

The initialization data set is the first set of data to be streamed from the server to the client. This data set contains the information captured by IM and AP needed by the client to prepare the client machine for streaming this particular application. This initialization data set is also called the AppinstallBlock (AIB) 2516, 2512. In addition to the data captured by the IM and AP modules, the SP is also responsible for merging any new dynamic profile data gathered from the client and the server. This data is merged into the existing AppinstallBlock to optimize subsequent streaming of the application 2506. With the list of files obtained by the IM during application installation, the SP module separates the list of files into regular streamed files and the spoof files. The spoof files consists of those files not installed into standard application directory. This includes files installed into system directories and user specific directories. The detailed format description of the AppinstallBlock is described later.

The second part of the CAF consists of the runtime data set. This is the rest of the data that is streamed to the client once the client machine is initialized for this particular application. The runtime data consists of all the regular application files and the directories containing information about those application files. Detailed format description of the runtime data in the CAF section is described below. The SP appends every file recorded by IM into the CAF and generates all directories. Each directory contains list of file name, file number, and the metadata associated with the files in that particular directory 2517, 2513.

The SP is also responsible for generating the SOFT file 2518, 2514, 2507. This is a table used to index into the CAF for determining the start and the end of a file. The server uses this information to quickly access the proper file within the directory for serving the proper file blocks to the client.

Finally, the SP creates the RVT file 2518, 2514. The Root Versioning Table contains a list of root file number and version number. This information is used to track minor application patches and upgrades. Each entry in the RVT corresponds to one patch level of the application with a corresponding new root directory. The SP generates new parent directories when any single file in that subdirectory tree is changed from the patched upgrade. The RVT is uploaded to the server and requested by the client at appropriate time for the most updated version of the application by a simple comparison of the client's Streamed Application root file number with the RVT table located on the server once the client is granted access authorization to retrieve the data.

Figure 26A:
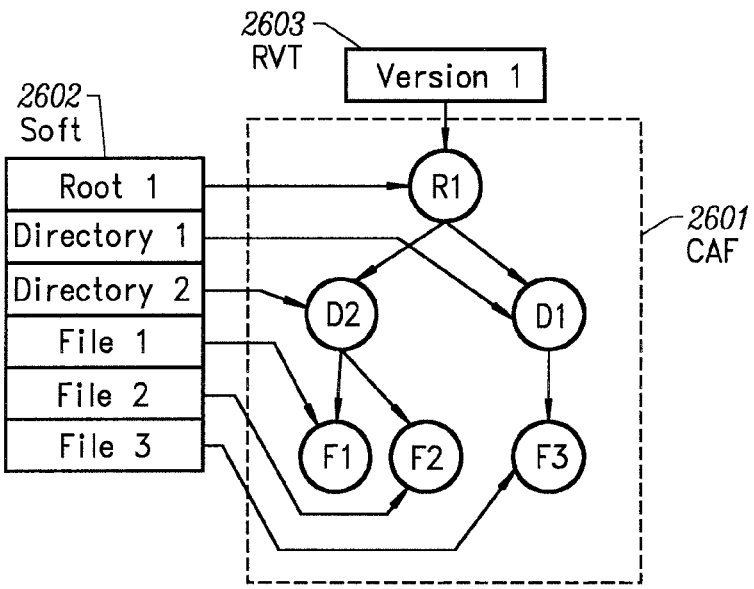
FIG. 26a is a block schematic diagram showing versioning support according to the invention.
Figure 26B:
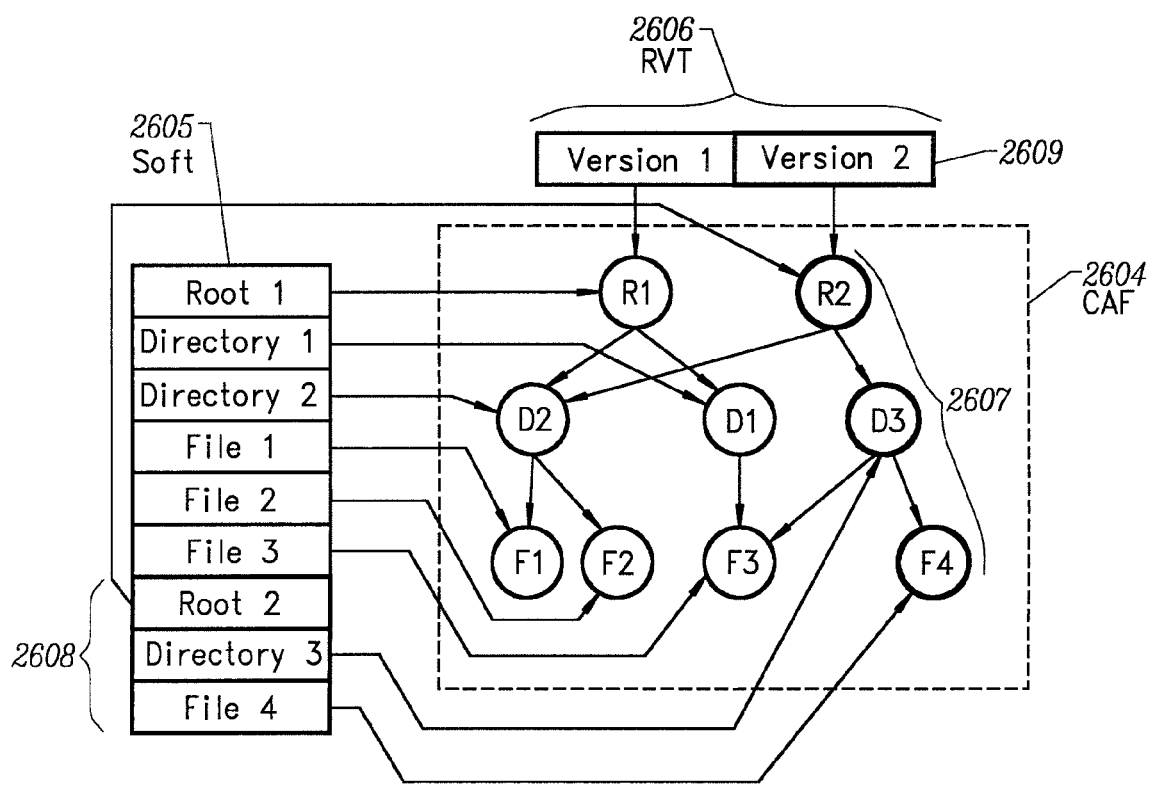
FIG. 26b is a block schematic diagram showing versioning support according to the invention.

With respect to FIGS. 26*a* and 26*b*, the internal representation of a simple SAS before and after a new file is added to a new version of an application is shown. The original CAF 2601 has the new files 2607 appended to it 2604 by the SP. The SOFT 2602 is correspondingly updated 2605 with the appropriate table entries 2608 to index the new files 2607 the CAF 2604. Finally, the RVT 2603 is updated 2606 to reflect the new version 2609.

Data Flow Description

Figure 27:
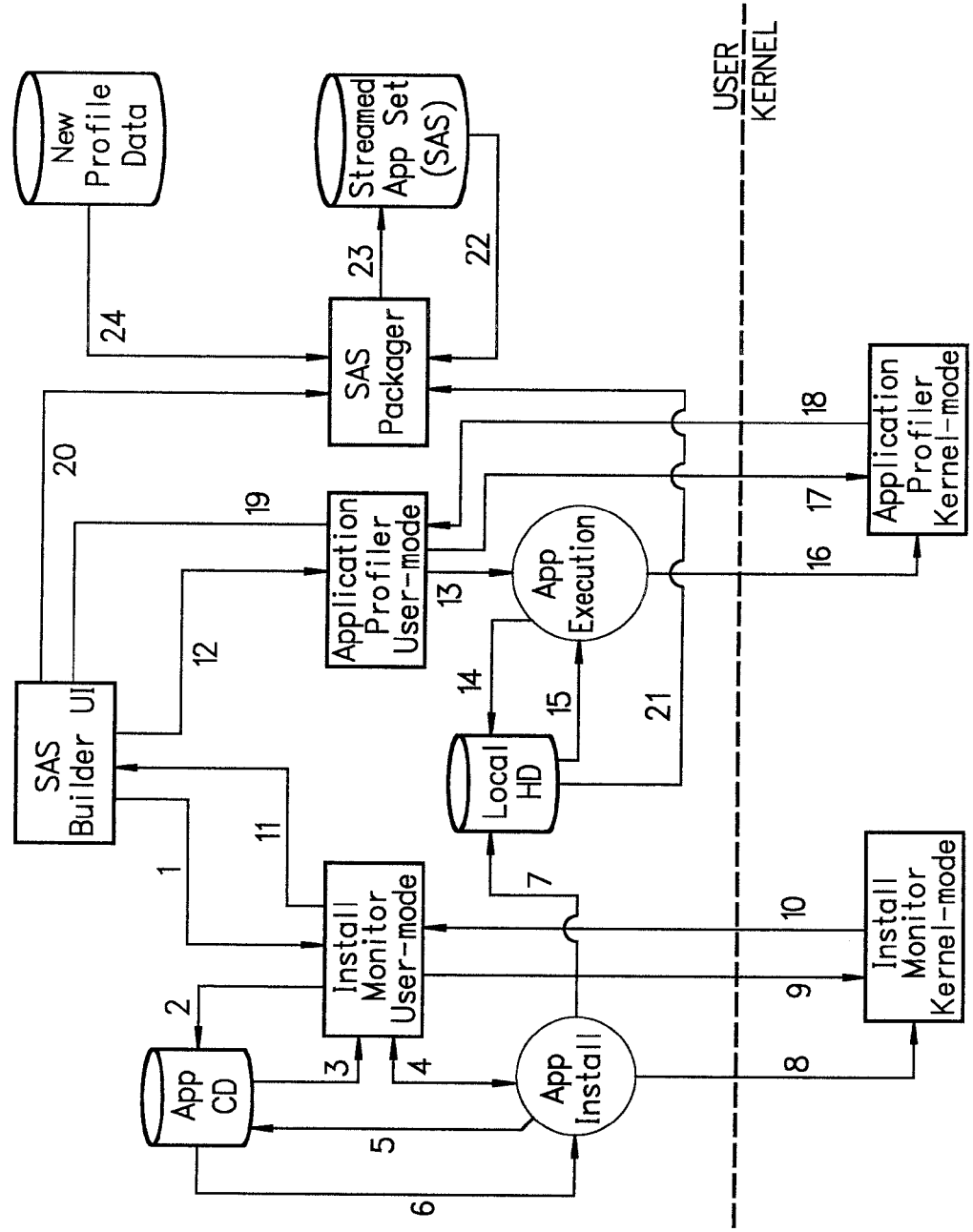
FIG. 27 is a block schematic diagram showing a data flow diagram for the Streamed Application Set Builder according to the invention.

The following list describes the data that is passed from one component to another. The numbers corresponds to the numbering in the Data Flow diagram of FIG. 27.

Install Monitor

1. The full pathname of the installer program is queried from the user by the Builder program and is sent to the Install Monitor.
2. The Install Monitor (IM) user-mode sends a read request to the OS to spawn a new process for installing the application on the local machine.
3. The OS loads the application installer program into memory and run the application installer program. OS returns the process ID to the IM.
4. The application program is started by the IM-UM.
5. The application installer program sends read request to the OS to read the content of the CD.
6. The CD media data files are read from the CD.
7. The files are written to the appropriate location on the local hard-drive.
8. IM kernel-mode captures all file read/write requests and all registry read/write requests by the application installer program.
9. IM user-mode program starts the IM kernel-mode program and sends the request to start capturing all relevant file and registry data.
10. IM kernel-mode program sends the list of all file modifications, additions, and deletions; and all registry modifications, additions, and deletions to the IM user-mode program.
11. IM informs the SAS Builder UI that the installation monitoring has completed and display the file and registry data in a graphical user interface.

Application Profiler

12. Builder UI invokes Application Profiling (AP) user-mode program by querying the user for the list of application executable names to be profiled. The AP user-mode also queries the user for division of file blocks into sections corresponding to the commands invoked by the user of the application being profiled.
13. Application Profiler user-mode invokes each application executable in succession by spawning each program in a new process. The OS loads the application executable into memory, runs the application executable, and returns the process ID to the Application Profiler.

14. During execution, the OS on behalf of the application, sends the request to the hard-drive controller to read the appropriate file blocks into memory as needed by the application.
15. The hard-drive controller returns all file blocks requested by the Os.
16. Every file access to load the application file blocks into memory is monitored by the Application Profiler (AP) kernel-mode program.
17. The AP user-mode program informs the AP kernel-mode program to start monitoring relevant file accesses.
18. Application Profiler kernel-mode returns the file access sequence and frequency information to the user-mode program.
19. Application Profiler returns the processed profile information. This has two sections. The first section is used to identify the frequency of files accessed. The second section is used to list the file blocks for prefetch to the client. The file blocks can be further categorized into subsections according to the commands invoked by the user of the application.

SAS Packager

20. The Streamed Application Packager receives files and registry changes from the Builder UI. It also receives the file access frequency and a list of file blocks from the Profiler. File numbers are assigned to each file.
21. The Streamed Application Packager reads all the file data from the hard-drive that are copied there by the application installer.
22. The Streamed Application Packager also reads the previous version of Streamed Application Set for support of minor patch upgrades.
23. Finally, the new Streamed Application Set data is stored back to non-volatile storage.
24. For new profile data gathered after the SAS has been created, the packager is invoked to update the AppinstallBlock in the SAS with the new profile information.

Mapping of Data Flow to Streamed Application Set (SAS)

Step 7: Data gathered from this step consist of the registry and file modification, addition, and deletion. The data are mapped to the AppinstallBlock's File Section, Add Registry Section, and Remove Registry Section.

Step 8 & 19: File data are copied to the local hard-drive then concatenated into part of the CAF contents. Part of the data is identified as spoof or copied files and the file names and/or contents are added to the AppinstallBlock.

Step 15 & 21: Part of the data gathered by the Profiler or gathered dynamically by the client is used in the AppinstallBlock as a prefetch hint to the client. Another part of the data is used to generate a more efficient SAS Directory content by ordering the files according to the usage frequency.

Step 20: If the installation program was an upgrade, SAS Packager needs previous version of the Streamed Application Set data. Appropriate data from the previous version is combined with the new data to form the new Streamed Application Set.

Format of Streamed Application Set

Figure 28:
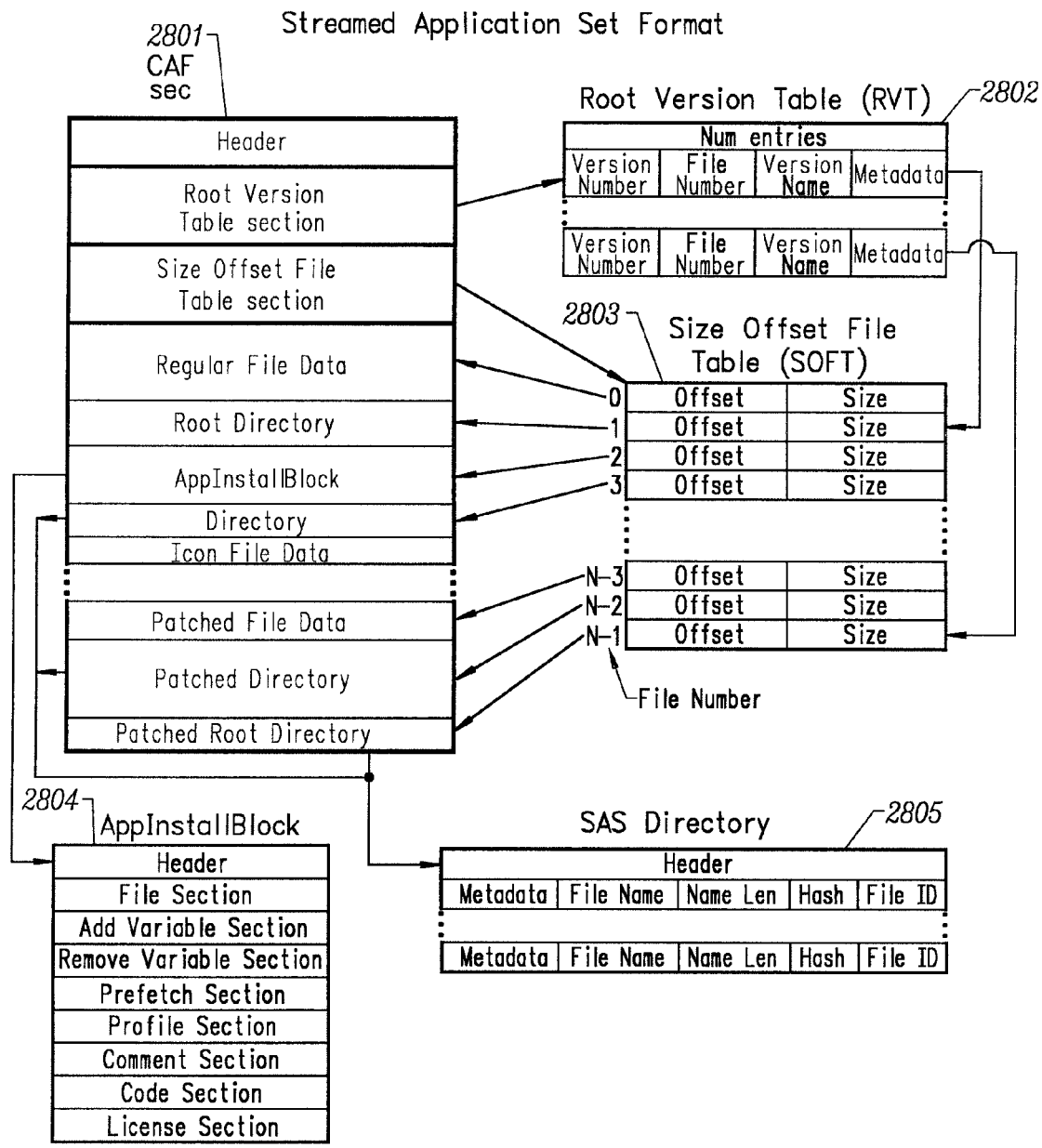
FIG. 28 is a block schematic diagram showing the Streamed Application Set format according to the invention.

Referring to FIG. 28, the format of the Streamed Application Set consists of three sections: Root Version Table (RVT) 2802, Size Offset File Table (SOFT) 2803, and Concatenation Application File (CAF) 2801. The RVT section 2802 lists all versions of the root file numbers available in a Streamed Application Set. The SOFT 2803 section consists of the pointers into the CAF 2801 section for every file in the CAF 2801. The CAF section 2801 contains the concatenation of all the files associated with the streamed application. The CAF section 2801 is made up of regular application files, SAS directory files 2805, AppinstallBlock 2804, and icon files. See below for detailed information on the content of the SAS file.

OS Dependent Format

The format of the Streamed Application Set is designed to be as portable as possible across all OS platforms. At the highest level, the format of CAF, SOFT, and RVT that make up the format of the Streamed Application Set are completely portable across any OS platforms. One piece of data structure that is OS dependent is located in the initialization data set called AppinstallBlock in the CAF. This data is dependent on the type of OS due to the differences in low-level system differences among different OS. For example, Microsoft Windows contains system environment variables called the Registry. The Registry has a particular tree format not found in other operating systems like UNIX or MacOS.

Another OS dependent piece of data is located in the SAS directory files in the CAF. The directory contains file metadata information specific to Windows files. For example on the UNIX platform, there does not exist a hidden flag. This platform specific information needs to be transmitted to the client to fool the streamed application into believing that the application data is located natively on the client machine with all the associated file metadata intact. If SAS is to be used to support streaming of UNIX or MacOS applications, file metadata specific to those systems will need to be recorded in the SAS directory.

Lastly, the format of the file names itself is OS dependent. Applications running on the Windows environment inherit the old MSDOS 8.3 file name format. To support this properly, the format of the SAS Directory file in CAF requires an additional 8.3 field to store this information. This field is not needed in other operating systems like UNIX or MacOS.

Device Driver Versus File System Paradigm

Figure 29:
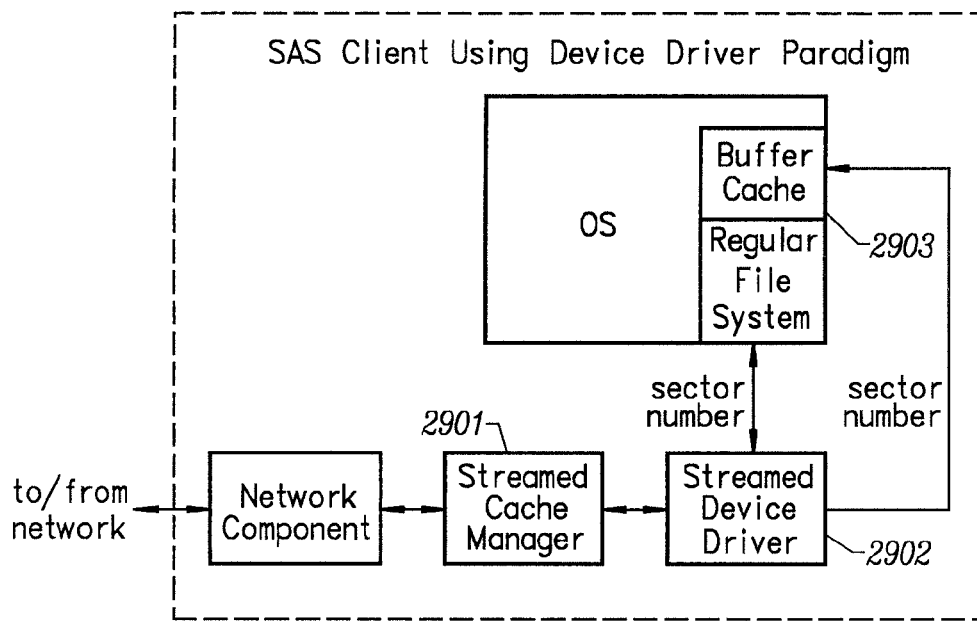
FIG. 29 is a block schematic diagram showing an SAS client using a device driver paradigm according to the invention.
Figure 30:
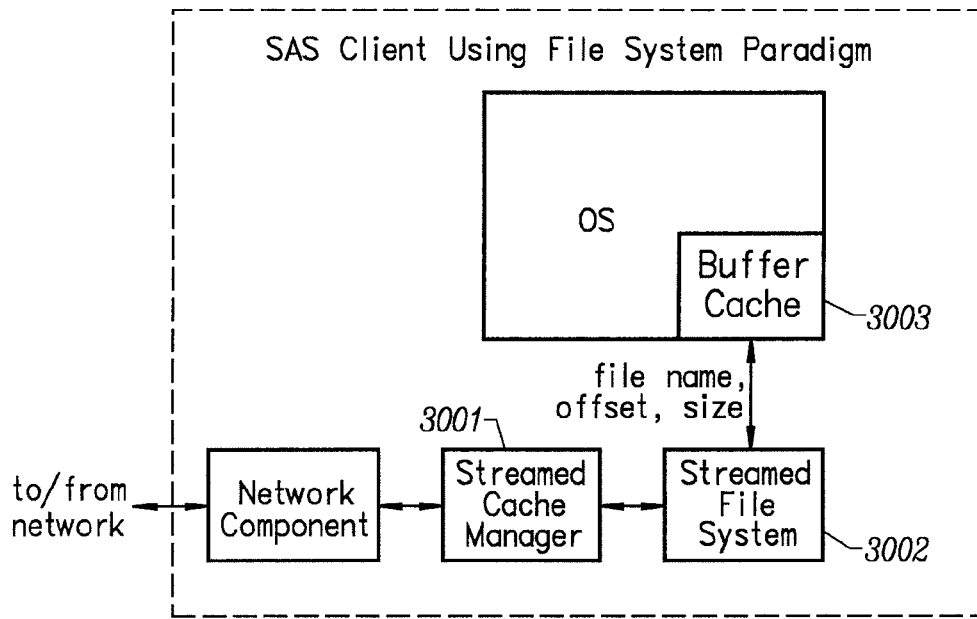
FIG. 30 is a block schematic diagram showing an SAS client using a file system paradigm according to the invention.
Figure 31D:
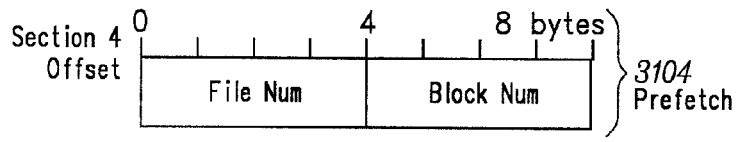
Figure 31E:
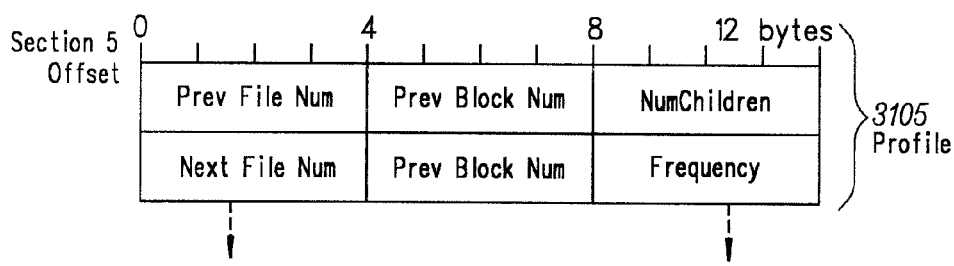
Figure 31F:
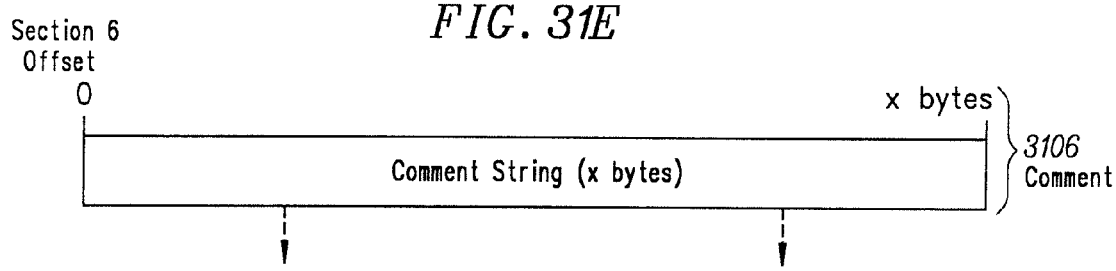
Figure 31G:
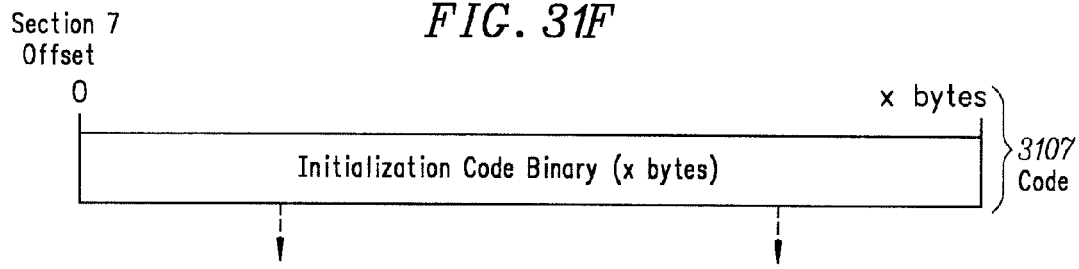
Figure 31H:
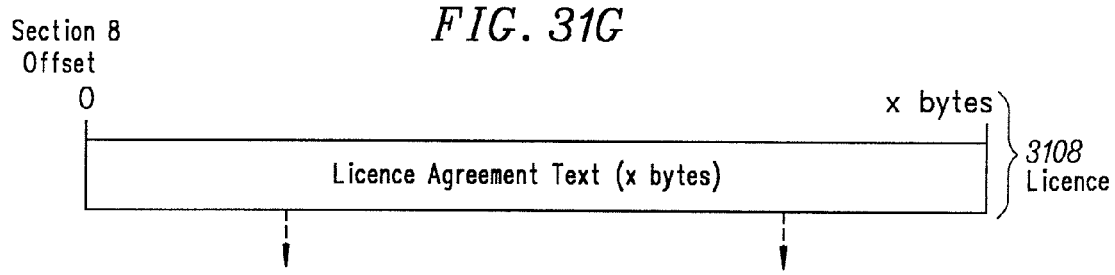

Referring to FIGS. 29 and 30, the SAS client Prototype is implemented using the 'device driver' paradigm. One of the advantages of the device driver approach is that the caching of the sector blocks is simpler. In the device driver approach, the client cache manager 2902 only needs to track sector numbers in its cache 2903. In comparison with the 'file system' paradigm, more complex data structure are required by the client cache manager 3002 to track a subset of a file that is cached 3003 on a client machine. This makes the device driver paradigm easier to implement.

On the other hand, there are many drawbacks to the device driver paradigm. On the Windows system, the device driver approach has a problem supporting large numbers of applications. This is due to the phantom limitation on the number of assignable drive letters available in a Windows system (26 letters); and the fact that each application needs to be located on its own device. Note that having multiple applications on a device is possible, but then the server needs to maintain an exponential number of devices that support all possible combinations of applications. This is too costly to maintain on the server.

Another problem with the device driver approach is that the device driver operates at the disk sector level. This is a much lower level than operating at the file level in the file system approach. The device driver does not know anything about files. Thus, the device driver cannot easily interact with the file level issues. For example, spoofing files and interacting with the OS file cache is nearly impossible with the device driver approach. Both spoofing files and interacting with the OS buffer cache are needed to get higher performance. In addition, operating at the file system level lends to optimizing the file system to better suit this approach of running applications. For instance, typical file systems do logging and make multiple disk sector requests at a time. These are not needed in this approach and are actually detrimental to the performance. When operating at the device driver level, not much can be done about that. Also, operating at the file system level helps in optimizing the protocol between the client and the server.

Implementation in the Prototype

The prototype has been implemented and tested successfully on the Windows and Linux distributed system. The prototype is implemented using the device driver paradigm as described above. The exact procedure for streaming application data is described next.

First of all, the prototype server is started on either the Windows-based or Linux-based system. The server creates a large local file mimicking large local disk images. Once the disk images are prepared, it listens to TCP/IP ports for any disk sector read or write requests.

Implementation of SAS Builder

The SAS Builder has been implemented on the Windows-based platform. A preliminary Streamed Application Set file has been created for real-world applications like Adobe Photoshop. A simple extractor program has been developed to extract the SAS data on a pristine machine without the application installed locally. Once the extractor program is run on the SAS, the application runs as if it was installed locally on that machine. This process verifies the correctness of the SAS Building process.

Format of Streamed Application Set (SAS)

Functionality

The streamed application set (SAS), illustrated in FIG. 28, is a data set associated with an application suitable for streaming over the network. The SAS is generated by the SAS Builder program. The program converts locally installable applications into the SAS. This section describes the format of the SAS.

Note: Fields greater than a single byte are stored in little-endian format. The Stream Application Set (SAS) file size is limited to 2 64 bytes. The files in the CAF section are laid out in the same order as its corresponding entries in the SOFT table.

Data Type Definitions

The format of the SAS consists of four sections: header, Root Version Table (RVT), Size Offset File Table (SOFT), and Concatenation Application File (CAF) sections.

1. Header Section
   MagicNumber [4 bytes]: Magic number identifying the file content with the SAS.
   ESSVersion [4 bytes]: Version number of the SAS file format.
   AppID [16 bytes]: A unique application ID for this application. This field must match the AppID located in the AppinstallBlock. Window GuidgenAPI is used to create this identifier.
   Flags [4 bytes]: Flags pertaining to SAS. Reserved [32 bytes]: Reserved spaces for future.
   RVToffset [8 bytes]: Byte offset into the start of the RVT section.
   RVTsize [8 bytes]: Byte size of the RVT section.
   SOFToffset [8 bytes]: Byte offset into the start of the SOFT section.
   SOFTsize [8 bytes]: Byte size of the SOFT section.
   CAFoffset [8 bytes]: Byte offset into the start of the CAF section.
   CAFsize [8 bytes]: Byte size of the CAF section.
   VendorNameIsAnsi [1 byte]: 0 if the vendor name is in Unicode format. 1 if the vendor name is in ANSI format.
   VendorNameLength [4 bytes]: Byte length of the vendor name.
   VendorName [X bytes]: Name of the software vendor who created this application. e.g., "Microsoft". Null-terminated.
   AppBaseNameIsAnsi [1 byte]: 0 if the vendor name is in Unicode format. 1 if the vendor name is in ANSI format.
   AppBaseNameLength [4 bytes]: Byte length of the application base name.
   AppBaseName [X bytes]: Base name of the application. e.g., "Word 2000". Null-terminated.
   MessageIsAnsi [1 byte]: 0 if the vendor name is in Unicode format. 1 if the vendor name is in ANSI format.
   MessageLength [4 bytes]: Byte length of the message text.
   Message [X bytes]: Message text. Null-terminated.

2. Root Version Table (RVT) Section

The Root version entries are ordered in a decreasing value according to their file numbers. The Builder generates unique file numbers within each SAS in a monotonically increasing value. So larger root file numbers imply later versions of the same application. The latest root version is located at the top of the section to allow the SAS Server easy access to the data associated with the latest root version.
   NumberEntries [4 bytes]: Number of patch versions contained in this SAS. The number indicates the number of entries in the Root Version Table (RVT).
Root Version structure: (variable number of entries)
   VersionNumber [4 bytes]: Version number of the root directory.
   FileNumber [4 bytes]: File number of the root directory.
   VersionNameIsAnsi [1 byte]: 0 if the vendor name is in Unicode format. 1 if the vendor name is in ANSI format.
   VersionNameLength [4 bytes]: Byte length of the version name.
   VersionName [X bytes]: Application version name. e.g., "SP 1".
   Metadata [32 bytes]: See SAS FS Directory for format of the metadata.

3. Size Offset File Table (SOFT) Section

The SOFT table contains information to locate specific files in the CAF section. The entries are ordered according to the file number starting from 0 to NumberFiles−1. The start of the SOFT table is aligned to eight-byte boundaries for faster access.
SOFT entry structure: (variable number of entries)
   Offset [8 bytes]: Byte offset into CAF of the start of this file.
   Size [8 bytes]: Byte size of this file. The file is located from address Offset to Offset+Size.

4. Concatenation Application File (CAF) Section

CAF is a concatenation of all file or directory data into a single data structure. Each piece of data can be a regular file, an AppinstallBlock, an SAS FS directory file, or an icon file.
   a. Regular Files
      FileData [X bytes]: Content of a regular file
   b. AppinstallBlock (See AppinstallBlock section for detailed format)

A simplified description of the AppinstallBlock is listed here. The exact detail of the individual fields in the AppinstallBlock are described later.

Header section [X bytes]: Header for AppinstallBlock containing information to identify this AppinstallBlock.
Files section [X bytes]: Section containing file to be copied or spoofed.
AddVariable section [X bytes]: Section containing system variables to be added.
RemoveVariable section [X bytes]: Section containing system variables to be removed.
Prefetch section [X bytes]: Section containing pointers to file blocks to be prefetched to the client.
Profile section [X bytes]: Section containing profile data.
Comment section [X bytes]: Section containing comments about AppinstallBlock.
Code section [X bytes]: Section containing application-specific code needed to prepare local machine for streaming this application
LicenseAgreement section [X bytes]: Section containing licensing agreement message.

c. SAS Directory

An SAS Directory contains information about the sub-directories and files located within this directory. This information is used to store metadata information related to the files associated with the streamed application. This data is used to fool the application into thinking that it is running locally on a machine when most of the data is resided elsewhere.

The SAS directory contains information about files in its directory. The information includes file number, names, and metadata associated with the files.
MagicNumber [4 bytes]: Magic number for SAS directory file.
ParentFileID [16+4 bytes]: AppID+FileNumber of the parent directory. AppID is set to 0 if the directory is the root.
SelfFileID [16+4 bytes]: AppID+FileNumber of this directory.
NumFiles [4 bytes]: Number of files in the directory.
Variable-Sized File Entry:
UsedFlag [1 byte]: 1 for used, 0 for unused.
ShortLen [1 byte]: Length of short file name.
LongLen [2 byte]: Length of long file name.
NameHash [4 bytes]: Hash value of the short file name for quick lookup without comparing whole string.
ShortName [24 bytes]: 8.3 short file name in Unicode. Not null-terminated.
FileID [16+4 bytes]: AppID+FileNumber of each file in this directory.
Metadata [32 bytes]: The metadata consists of file byte size (8 bytes), file creation time (8 bytes), file modified time (8 bytes), attribute flags (4 bytes), SAS flags (4 bytes). The bits of the attribute flags have the following meaning:
Bit 0: Read-only—Set if file is read-only
Bit 1: Hidden—Set if file is hidden from user
Bit 2: Directory—Set if the file is an SAS Directory
Bit 3: Archive—Set if the file is an archive
Bit 4: Normal—Set if the file is normal
Bit 5: System—Set if the file is a system file
Bit 6: Temporary—Set if the file is temporary The bits of the SAS flags have the following meaning:
Bit 0: ForceUpgrade—Used only on root file. Set if client is forced to upgrade to this particular version if the current root version on the client is older.
Bit 1: RequireAccessToken—Set if file require access token before client can read it.
Bit 2: Read-only—Set if the file is read-only
LongName [X bytes]: Long filename in Unicode format with null termination character.

d. Icon files
IconFileData [X bytes]: Content of an icon file.
Format of AppInstallBlock
Functionality With respect to FIGS. 31*a*-31*h*, the AppinstallBlock is a block of code and data associated with a particular application. This AppinstallBlock contains the information needed to by the SAS client to initialize the client machine before the streamed application is used for the first time. It also contains optional profiling data for increasing the runtime performance of that streamed application.

The AppinstallBlock is created offline by the SAS Builder program. First of all, the Builder monitors the installation process of a local version of the application installation program and records changes to the system. This includes any environment variables added or removed from the system 3103, and any files added or modified in the system directories 3102. Files added to the application specific directory is not recorded in the AppinstallBlock to reduce the amount of time needed to send the AppinstallBlock to the SAS client. Secondly, the Builder profiles the application to obtain the list of critical pages needed to run the application initially and an initial page reference sequence of the pages accessed during a sample run of the application. The AppinstallBlock contains an optional application-specific initialization code 3107. This code is needed when the default initialization procedure is insufficient to setup the local machine environment for that particular application.

The AppinstallBlock and the runtime data are packaged into the SAS by the Builder and then uploaded to the application server. After the SAS client is subscribed to an application and before the application is run for the first time, the AppinstallBlock is sent by the server to the client. The SAS client invokes the default initialization procedure and the optional application-specific initialization code 3107. Together, the default and the application-specific initialization procedure process the data in the AppinstallBlock to make the machine ready for streaming that particular application.

Data Type Definitions

The AppinstallBlock is divided into the following sections: header section 3101, variable section 3103, file section 3102, profile section 3105, prefetch section 3104, comment section 3106, and code section 3107. The header section 3101 contains general information about the AppinstallBlock. The information includes the total byte size and an index table containing size and offset into other sections. In a Windows version, the variable section consists of two registry tree structures to specify the registry entries added or removed from the OS environment. The file section 3102 is a tree structure consisting of the files copied to C drive during the application installation. The profile section 3105 contains the initial set of block reference sequences during Builder profiling of the application. The prefetch section 3104 consists of a subset of profiled blocks used by the Builder as a hint to the SAS client to prefetch initially. The comment section 3106 is used to inform the SAS client user of any relevant information about the application installation. Finally, the code section 3107 contains an optional program tailored for any application-specific installation not covered by the default streamed application installation procedure. In Windows version, the code section contains a Windows DLL. The following is a detailed description of each fields of the AppinstallBlock.

Note: Little endian format is used for all the fields spanning more than 1 byte. Also, BlockNumber specifies blocks of 4K byte size.

1. Header Section:

The header section 3103 contains the basic information about this AppinstallBlock. This includes the versioning information, application identification, and index into other sections of the file.

Core Header Structure:
    AibVersion [4 bytes]: Magic number or appinstallBlock version number (which identifies the version of the appinstallBlock structure rather than the contents).
    AppId [16 bytes]: this is an application identifier unique for each application. On Windows, this identifier is the GUID generated from the 'guidgen' program. Appid for Word on Win98 will be different from Word on WinNT if it turns out that Word binaries are different between NT and 98.
    VersionNo [4 bytes]: Version number. This allows us to inform the client that the appinstallBlock has changed for a particular appid. This is useful for changes to the AppinstallBlock due to minor patch upgrades in the application.
    ClientOSBitMap [4 bytes]: Client OS supported bitmap or ID: for Win2K, Win98, WinNT (and generally for other and multiple OSs).
    ClientOSServicePack [4 bytes]: For optional storage of the service pack level of the OS for which this appInstallBlock has been created. Note that when this field is set, the multiple OS bits in the above field ClientOSBitMap are not used.
    Flags [4 bytes]: Flags pertaining to AppinstallBlock
        Bit 0: Reboot—If set, the SAS client needs to reboot the machine after installing the AppinstallBlock on the client machine.
        Bit 1: Unicode—If set, the string characters are 2 bytes wide instead of 1 byte.
    HeaderSize [2 bytes]: Total size in bytes of the header section.
    Reserved [32 bytes]: Reserved spaces for future.
    NumberOfSections [1 byte]: Number of sections in the index table.
    This determines the number of entries in the index table structure described below:
Index Table Structure: (variable number of entries)
    SectionType [1 bytes]: The type of data described in section. 0=file section, 1=variable section, 2=prefetch section, 3=profile section, 4=comment section, 5=code section.
    SectionOffset [4 bytes]: The offset from the beginning of the file indicates the beginning of section.
    SectionSize [4 bytes]: The size in bytes of section.
Variable Structure:
    ApplicationNameIsAnsi [1 byte]: 1 if ansi, 0 if Unicode.
    ApplicationNameLength [4 bytes]: Byte size of the application name
    ApplicationName [X bytes]: Null terminating name of the application 2. File Section:

The file section 3102 contains a subset of the list of files needed by the application to run properly. This section does not enumerate files located in the standard application program directory. It consists of information about files copied into an 'unusual' directory during the installation of an application. If the file content is small (typically less than 1 MB), the file is copied to the client machine. Otherwise, the file is relocated to the standard program directory suitable for streaming. The file section data is a list of trees stored in a contiguous sequence of address spaces according to the pre-order traversal of the trees. A node in the tree can correspond to one or more levels of directories. A parent-child node pair is combined into a single node if the parent node has only a single child. Parsing the tree from the root of the tree to a leaf node results in a fully legal Windows pathname including the drive letter. Each entry of the node in the tree consists of the following structure:

Directory Structure: (Variable Number of Entries)
    Flags [4 byte]: Bit 0 is set if this entry is a directory
    NumberOfChildren [2 bytes]: Number of nodes in this directory
    DirectoryNameLength [4 bytes]: Length of the directory name
    DirectoryName [X bytes]: Null terminating directory name
Leaf Structure: (Variable Number of Entries)
    Flags [4 byte]: Bit 1 is set to 1 if this entry is a spoof or copied file name
    FileVersion [8 bytes]: Version of the file GetFileVersionInfo( )) if the file
    is win32 file image. Need variable file version size returned by GetFileVersioninfoSize( ) Otherwise use file size or file modified time to compare which file is the later version.
    FileNameLength [4 bytes]: Byte size of the file name
    FileName [X bytes]: Null terminating file name
    DataLength [4 bytes]: Byte size of the data. If spoof file, then data is the string of the spoof directory. If copied file, then data is the content of the file
    Data [X bytes]: Either the spoof file name or the content of the copied file 3. Add Variable and Remove Variable Sections:

The add and remove variable sections 3103 contain the system variable changes needed to run the application. In a Windows system, each section consists of several number of registry subtrees. Each tree is stored in a contiguous sequence of address spaces according to the pre-order traversal of the tree. A node in the tree can correspond to one or more levels of directory in the registry. A parent-child node pair is combined into a single node if the parent node has only a single child. Parsing the tree from the root of the tree to a leaf node results in a fully legal key name. The order of the trees is shown here.

a. Registry Subsection:
    1. "HKCR": HKEY_CLASSES_ROOT
    2. "HKCU": HKEY_CURRENT_USER
    3. "HKLM": HKEY_LOCAL_MACHINE
    4. "HKUS": HKEY_USERS
    5. "HKCC": HKEY_CURRENT CONFIG
        Tree Structure: (5 entries)
            ExistFlag [1 byte]: Set to 1 if this tree exist, 0 otherwise.
            Key or Value Structure entries [X bytes]: Serialization of the tree into variable number key or value structures described below.

Key Structure: (variable number of entries)
  KeyFlag [1 byte]: Set to 1 if this entry is a key or 0 if it's a value structure
  NumberOfSubchild [4 bytes]: Number of subkeys and values in this key directory
  KeyNameLength [4 bytes]: Byte size of the key name
  KeyName [X bytes]: Null terminating key name
Value Structure: (variable number of entries)
  KeyFlag [1 byte]: Set to 1 if this entry is a key or 0 if it's a value structure
  ValueType [4 byte]: Type of values from the Win32 API function RegQueryValueEx( ) REG_SZ, REG_BINARY, REG_DWORD, REG_LINK, REG NONE, etc. . . .
  ValueNameLength [4 bytes]: Byte size of the value name
  ValueName [X bytes]: Null terminating value name
  ValueDataLength [4 bytes]: Byte size of the value data
  ValueData [X bytes]: Value of the Data In addition to registry changes, an installation in a Windows system may involve changes to the ini files. The following structure is used to communicate the ini file changes needed to be done on the SAS client machine. The ini entries are appended to the end of the variable section after the five registry trees are enumerated.

b. INI Subsection:
NumFiles [4 bytes]: Number of INI files modified.
  File Structure: (variable number of entries)
    FileNameLength [4 bytes]: Byte length of the file name
    FileName [X bytes]: Name of the INI file
    NumSection [4 bytes]: Number of sections with the changes
    Section Structure: (variable number of entries)
      SectionNameLength [4 bytes]: Byte length of the section name
      SectionName [X bytes]: Section name of an INI file
      NumValues [4 bytes]: Number of values in this section
      Value Structure: (variable number of entries)
        ValueLength [4 bytes]: Byte length of the value data
        ValueData [X bytes]: Content of the value data 4. Prefetch Section:

The prefetch section 3104 contains a list of file blocks. The Builder profiler determines the set of file blocks critical for the initial run of the application. This data includes the code to start and terminate the application. It includes the file blocks containing frequently used commands. For example, opening and saving of documents are frequently used commands and should be prefetched if possible. Another type of block to include in the prefetch section are the blocks associated with frequently accessed directories and file metadata in this directory. The prefetch section is divided into two subsections. One part contains the critical blocks that are used during startup of the streamed application. The second part consists of the blocks accessed for common user operations like opening and saving of document. The format of the data is described below:

a. Critical Block Subsection:
NumCriticalBlocks [4 bytes]: Number of critical blocks.
  Block Structure: (variable number of entries)
    FileNumber [4 bytes]: File Number of the file containing the block to prefetch
    BlockNumber [4 bytes]: Block Number of the file block to prefetch b. Common Block Subsection:
NumCommonBlocks [4 bytes]: Number of critical blocks.
  Block Structure: (variable number of entries)
    FileNumber [4 bytes]: File Number of the file containing the block to prefetch
    BlockNumber [4 bytes]: Block Number of the file block to prefetch 5. Profile Section:

The profile section 3105 consists of a reference sequence of file blocks accessed by the application at runtime. Conceptually, the profile data is a two dimensional matrix. Each entry [row, column] of the matrix is the frequency, a block row is followed by a block column. In any realistic applications of fair size, this matrix is very large and sparse. The proper data structure must be selected to store this sparse matrix efficiently in required storage space and minimize the overhead in accessing this data structure access.

The section is constructed from two basic structures: row and column structures. Each row structure is followed by N column structures specified in the NumberColumns field. Note that this is an optional section. But with appropriate profile data, the SAS client prefetcher performance can be increased.

Row Structure: (variable number of entries)
  FileNumber [4 bytes]: File Number of the row block
  BlockNumber [4 bytes]: Block Number of the row block
  NumberColumns [4 bytes]: number of blocks that follows this block. This field determines the number of column structures following this field.
Column Structure: (variable number of entries)
  FileNumber [4 bytes]: File Number of the column block
  BlockNumber [4 bytes]: Block Number of the column block
  Frequency [4 bytes]: frequency the row block is followed by column block 6. Comment Section:

The comment section 3106 is used by the Builder to describe this AppinstallBlock in more detail.
  CommentLengthIsAnsi [1 byte]: 1 if string is ansi, 0 if Unicode format.
  CommentLength [4 bytes]: Byte size of the comment string
  Comment [X bytes]: Null terminating comment string 7. Code Section:

The code section 3107 consists of the application-specific initialization code needed to run on the SAS client to setup the client machine for this particular application. This section may be empty if the default initialization procedure in the SAS client is able to setup the client machine without requiring any application-specific instructions. On the Windows system, the code is a DLL file containing two exported function calls: Install( ) Uninstall( ) The SAS client loads the DLL and invokes the appropriate function calls.
  CodeLength [4 bytes]: Byte size of the code
  Code [X bytes]: Binary file containing the application-specific initialization code. On Windows, this is just a DLL file.

8. LicenseAgreement Section:

The Builder creates the license agreement section 3108. The SAS client displays the license agreement text to the end-user before the application is started for the first time. The end-user must agree to all licensing agreement set by the software vendor in order to use the application.

LicenseTextIsAnsi [1 byte]: 1 if ansi, 0 if Unicode format.

LicenseTextLength [4 bytes]: Byte size of the license text

LicenseAgreement [X bytes]: Null terminating license agreement string

Client Installation and Execution of Streamed Applications Summary

Figure 32:
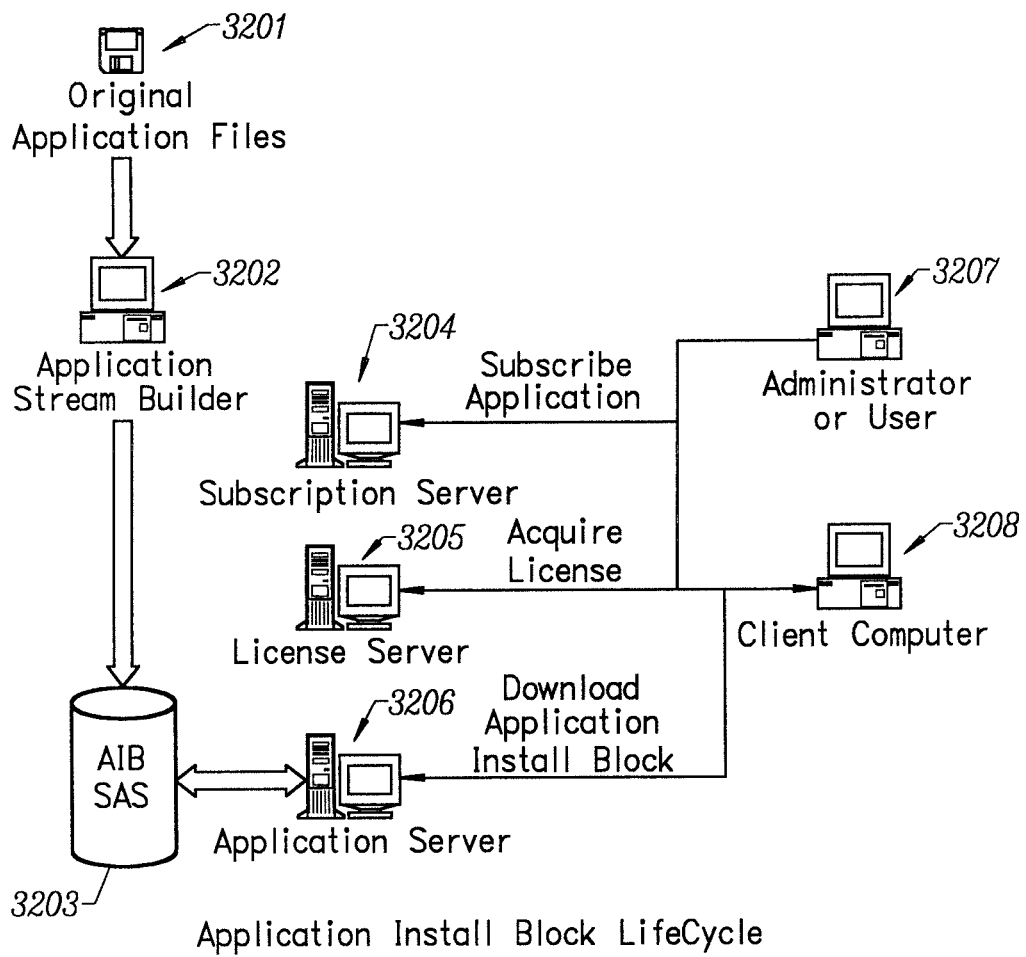
FIG. 32 is a block schematic diagram showing the Application Install Block lifecycle according to the invention.

This section describes the process of installing and uninstalling streamed application on the client machine. With respect to FIG. 32, the lifecycle of the Application Install Block is shown. The Application Stream Builder 3202 takes original application files 3201 and produces a corresponding Application Install Block and Stream Application Set 3203. These two files get installed onto the application servers 3206. On the right side of the drawing, it shows how either the administrator or the user can subscribe to the application from either the client computer 3208 or an administration computer 3207. Once the user logons onto the client computer 3208, the license and the AIB 3203 are acquired from the license 3205 and application servers 3206, respectively.

The following are features of a preferred embodiment of the invention:

1. The streamed application installation process installs just the description of the application, not the total content of the application. After installing such description, the client system looks and feels similar to having installed the same app using a non-streamed method. This has the following benefits:
   a. Takes a very small fraction of the time to install the application.
   b. Takes a very small fraction of the disk space.
   c. Client does not have to wait for the entire application to be downloaded. This is particularly important to users with slow network connections.

The application description is subsequently un-installed without requiring deleting the total contents of the application. This has the benefit that it takes a very small fraction of the time to uninstall the application.

2. Enhancing streamed application's performance by:
   a. Copying small portions of application's code and data (pages) that are critical to performance.
   b. Providing client with the initial profile data that can be used to perform pre-fetching.
   This has the following benefits:
      1. User experiences smooth and predictable application launch.
      2. Scalability of Application servers increases by reducing the number of client connections.

3. An administrator can arrange applications to be installed automatically on client computers. Administrator can also arrange the installation on various client computers simultaneously without being physically present on each client computer. This has the following benefits:
   a. Users are not burdened with the process of installing streamed applications.
   b. Reduced administration expense.

Overview of Components Relevant to the Install Process

Subscription Server 3204: allows users to create accounts & to rent.

License Server 3205: authenticates users & determines licensing rights to applications.

Application Server 3206: provides application bits to licensed users securely & efficiently.

Application Install Manager—a component installed on the streaming client that is responsible for installing and uninstalling streamed applications.

Application Install Block (AIB) 3203—a representation of what gets installed on the client machine when a streamed application is installed. It contains portions of the application that are responsible for registering the application with the client operating system and other data that enhances the execution of streamed application.

Application Stream Builder 3202—preprocesses apps & prepares files to be installed on Application Server and data, such as AIB, to be installed by Client Application Installer.

Stream Application Set 3203—a method of representing the total content of the application in a format that is optimal for streaming.

Client Streaming File System—integrates client exec with paging from a special file system backed by remote network-accessed server-based store.

Application Install Block (AIB)

Installing and un-installing a stream application requires an understanding of what AIB is and how it gets manipulated by the various components in the overall streaming system. AIB is physically represented as a data file with various different sections. Its contents include:

Streamed application name and identification number.

Software License Agreement.

Registry spoof set.

File spoof set.

Small number of application pages—initial cache contents.

Application Profile Data.

AIB Lifecycle

The following describes the AIB lifecycle:

1. Using the process described in the section above concerning converting apps for stream delivery and subsequent execution, an application install block is created by the Application Stream Builder. Initially, there will be one AIB per application, however, as the application evolves via patches and service packs, new AIBs may need to be generated.

2. Using a process described in the section above regarding server-side performance optimization, AIB will get hosted by the application servers.

3. "Subscribing" the application by communicating with the subscription server. Subscribing to an application requires a valid account with the ASP. Either the user or an administrator acting on the user's behalf can subscribe the application. In addition, the application can be subscribed to from any computer on the Internet, not just the client machine where the application will be eventually installed. This allows an administrator to subscribe applications for a group of users without worrying about individual client machines.

4. The client machine acquires the license for the application from the license server. If the application was subscribed from the client machine itself, this step will happen automatically after subscribing to the application. If the subscription happened from a different machine, e.g., the administrator's machine, this step will happen when the user logs on the client machine. As an acknowledgment of having a valid license, the license server gives the client an encrypted access token.
5. Fetch the contents of AIB from the application server. This step is transparent and happens immediately after the preceding step. Since application server requires the client to possess a valid access token, it ensures that only subscribed and licensed users can install the streamed application.
6. The Application Install Manager (AIM) performs the act of installing the application information, as specified by the AIB, on the client system.

Installing a Streamed Application

AIM downloads AIB from the application server and takes the necessary steps in installing the application description on the client system. It extracts pieces of information from AIB and sends messages to various other components (described later) to perform the installation. AIM also creates an Install-Log that can be used when un-installing the streamed application.

1. Display a license agreement to the user and wait for the user to agree to it.
2. Extract File Spoof Data and communicate that to the Client File Spoofer. The list of files being spoofed will be recorded in the Install-Log.
3. Extract Registry Spoof Data and communicate that to the Client Registry Spoofer. The list of Registries being spoofed will be recorded in the Install-Log.
4. Extract Initial Cache Content and communicate that to the Client Prefetch Unit.
5. Extract Profile Data and communicate that to the Client Prefetch Unit.
6. Save the Install-Log in persistent storage.

Un-Installing a Streamed Application

Un-installation process relies on the Install-Log to know what specific items to un-install. Following steps are performed when un-installing and application:

1. Communicate with the Client Registry Spoofer to remove all registries being spoofed for the application being un-installed.
2. Communicate with the Client File Spoofer to disable all files being spoofed for the application being un-installed.
3. Communicate with the Client Prefetch Unit to remove all Profile Data for the application being un-installed.
4. Communicate with the Client Cache Manager to remove all pages being cached for the application being un-installed.
5. Delete the Install-Log.

Client File Spoofer

A file spoofer component is installed on the client machine and is responsible for redirecting file accesses from a local file system to the streaming file system. The spoofer operates on a file spoof database that is stored persistently on the client system; it contains a number of file maps with following format:

[Original path of a local file]$\leftrightarrow$[New path of a file on streaming drive]

Where "$\leftrightarrow$" indicates a bi-directional mapping between the two sides of the relationship shown.

When a streamed application is installed, the list of new files to spoof (found n AIB) is added to the file spoof database. Similarly, when a streamed application is un-installed, a list of files being spoofed for that application is removed from the file spoof database.

On clients running the Windows 2000 Operating System, the file spoofer is a kernel-mode driver and the spoof database is stored in the registry.

Client Registry Spoofer

The Registry Spoofer intercepts all registry calls being made on the client system and re-directs calls manipulating certain registries to an alternate path. Effectively, it is mapping the original registry to an alternate registry transparently. Similar to the client file spoofer, the registry spoofer operates on a registry spoof database consisting entries old/new registry paths. The database must be stored in persistent storage.

When a streamed application is installed, the list of new registries to spoof (found in AIB) is added to the registry spoof database. Upon un-installation of a streamed application, its list of spoofed registries is removed from the registry spoof database.

On clients running the Windows 2000 Operating System, the registry spoofer is a kernel-mode driver and the registry spoof database is stored in the registry.

Client Prefetch Unit

In a streaming system, it is often a problem that the initial invocation of the application takes a lot of time because the necessary application pages are not present on the client system when neeeded. A key aspect of the client install is that by using a client prefetch unit, a system in accordance with the present invention significantly reduces the performance hit associated with fetching. The Client Prefetch Unit performs two main tasks:

1. Populate Initial Cache Content,
2. Prefetch Application Pages.

Initial Cache Content

The Application Stream Builder determines the set of pages critical for the initial invocation and packages them as part of the AIB. These pages, also known as initial cache content, include:

Pages required to start and stop the application,
Contents of frequently accessed directories,
Application pages performing some of the most common operations within application. For example, if Microsoft Word is being streamed, these operations include: opening & saving document files & running a spell checker.

When the Stream Application is installed on the client, these pages are put into the client cache; later, when the streamed application is invoked, these pages will be present locally and network latency is avoided.

In preparing the Prefetch data, it is critical to manage the trade off of how many pages to put into AIB and what potential benefits it brings to the initial application launch. The more pages that are put into prefetch data, the smoother the initial application launch will be; however, since the AIB will get bigger (as a result of packing more pages in it), users will have to wait longer when installing the streamed application. In a preferred embodiment of the invention, the size of the AIB is limited to approximately 250 KB.

In an alternative embodiment of the invention the AIB initially includes only the page/file numbers and not the pages themselves. The client then goes through the page/file numbers and does paging requests to fetch the indicated pages from the server.

Prefetch Application Pages

When the streaming application executes, it will generate paging requests for pages that are not present in the client cache. The client cache manager must contact the application server and request the page in question. The invention takes advantage of this opportunity to also request additional pages that the application may need in the future. This not only reduces the number of connections to the application server, and overhead related to that, but also hides the latency of cache misses.

The application installation process plays a role in the pre-fetching by communicating the profile data present in the AIB to the Client Prefetch Unit when the application is installed. Upon un-installation, profile data for the particular application will be removed.

Caching of Streamed Application Pages within the Network

Summary

This section describes how collaborative caching is employed to substantially improve the performance of a client server system in accordance with the other aspects of the present invention. Specifically, particular caching configurations and an intelligent way to combine these caching configurations are detailed.

Collaborative Caching Features:

Using another client's cache to get required pages/packets (Peer Caching)

Using an intermediate proxy or node to get required pages/packets (Proxy Caching)

Using a broadcasting or multicasting mechanism to make a request (Multicast)

Using a packet based protocol to send requested pages/packets rather than a stream based one. (Packet Protocol)

Using concurrency to request a page through all three means (Peer Caching or Proxy Caching or the actual server) to improve performance (Concurrent Requesting).

Using heuristical algorithms to use all three ways to get the required pages (Smart Requesting).

These features have the following advantages:

These ideas potentially improve the performance of the client, i.e., they reduce the time a client takes to download a page (Client Performance).

These ideas improve the scalability of the server because the server gets fewer requests, i.e., requests which are fulfilled by a peer or a proxy don't get sent to the server. (Server Scalability)

These allow a local caching mechanism without needing any kind of modification of local proxy nodes or routers or even the servers. The peer-to-peer caching is achieved solely through the co-operation of two clients. (Client Only Implementation)

These ideas allow a client to potentially operate "offline" i.e., when it is not getting any responses from the server (Offline Client Operation).

These ideas allow the existing network bandwidth to be used more effectively and potentially reduce the dependency of applications on higher bandwidth (Optimal Use of Bandwidth).

These ideas when used in an appropriate configuration allow each client to require a smaller local cache but without substantially sacrificing the performance that you get by local caching. An example is when each client "specializes" in caching pages of a certain kind, e.g., a certain application. (Smaller Local Cache).

These ideas involve new interrelationships—peer-to-peer communication for cache accesses; or new configurations—collaborative caching. The reason this is called collaborative is because a group of clients can collaborate in caching pages that each of them needs.

Aspects of Collaborative Caching

1. Peer Caching: A client X getting its pages from another client Y's local cache rather than its (X's) own or from the server seems to be a new idea. Major advantages: client performance, server scalability, client only implementation, offline client operation, optimal use of bandwidth, smaller local cache.

2. Proxy Caching: The client getting its pages from an intermediate proxy which either serves the page from the local cache or from another intermediate proxy or the remote server (if none of the intermediate proxies has the page) is unique, at a minimum, for the pages of a streamed application. Major advantages: client performance, server scalability, offline client operations (to some extent), optimal use of bandwidth, smaller local cache.

3. Multicast: Using multicasting (or selective broadcasting) considerably reduces peer-to-peer communication. For every cache request there is only one packet on the network and for every cache response there is potentially only one packet on the network in some configurations. This definitely helps reduce network congestion. Major advantages: client performance, server scalability, client only implementation, offline client operation, optimal use of bandwidth 4. Packet Protocol: Because only datagram packets are used to request or respond to cache pages this saves the overhead of opening stream-based connections such as a TCP connection or an HTTP connection. Major advantages: client performance, client only implementation, offline client operation, and optimal use of bandwidth.

5. Concurrent Requesting: If concurrent or intelligently staggered requests through all three means are issued to request a single page, the client will be able to receive the page through the fastest means possible for that particular situation. Major advantages: client performance, server scalability, offline client operation, and optimal use of bandwidth 6. Smart Requesting: An adaptive or "smart" algorithm can be used to further enhance the overall performance of the client-server system. In this algorithm, the client uses the data of how past requests were processed to "tune" new requests. For example, if the client's past requests were predominantly served by another client, i.e., Peer Caching worked, then for new page requests the client would first try to use Peer Caching, and wait some time before resorting to either Proxy Caching or direct server request. This wait time can again be calculated in an adaptive fashion. Major advantages: client performance, server scalability, client only implementation, offline client operation, and optimal use of bandwidth.

The concepts illustrated herein can be applied to many different problem areas. In all client-server implementations where a server is serving requests for static data, e.g., code pages of a streamed application or static HTML pages from a Website, the approaches taught herein can be applied to improve the overall client-server performance. Even if some of the protocols or configurations described in this document are not supported by the underlying network, it does not preclude the application of other ideas described herein that do not depend on such features. For example, if multicast (or selective broadcast) is not supported, ideas such as Concurrent Requesting or Smart Requesting can still be used with respect to multiple servers instead of the combination of a server, peer, and proxy. Also the use of words like Multicast does not restrict the application of these ideas to multicast based protocols. These ideas can be used in all those cases where a multicast like mechanism, i.e., selective broadcasting is available. Also note that the description of these ideas in the context of LAN or intranet environment does not restrict their application to such environments. The ideas described here are applicable to any environment where peers and proxies, because of their network proximity, offer significant performance advantages by using Peer Caching or Proxy Caching over a simple client-server network communication. In that respect, the term LAN or local area network should be understood to mean more generally as a collection of nodes that can communicate with each other faster than with a node outside of that collection. No geographical or physical locality is implied in the use of the term local area network or LAN.

Peer Caching

Figure 33:
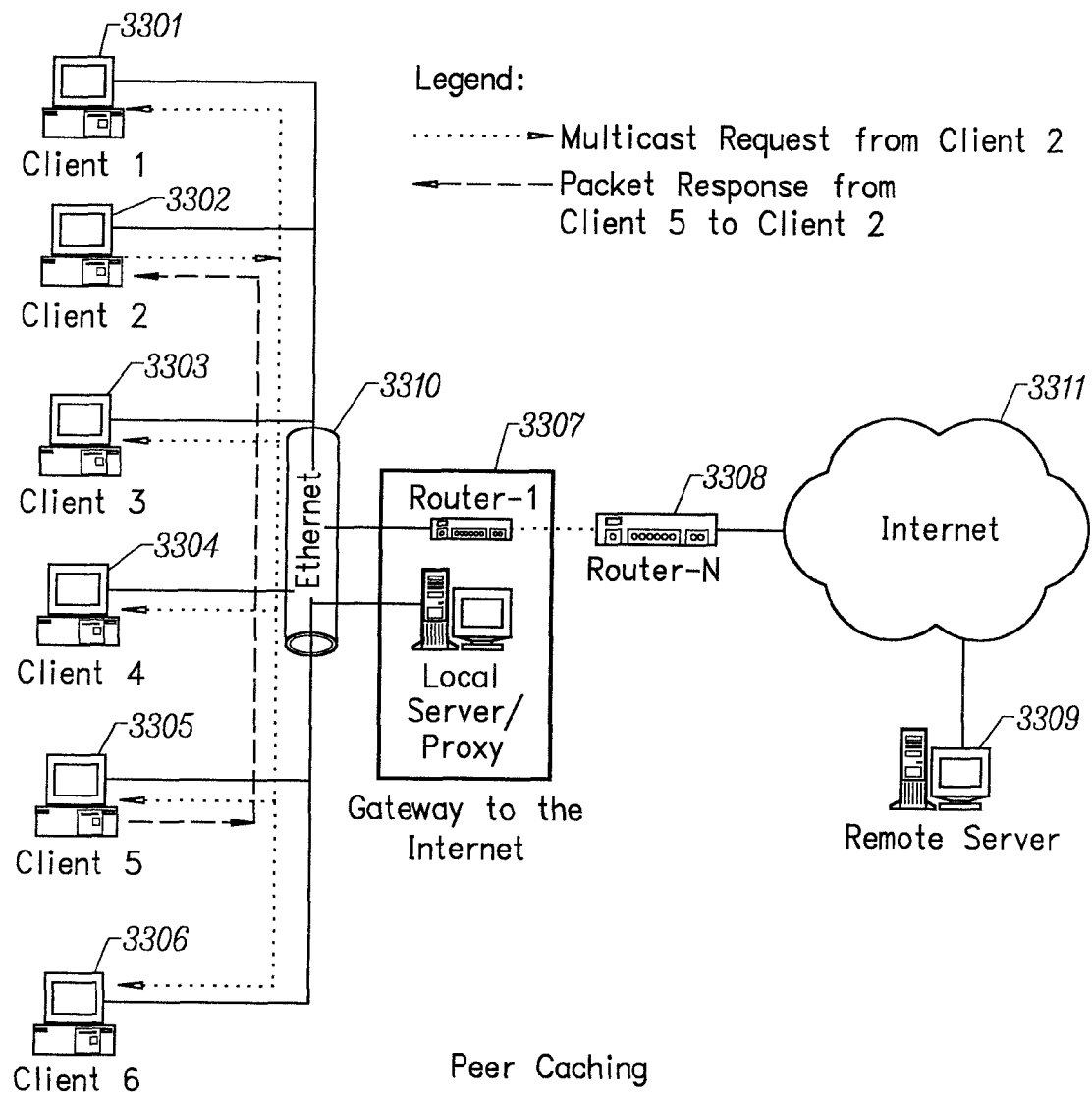
FIG. 33 is a block schematic diagram showing peer caching according to the invention.
Figure 34:
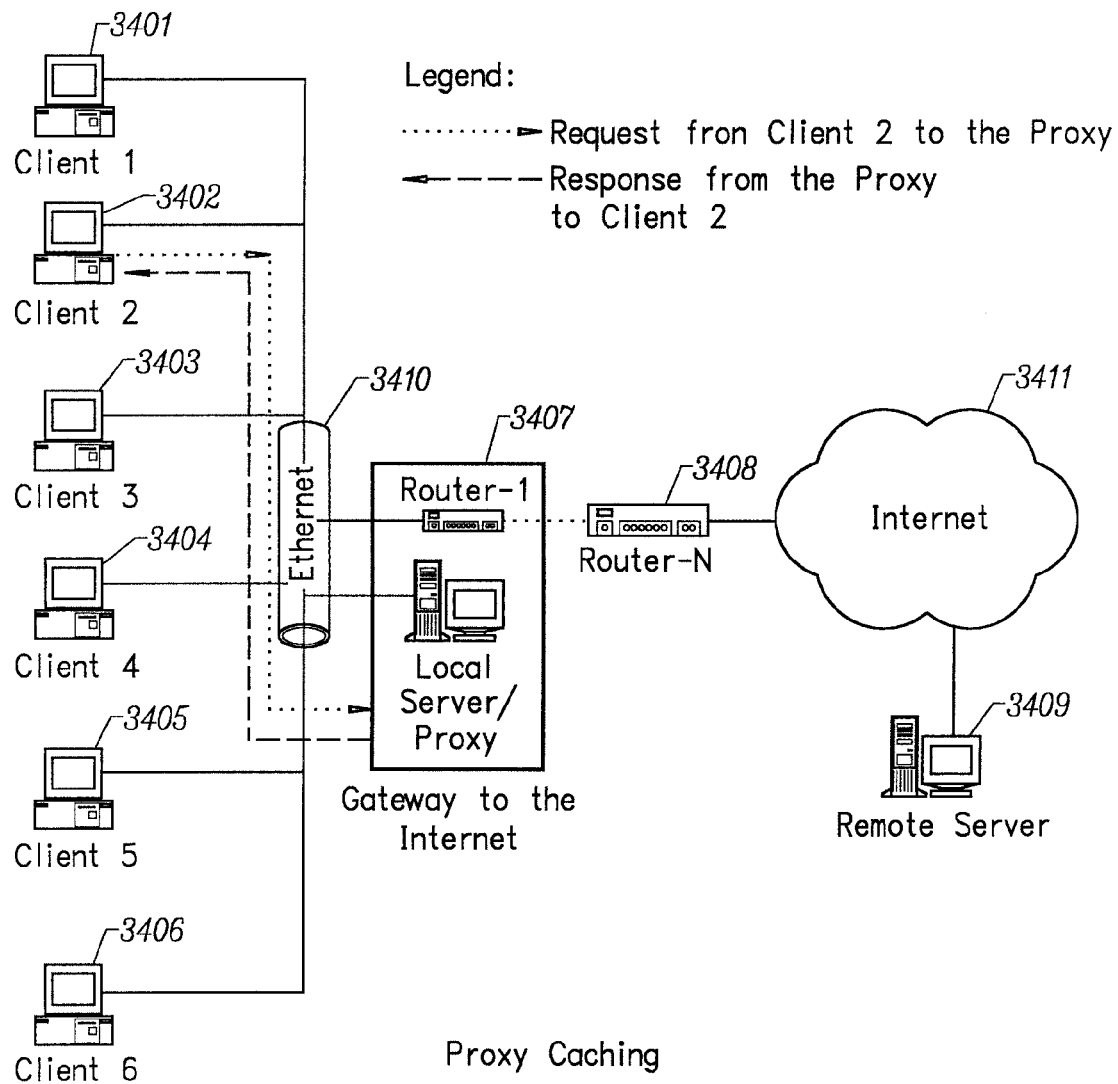
FIG. 34 is a block schematic diagram showing proxy caching according to the invention.

Referring to FIG. 33, how multiple peers collaborate in caching pages that are required by some or all of them is shown.

The main elements shown are:
Client 1 3301 through Client 6 3306 in an Ethernet LAN 3310.
Router 1 and the local proxy serving as the Internet gateway 3307. Note that it does not matter whether Router 1 and the proxy are one computer or two different ones.
Other routers from router 2 through router N 3308 that are needed to connect the LAN 3310 to the Internet 3311.
A remote server 3309 (that is reachable only by going over the Internet 3311) that is serving the pages that the above mentioned clients need.
A cloud that symbolizes the complexity of the Internet 3311 and potentially long paths taken by packets.

Client 2 3302 needs a page that it does not find in its local cache. It then decides to use the mechanism of Peer Caching before attempting to get the page from the local proxy (or the actual server through the proxy). The actual sequence of events is as follows:

1. Client 2 3302 sends a request for the page it needs. This request is sent as a multicast packet to a predetermined multicast address and port combination. Lets call this multicast address and port combination as M.
2. The multicast packet is received by all the clients that have joined the group M. In this case all six clients have joined the group M.
3. Client 5 3305 receives the request and it records the sender's, i.e., Client 2's 3302, address and port combination. Let's assume this address and port combination is A. Client 5 3305 processes the request and looks up the requested page in its own cache. It finds the page.
4. Client 5 3305 sends the page to address A (which belongs to Client 2 3302) as a packet.
5. Client 2 3302 receives the page it needs and hence does not need to request the server for the page.

Proxy Caching

Figure 43:
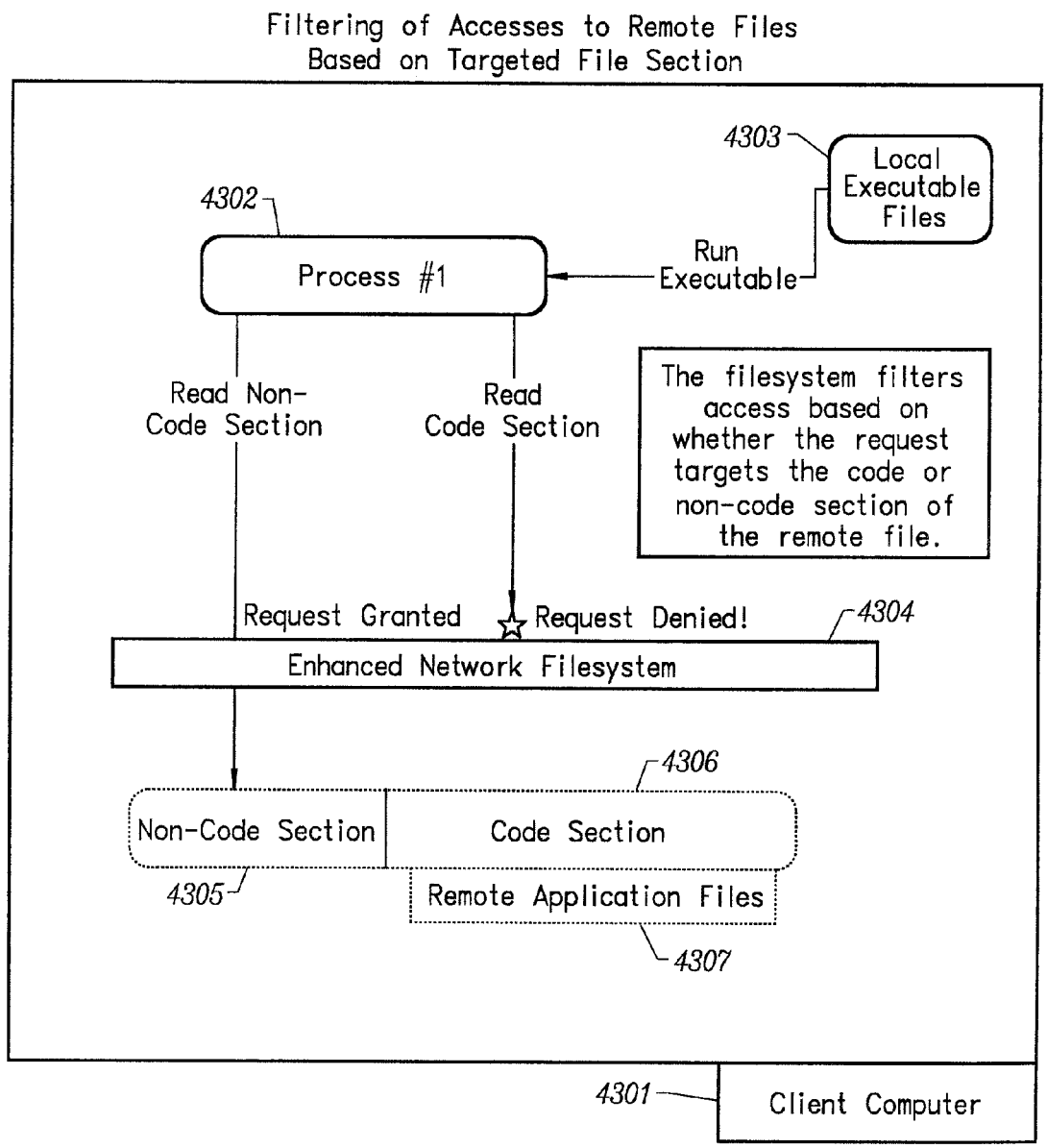
FIG. 43 is a block schematic diagram showing the filtering of accesses to remote files based on targeted file section according to the invention.

With respect to FIG. 43, a transparent proxy and how clients use it to get pages is shown. Again the elements here are the same as in the previous figure:
Client 1 3401 through Client 6 3406 in an Ethernet LAN 3410.
Router 1 and the local proxy serving as the Internet gateway 3407. Note that it does not matter whether Router 1 and the proxy are one computer or two different ones.
Other routers from router 2 through router N 3408 that are needed to connect the LAN 3410 to the Internet 3411.
A remote server 3409 (that is reachable only by going over the Internet 3411) that is serving the pages that the above mentioned clients need.
A cloud that symbolizes the complexity of the Internet 3411 and potentially long paths taken by packets.

Assume Peer Caching is either not enabled or did not work for this case. When Client 2 3402 needs a page, it makes a request to the proxy 3407. The proxy 3407 finds the page in its local cache and returns it to Client 2 3402. Because of this, the request did not go to the remote server 3409 over the Internet 3411.

Multicast and Packet Protocol within a LAN

Figure 35:
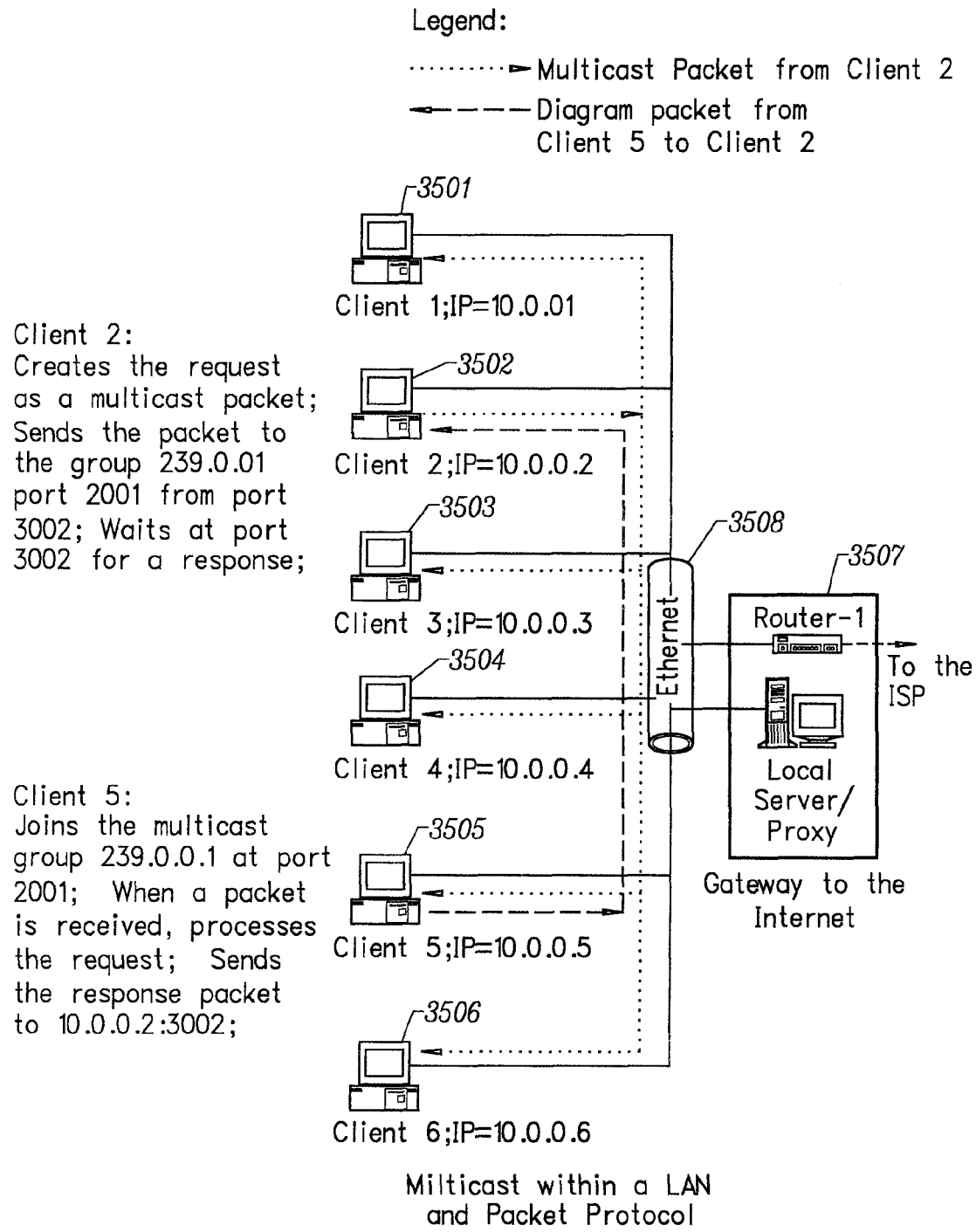
FIG. 35 is a block schematic diagram showing multicast within a LAN and a packet protocol according to the invention.

Referring to FIG. 35, the role played by multicast and unicast packets in Peer Caching is shown. The example of the drawing "Peer Caching" is used to explain multicast. Here Client 2 3502 has the IP address 10.0.0.2 and it opens port 3002 for sending and receiving packets. When Client 2 3502 needs a page and wants to use Peer Caching to get it, it forms a request and sends it to the multicast address and port 239.0.0.1:2001. All the other clients in the LAN 3508 that support Peer Caching have already joined the group 239.0.0.1:2001 so they all receive this packet.

Client 5 3505 receives this packet and it records the sender address (10.0.0.2:3002 in this case). It looks up the requested page and finds it in its local cache. It sends the page as a response packet to the address 10.0.0.2:3002.

Client 2 3502 receives this response packet since it was waiting at this port after sending the original multicast request. After ensuring the validity of the response, it retrieves the page it needs.

Note that more than one client can respond to the original multicast request. However Client 2 3502 can discard all the later responses, since it has already received the page it needed.

Concurrent Requesting—Proxy First

Figure 36:
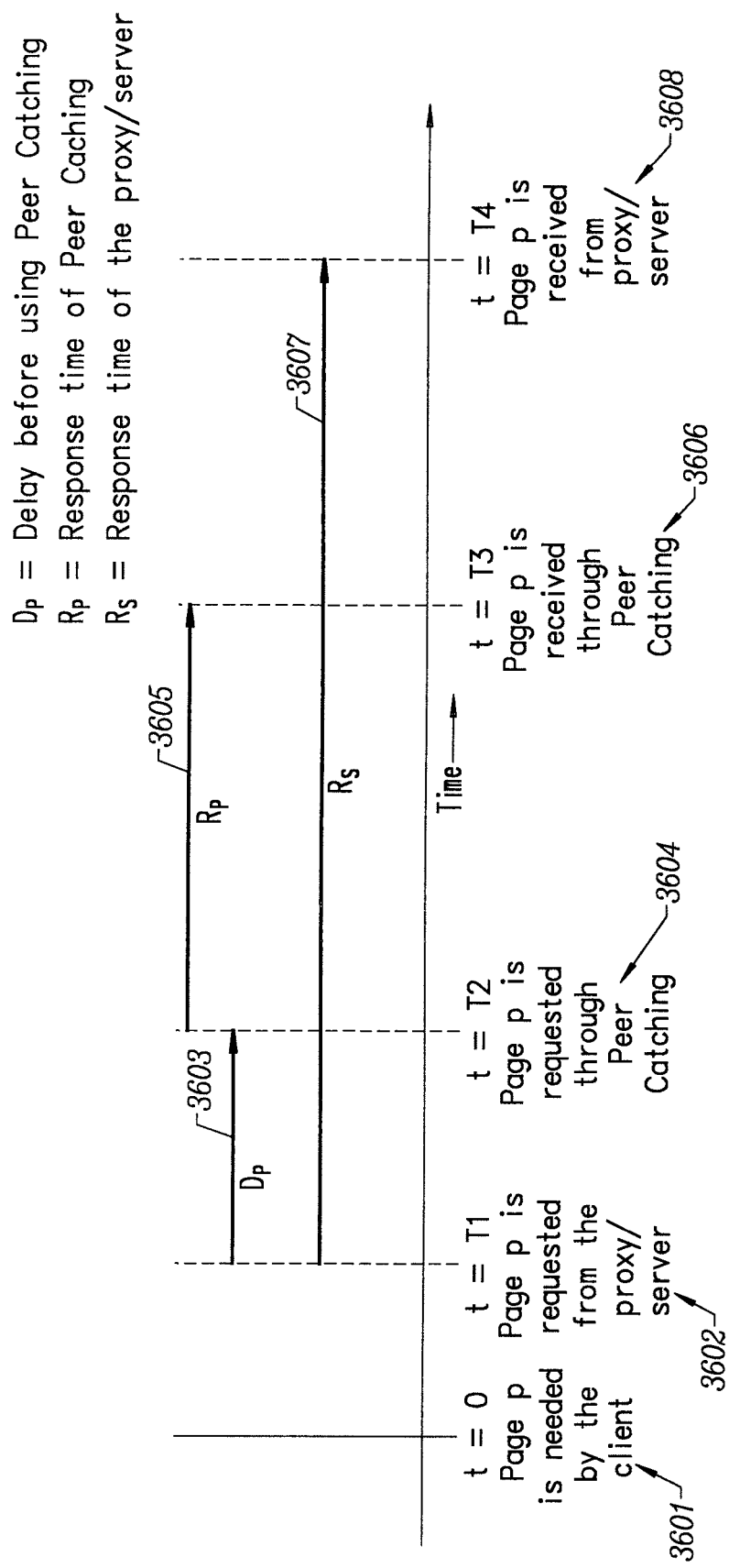
FIG. 36 is a block schematic diagram showing concurrent requests for application server pages, for the case when the page is first requested through the proxy according to the invention.

With respect to FIG. 36, one particular case of how Concurrent Requesting is used is shown. This is a timeline of events that take place in the client. When a client first needs a page, it does not know whether it is going to get any responses through Peer Caching or not. Hence it issues a request to the proxy (or the server through the proxy) as soon as it needs the page. Then it issues a request using the Peer Caching mechanism. If there is indeed a peer that can return the page requested, the peer presumably could return the page faster than the proxy or the server. If this happens, the client may decide to use Peer Caching mechanism before attempting to get the page from the proxy or the server. The timeline essentially describes the following sequence of events:

1. At time t=0, a page p is needed by the client 3601.
2. The client looks up its local cache, and it doesn't find page p.
3. At time t=T1, it decides to send a request to the proxy to get the page 3602.
4. After a delay of amount $D_P$ 3603, at time t=T2 it also sends a request for the page p through the mechanism of Peer Caching 3604. Note that $D_P$ 3603 can be zero, in which case T1=T2.
5. At time t=T3, a response is received from another peer that contains the page p that this client needs 3606. Thus the response time of the Peer Caching mechanism is $R_P$=T3−T2 3605.
6. At time t=T4, a response from the proxy/server is received that contains the page p 3608. Hence the response time of the proxy/server is $R_S$=T4−T1 3607.

Note that since, $R_P$<$R_S$, the client will increase the weighting for Peer Caching in all of its future queries. That means it will decrease $D_P$, and if $D_P$ is already zero, it will increase $D_S$ (the delay before requesting proxy/server). On the other hand, if $R_P$>$R_S$ or if $R_P$ were infinity, it will increase its weighting for proxy/server requesting. This is part of Smart Requesting that is explained elsewhere in this document.

Concurrent Requesting—Peer Caching First

Figure 37:
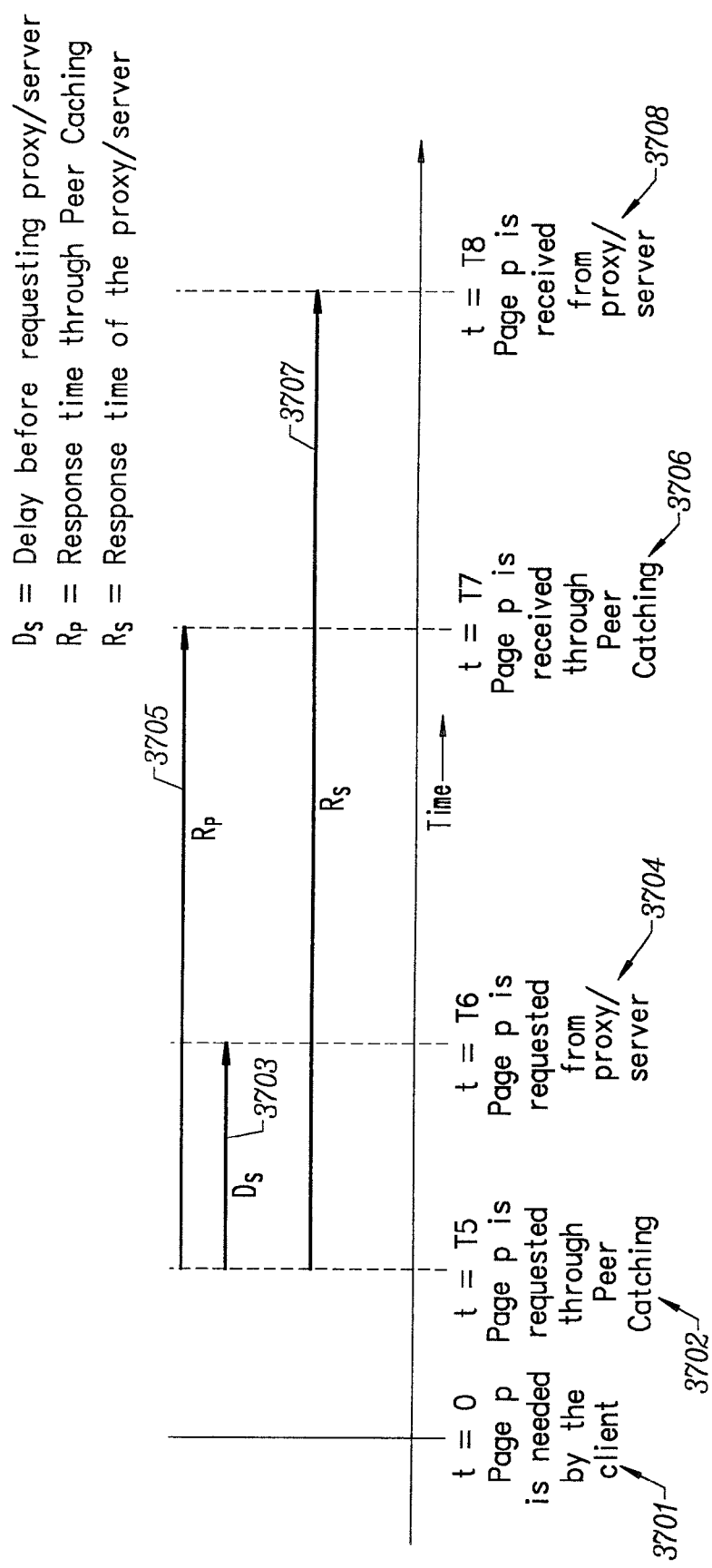
FIG. 37 is a block schematic diagram showing concurrent requests for application server pages, for the case when the page is first requested through the peer caching according to the invention.

Referring to FIG. 37, in contrast to the previous figure, the client has decided to use Peer Caching before requesting the proxy. So the sequence of events is as follows:

1. At time t=0, a page p is needed by the client 3701.
2. The client looks up its local cache, and it doesn't find page p.
3. At time t=T5, it decides to send a request for the page p through the mechanism of Peer Caching 3702.
4. After a delay of amount $D_S$ 3703, at time t=T6 it also sends a request for the page p to the proxy/server. Note that $D_S$ can be zero, in which case T5=T6.
5. At time t=T7, a response is received from another peer that contains the page p that this client needs 3706. Thus the response time of the Peer Caching mechanism is $R_P$=T7−T5 3705.
6. At time t=T8, a response from the proxy/server is received that contains the page p 3708. Hence the response time of the proxy/server is $R_S$=T8−T6 3707.

As described in the previous drawing, the client increases the weighting of Peer Caching even more because it got a response through Peer Caching long before it got a response from the proxy/server. As a result of the increases weighting the delay $D_S$ is increased even more.

Concurrent Requesting—Peer Caching Only

Figure 38:
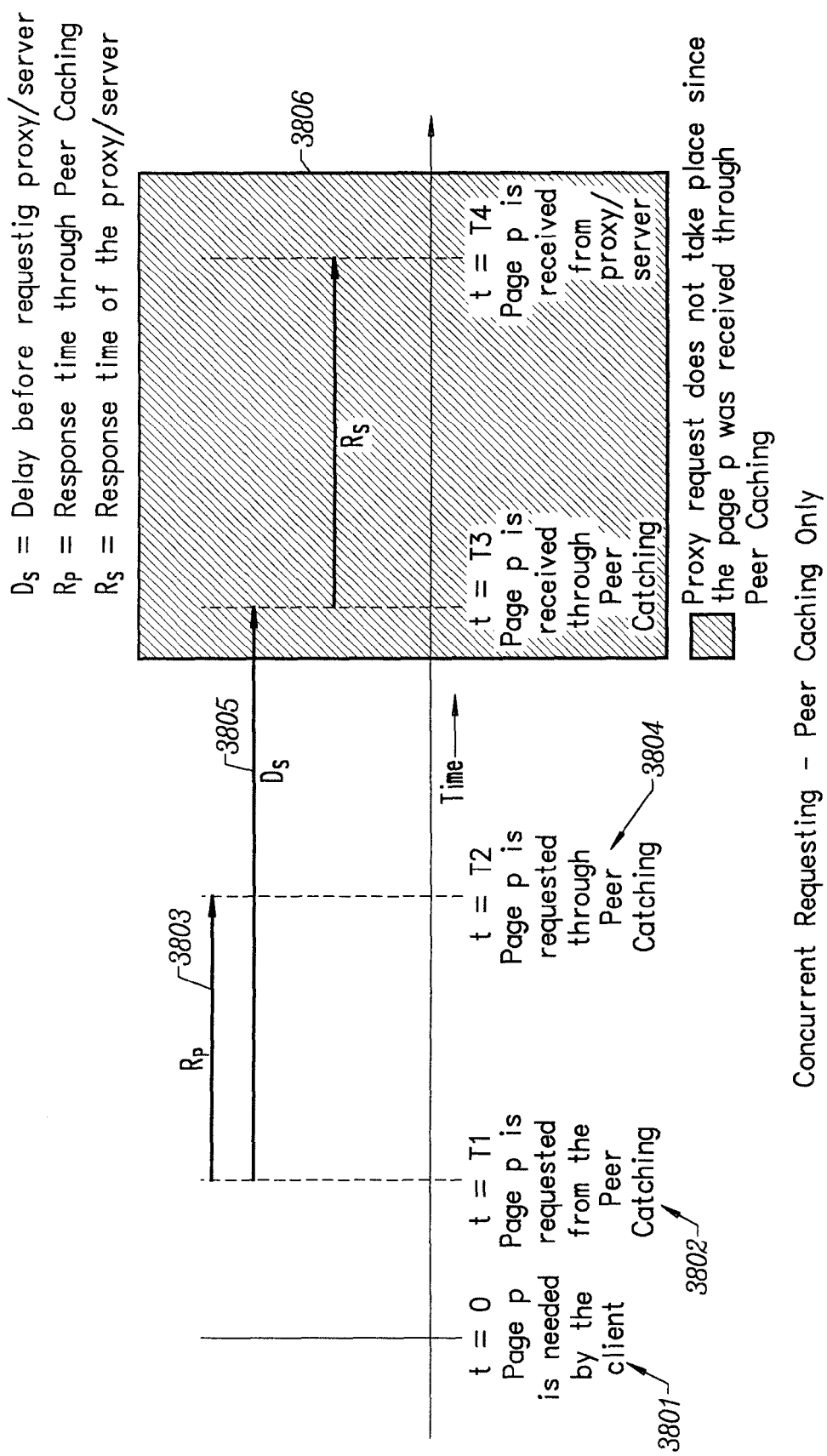
FIG. 38 is a block schematic diagram showing concurrent requests for application server pages, for the case when the page is received only through peer caching according to the invention.

With respect to FIG. 38, in contrast with FIG. 37, the client has increased $D_S$ 3805 (the delay before requesting a proxy/server) so much, that if a page is received before the expiry of the delay $D_S$ 3805, the client does not even make a request to the proxy/server. The shaded area 3806 shows the events that do not take place because of this.

Client-Server System with Peer and Proxy Caching

Figure 39:
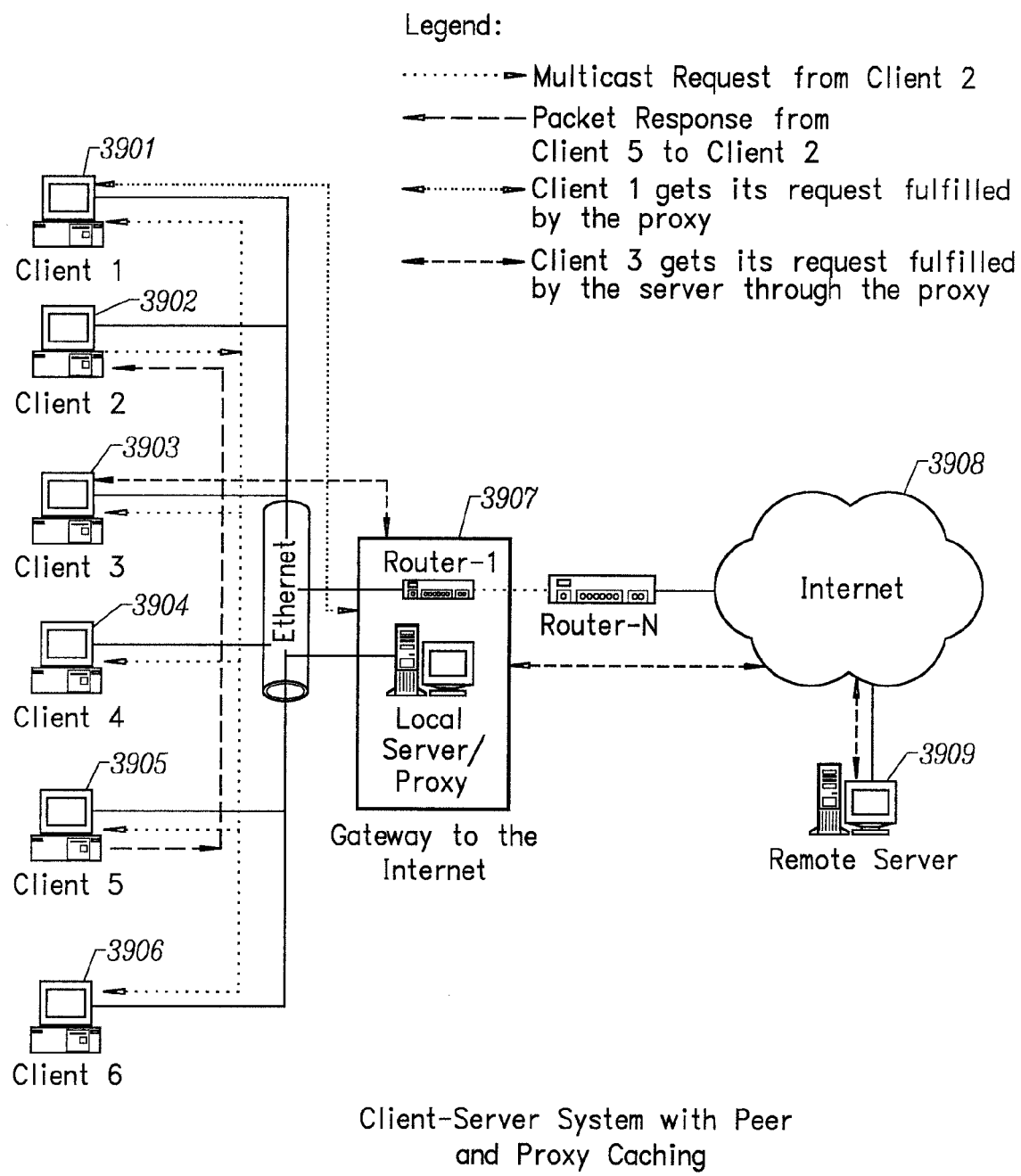
FIG. 39 is a block schematic diagram showing a client-server system using peer and proxy caching according to the invention.

Referring to FIG. 39, a system level drawing that gives a system context for all the other figures and discussion in this document is shown. This drawing illustrates all three ways in which a client gets its page requests fulfilled. Note that:

Client 2 3902 gets its page request fulfilled through Peer Caching, i.e., multicast request.
Client 1 3901 gets its page request fulfilled through Proxy Caching, i.e., the proxy 3907 finds the page in its cache and returns it.
Client 3 3903 has to go to the server 3909 over the Internet 3908 to get its page request fulfilled.

Collaborative Caching Details

In a typical client-server model, caching could be used to improve the performance of clients and scalability of servers. This caching could be:

Local to the client where the client itself locally stores the pages it had received from the server in the past. Then the client would not need to request the proxy/server for any page that resides in the local cache as long as the locally cached page is "valid" from the server point of view.
On a proxy node that can be any node along the path taken by a packet that goes from the client to the server. The closer this proxy node is to the client the more improvement in the performance you get.
On a peer node, that is on another client. In this case, the two clients (the requesting client as well as the serving client) are on the same LAN or intranet, so that the travel time of a packet between the two nodes is considerably smaller as compared to the travel time of the packet from one of the clients to the server.

As far as caching is concerned, this section details the new ideas of Peer Caching and Proxy Caching. In addition, it also details the new ideas of Concurrent Requesting and Smart Requesting. The preferred approaches for implementing these ideas are also described here and these are Multicast and Packet Protocol.

The idea of Peer Caching is nothing but a client X taking advantage of the fact that a peer, e.g., say another client Y, on its LAN had, in the past, requested a page that X is going to request from its server. If the peer Y has that page cached locally on its machine, then X could theoretically get it much faster from Y than getting it from the server itself. If an efficient mechanism is provided for the two clients X and Y to collaborate on this kind of cache access, then that will offer many advantages such as: Client Performance, Server Scalability, Client Only Implementation, Offline Client Operation, Optimal Use of Bandwidth, Smaller Local Cache. Note that two clients were considered only as an example, the idea of Peer Caching is applicable to any number of peers on a LAN.

The idea of Multicast is to use the multicast protocol in the client making a Peer Caching request. Multicast can be briefly described as "selective broadcasting"—similar to radio. A radio transmitter transmits "information" on a chosen frequency, and any receiver (reachable by the transmitter, of course) can receive that information by tuning to that frequency. In the realm of multicast, the equivalent of a radio frequency is a multicast or class D IP address and port. Any node on the net can send datagram packets to a multicast IP address+port. Another node on the net can "join" that IP address+port (which is analogous to tuning to a radio frequency), and receive those packets. That node can also "leave" the IP address+port and thereby stop receiving multicast packets on that IP address+port.

Note that multicast is based on IP (Internet Protocol) and is vendor neutral. Also, it is typically available on the Ethernet LAN and, if routers supported it, it can also go beyond the LAN. If all the routers involved in a node's connection to the Internet backbone supported multicast routing, multicast packets theoretically could go to the whole Internet except the parts of the Internet that do not support multicast routing.

The use of multicast allows a client to not have to maintain a directory of peers that can serve its page requests. Also because of multicast there is only one packet per page request. Any peer that receives the request could potentially serve that request, so by using a multicast based request there are multiple potential servers created for a page request but only one physical packet on the network. This contributes substantially in reducing network bandwidth, but at the same time increasing peer accessibility to all the peers. When implemented properly, the packet traffic due to Peer Caching will be proportional to the number of clients on the network participating in Peer Caching.

An idea related to Multicast is Packet Protocol. Note that Multicast itself is a packet-based protocol as opposed to connection based. The idea of Peer Caching here is described using Multicast and Packet Protocol. The Peer Caching request is sent as a multicast request and the response from a peer to such a request is also sent as a packet (not necessarily a multicast packet). Sending packets is much faster than sending data through a connection-based protocol such as TCP/IP, although using packet-based protocol is not as reliable as using connection-based one. The lack of reliability in Packet Protocol is acceptable since Peer Caching is used only to improve overall performance of the Client-Server system rather than as a primary mechanism for a client to get its pages. The underlying assumption made here is that a client could always get its pages from the server, if Peer Caching or Proxy Caching does not work for any reason.

The ideas of Concurrent Requesting and Smart Requesting describe how Peer Caching, Proxy Caching and client-server access could be combined in an intelligent fashion to achieve optimal performance of the whole Client-Server system. As part of Concurrent Requesting, a client is always prepared to make concurrent requests to get the page it needs in the fastest way possible. Concurrent Requesting would require the use of objects such as threads or processes that would allow one to programmatically implement Concurrent Programming. This document assumes the use of threads to describe a possible and preferred way to implement Concurrent Requesting.

The idea of Smart Requesting includes using an adaptive algorithm to intelligently stagger or schedule requests so that a client, even while using Concurrent Requesting, would not unnecessarily attempt to get a page through more than one means. An example of this is when a client has consistently gotten its page requests fulfilled through Peer Caching in the past. It would come to depend on Peer Caching for future page requests more than the other possible means. On the other hand, if Peer Caching has not worked for that client for some time, it would schedule a proxy request before a Peer Caching request. Smart Requesting involves dynamically calculating the delays $D_P$ and $D_S$ based how well Peer Caching and Proxy Caching has worked for the client. Please see FIGS. 36 through 38.

The following is an algorithmic description using pseudo-code of an illustrative embodiment.

startOurClient is a function that is invoked initially when the client is started.

```
void startOurClient( ) {
    Initialize the global variable delay to appropriate value based on a
    predfined policy. When delay is positive, it signifies the amount of
    time to wait after Proxy Caching before Peer Caching is attempted;
    and when delay is negative it signifies the amount of time to wait
    after Peer Caching before Proxy Caching is attempted. As an
    example:
    delay = 50;
    Start a thread for peer responses (i.e., Peer Caching server) with
    thread function as peerServer;
}
``` getPage function

The function getPage is called by the client's application to get a page. This function looks up the local cache and if the page is not found, attempts to get the page from a peer or proxy/server using the ideas of Concurrent Requesting and Smart Requesting.

```
void getPage(PageIdType pageId) {
    if pageId present in the local cache then {
        retrieve it and return it to the caller;
    }
    if (delay > 0) {
        myDelay = delay;
        Call requestProxy(pageId);
    }
    else {
        myDelay = -delay;
        Call requestPeer(pageId);
    }
    Wait for gotPage event to be signaled for a maximum of myDelay
    milliseconds;
    If the page was obtained as indicated by gotPage being signaled {
        Modify delay appropriately i.e., if the page was obtained through
        Proxy Caching increment
        delay else decrement it;
        Return the page;
    }
    if (delay > 0) {
        Call requestPeer(pageId);
    }
    else {
        Call requestProxy(pageId);
    }
    Wait for the page to come through either methods;
    Depending on how the page came (through Proxy Caching or Peer
```

-continued

```
    Caching) increment or decrement delay;
    Return the page;
}
``` requestProxy function

The function requestProxy sends a page request to the proxy and starts a thread that waits for the page response (or times out). The function proxyResponse is the thread function that waits for the response based on the arguments passed to it.

```
void requestProxy(pageId) {
    Send a page request for pageId to a predefined proxy/server as per the
    proxy/server protocol;
    Start a thread with the thread function proxyResponse that waits for
    the response to the request - the function proxyResponse is passed
    arguments: the socket X where it should wait and pageId.
}
void proxyResponse(socket X, pageId) {
    Wait at the socket X for a response with a timeout of time TY;
    If a response was received at socket X {
        Uncompress the packet if necessary;
        Validate the packet and ensure that this is a valid response to the
        request and has the page requested (i.e., match the pageId);
    }
    else {
        // this is time out: didn't receive any
        // response in time TY
        Set appropriate indicator to indicate time-out;
    }
    Signal an event to signify completion of this thread;
}
``` requestPeer and peerResponse functions

The function requestPeer is similar to requestProxy except that it sends a page request to peers and starts a thread that waits for the page response (or times out). The function peerResponse is the thread function that waits for the response based on the arguments passed to it.

```
Void requestPeer(pageId) {
        Create a UDP socket X bound to port 3002;
        Compose a packet that consists of:
            - a code indicating that this is a request for a page
            - Some kind of an identifier that uniquely identifies the
              page wanted such as the URL
            - other info such as security information or access validators
        Send this packet as a multicast packet to 239.0.0.1:2001 through
        the socket X created above;
        Create a thread with the thread function peerResponse and pass
        socket X and pageId as arguments to it;
}
Void peerResponse(socket X, pageId) {
    Wait at the socket X for a response with a timeout of time TX;
    If a packet was received at socket X {
        Uncompress the packet if necessary;
        Validate the packet and ensure that this is a valid response to
        the request and has the page requested (i.e., match the pageId);
    }
    else {
        // this is time out: didn't receive any
        // response in time TX
        Set appropriate indicator to indicate time-out;
    }
    Signal an event to signify completion of this thread;
}
``` peerServer function

The function peerServer described below serves page requests received through Peer Caching as multicast packets. The function below describes how this thread would work:

```
void peerServer( ) {
    Create a multicast socket M bound to port 2001;
    Have M "join" the IP address 239.0.0.1;
    while (not asked to terminate) {
        Wait at M for a multicast packet;
        If a packet is received then {
        Store the source IP addr in S along with the source port number in B;
        Validate the packet that it is a valid request for a page that can
        be served (with valid security credentials);
                Look up the page id in the local client cache;
                If the page is found {
                    Compose a packet that contains the pageId of the page
                    as well as the page contents to send;
                    Optionally compress the packet before sending;
                    Send this packet to the IP address S at port B;
                }
            }
        }
}
```

Piracy Prevention for Streamed Applications

Summary

The details presented in this section describe new techniques of the invention that have been developed to combat software piracy of applications provided over networks, in situations where an ASP's clients' machines execute the software applications locally. The remote ASP server must make all the files that constitute an application available to any subscribed user, because it cannot predict with complete accuracy which files are needed at what point in time. Nor is there a reliable and secure method by which the server can be aware of certain information local to the client computer that could be useful at stopping piracy. The process may be a rogue process intent on pirating the data, or it may be a secure process run from an executable provided by the ASP.

Aspects of the Invention

1. Client-side fine-grained filtering of file accesses directed at remotely served files, for anti-piracy purposes. Traditional network filesystems permit or deny file access at the server side, not the client side. Here, the server provides blanket access to a given user to all the files that the user may need during the execution of an application, and makes more intelligent decisions about which accesses to permit or deny.
2. Filtering of file accesses based on where the code for the process that originated the request is stored. Traditional file systems permit or deny file access usually based on the credentials of a user account or process token, not on where the code for the process resides. Here, a filesystem may want to take into account whether the code for the originating process resides in secure remote location or an insecure local location.
3. Identification of crucial portions of served files and filtering file accesses depending on the portion targeted. The smallest level of granularity that traditional file systems can operate on is at the level of files, not at the level of the sections contained in the files (for example, whether or not data from a code section or a resource section is requested).
4. Filtering of file accesses based on the surmised purpose of the file access, as determined by examining the program stack or flags associated with the request. Traditional file systems do not attempt to determine why a file access was issued before permitting or denying the access, e.g., whether the purpose is to copy the data or page in the data as code for execution.
5. Filtering of file accesses based on the surmised purpose of the file access, as determined by examining a history of previous file accesses by the same process. Traditional file systems do not keep around histories of which blocks a given requestor had previously requested from a file. This history can be useful in seeing if the requests match a pattern that suggests a file copy is occurring as opposed to code execution.

Benefits of the Anti-Piracy Features of the Present Invention

This is an enabler technology that allows a programmer to build security into a certain type of application delivery system that would otherwise not be possible. Several companies are developing technology that allows an application to be served remotely, but executed locally. Current filesystems provide no way to protect the files that make up this application from being copied and thus pirated. The above techniques are tools that enable a filesystem to allow just those requests that will let the application run normally and block those that are the result of attempts to pirate the application's code or data. This provides a competitive advantage to those software providers who use this technology, because piracy results in lost revenue and, by preventing this, piracy they can prevent this loss.

The techniques described herein were developed for the purpose of preventing the piracy of computer software programs that are served from a remote server, but executed on a local client. However, they can be used by any computer software security solution that would benefit from the ability to filter file accesses with more flexibility than currently provided by most filesystems.

When a filesystem receives a request, it must decide whether or not the request should be granted or denied for security reasons. If the target file is local, the filesystem makes the decision by itself, and if the target file is remote, it must ask the server to handle the request for it. The above techniques are ways in which the filesystem can gather more information about the request than it would ordinarily have. It can then use that information to improve the quality of its decisions. Traditional approaches, such as granting a currently logged-in user access to certain files and directories that are marked with his credentials, are not flexible enough for many situations. As for remote files, the server has only a limited amount of information about the client machine. The filesystem at the client side can make grant/deny decisions based on local information before ever asking the server, in order to provide a more intelligent layer of security.

For example, it may be desirable to allow the user to execute these files, but not copy them. It may be desirable to grant access to only certain processes run by the user, but not others, because it is judged that some processes to be more secure or well-behaved than others. And it may be desirable to allow the user to access only certain sections of these files and from only certain processes for certain periods of time. The above techniques are tools that are added to a filesystem to give it these abilities.

Overview of the Anti-Piracy Features of the Present Invention

Figure 40:
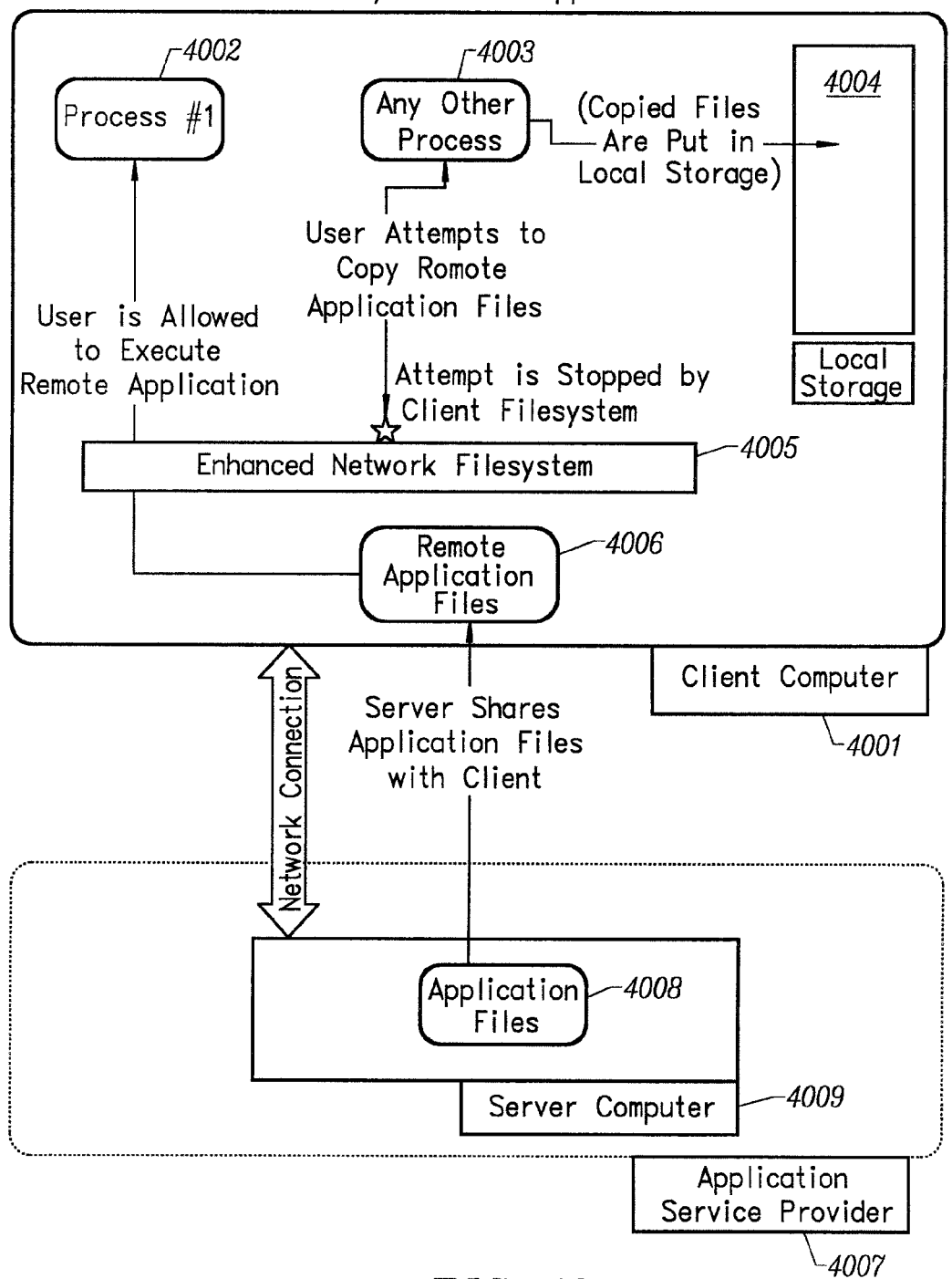
FIG. 40 is a block schematic diagram showing a preferred embodiment of the invention preventing piracy of remotely served, locally executed applications according to the invention.

With respect to FIG. 40, preventing piracy of remotely served, locally executed applications is shown. This figure illustrates the problem of software piracy in an application delivery system, and how it can be stopped using the techniques described in this section. The client computer 4001 is connected to a server 4009 run by an ASP 4007. The server 4009 provides access to application files 4008, out of which the application executable is run by the client 4001 locally on his machine. (This is Process #1 4002). However, the user can attempt to access and copy the application files to local storage 4009 on his machine, and thus be able to run them without authorization or give them to another person. But since all requests directed at the remote files 4006 must first pass through the local network filesystem, this filesystem can be enhanced 4005 to deny all such requests that it thinks are the result of an attempt at piracy.

Figure 41:
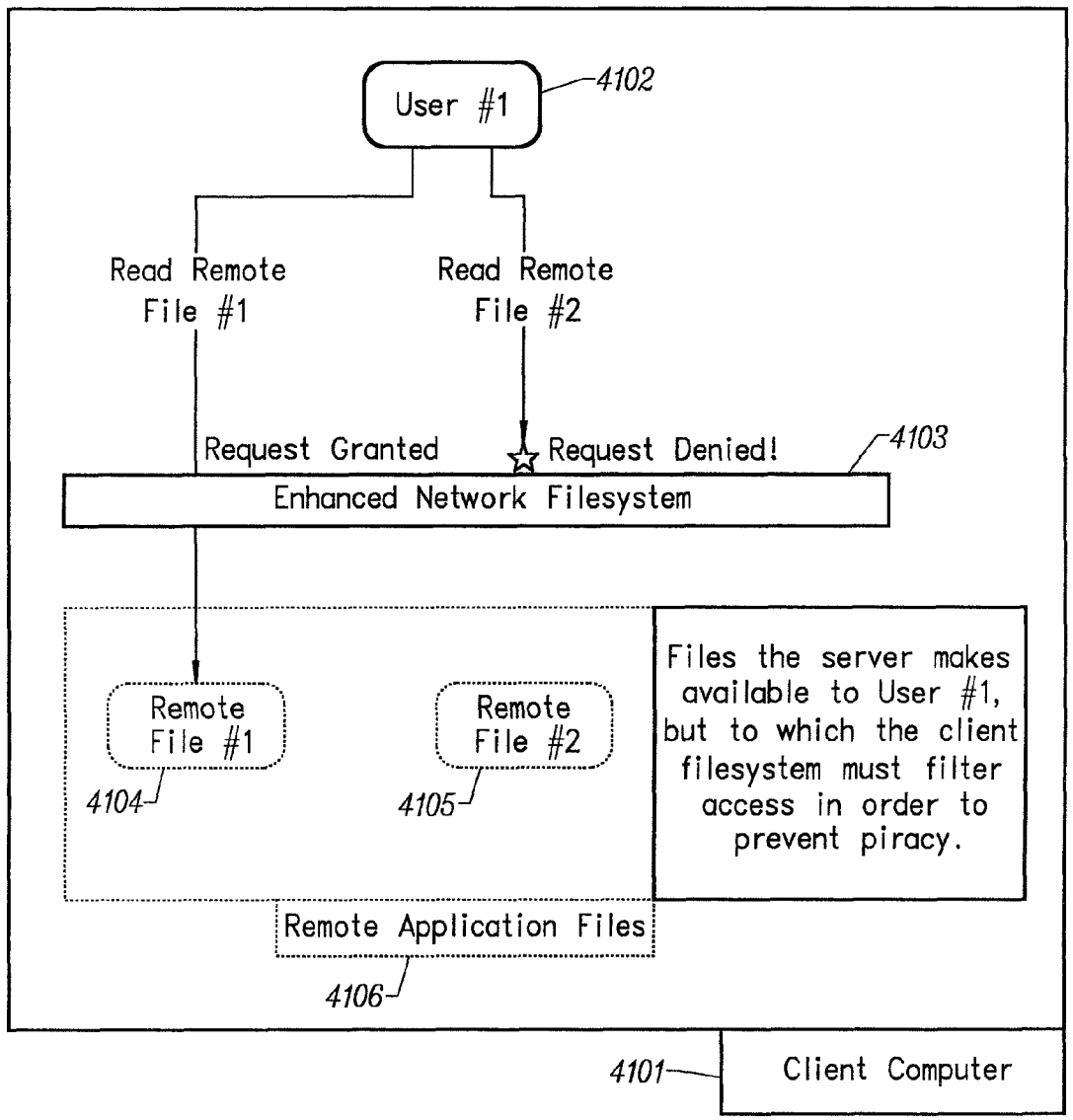
FIG. 41 is a block schematic diagram showing the filtering of accesses to remote application files according to the invention.

Referring to FIG. 41, the filtering of accesses to remote application files, illustrating New Technique #1, as described above is shown. (Note: the client computer represented here and in all subsequent figures is part of the same client-server system as in FIG. 40, but the server/ASP diagram has been omitted to save space.) A user 4102 who has been granted access to remotely served files 4106 representing an application is attempting to access these files. The local enhanced network filesystem 4103 is able to deny access to certain files 4105 and grant access to others 4104, for the purpose of protecting critical parts of the application from piracy.

Figure 42:
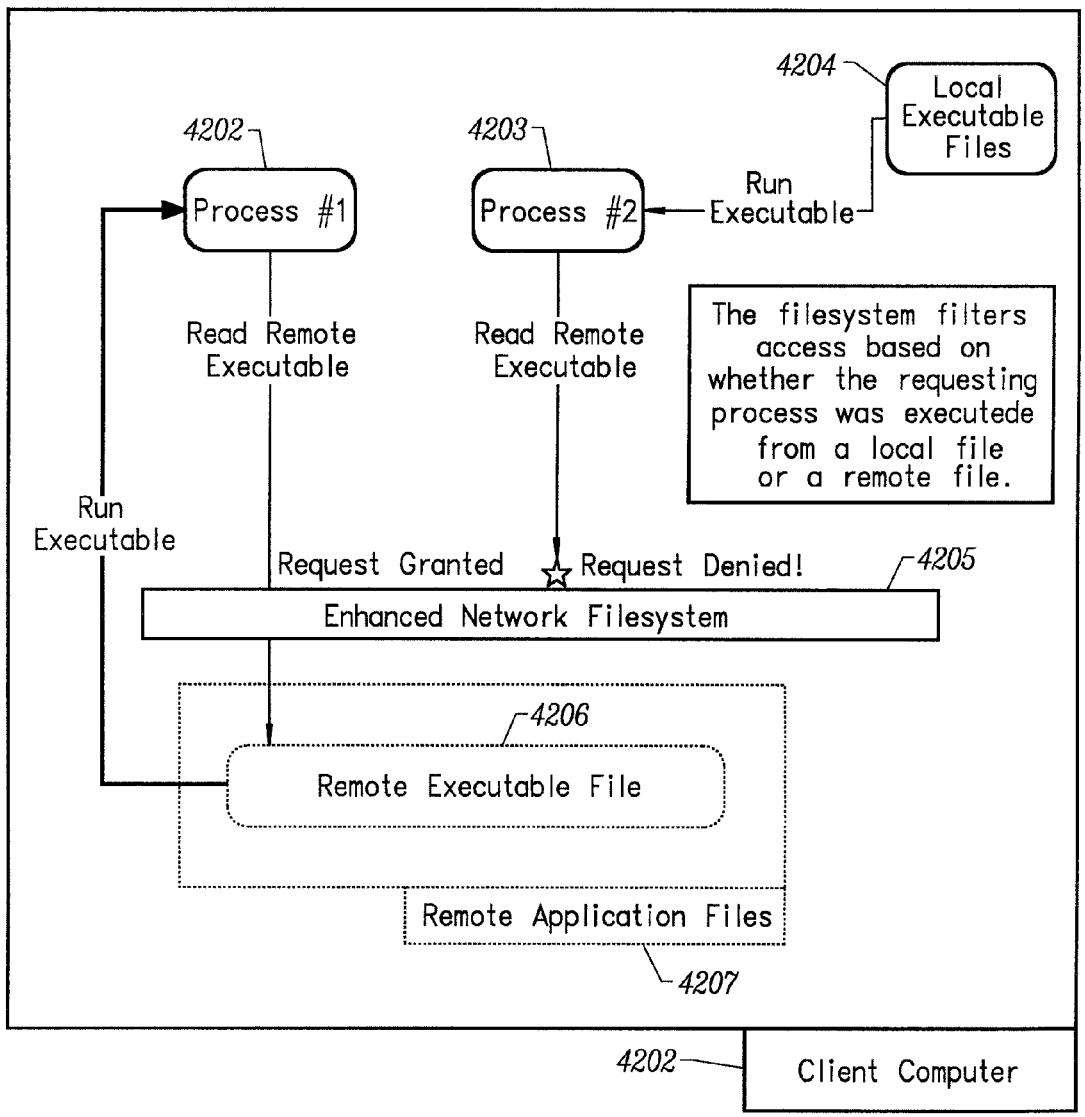
FIG. 42 is a block schematic diagram showing the filtering of accesses to remote files based on process code location according to the invention.

With respect to FIG. 42, the filtering of accesses to remote files based on process code location, illustrating New Technique #2, as described above, is shown. Here there are two processes on the client computer. Process #1 4202 has been run from an executable file 4206 that is part of a remotely served application 4207, and process #2 4203 has been run from a local executable file 4204. They are both attempting to access a remote data file 4206 that is part of the served application 4207. The local enhanced network filesystem 4205 is denying Process #2 4203 access and granting Process #1 4202 access because Process #2's 4203 executable is stored locally, and thus is not secure, while Process #1's 4202 executable is provided by the server 4207, and thus can be vouched for.

Referring to FIG. 43, the filtering of accesses to remote files based on targeted file section, illustrating New Technique #3, as described above, is shown. Here there is a single local process 4302 that is attempting to read from a remotely served executable file 4307. The enhanced network filesystem 4304 is denying an attempt to read from the code section 4306 of the file 4307 while granting an attempt to read from a non-code section 4305 of the file 4307. This is useful when access to some part of the file must be allowed, but access to other parts should be denied to prevent piracy of the entire file.

Figure 44:
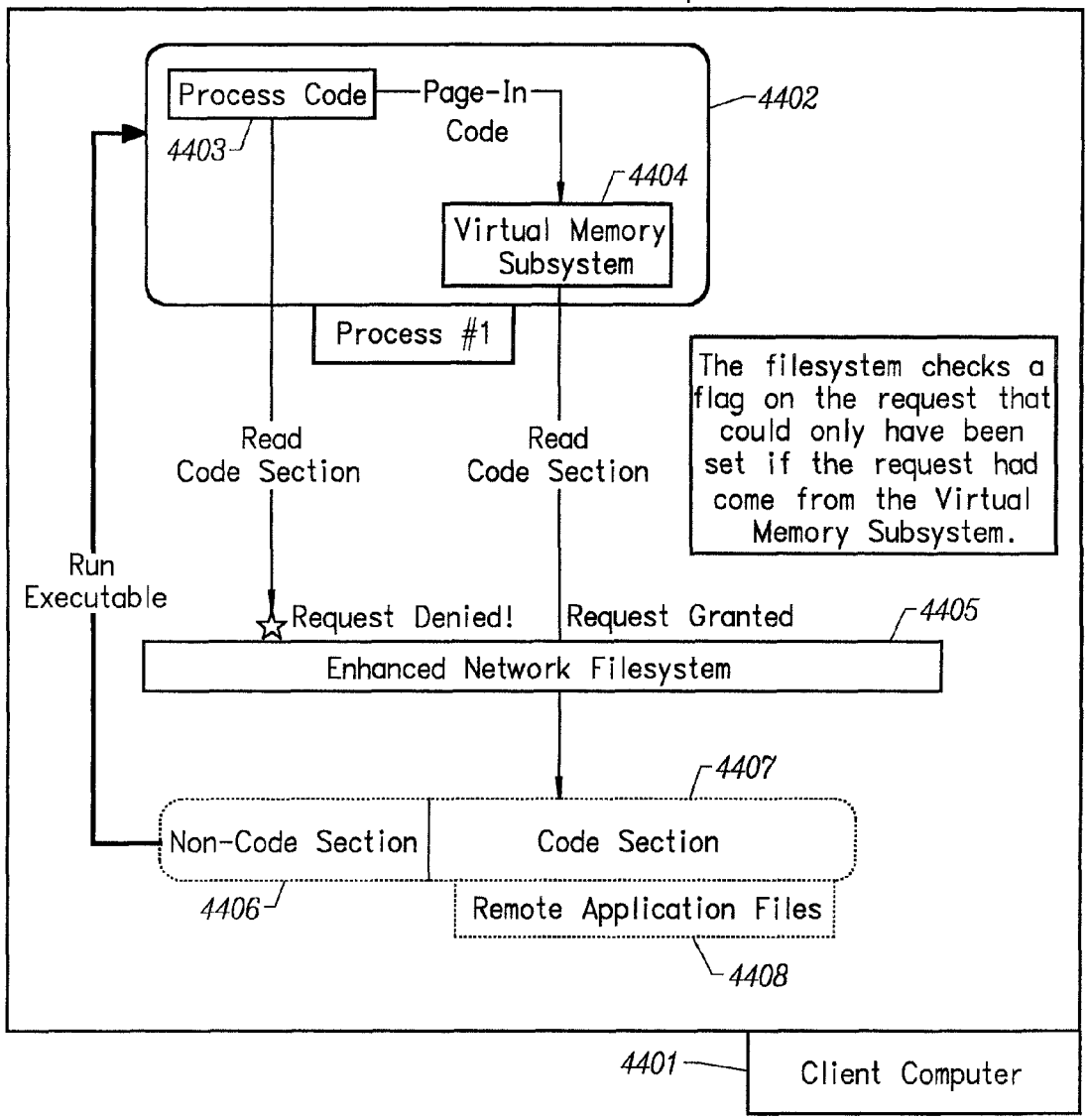
FIG. 44 is a block schematic diagram showing the filtering of accesses to remote files based on surmised purpose according to the invention.

With respect to FIG. 44, the filtering of accesses to remote files based on surmised purpose, illustrating New Technique #4 as described above, is shown. Here, two attempts to read from the code section 4407 of a remote executable file 4408 are being made from a process 4402 that was run from this file 4408. However, one request is denied because it originated 4406 from the process's code 4403 itself, while another is approved because it originated from code in the Virtual Memory Subsystem 4404. This prevents even a rogue remote process from attempting to pirate its own code, while allowing legitimate requests for the code to be completed.

Figure 45:
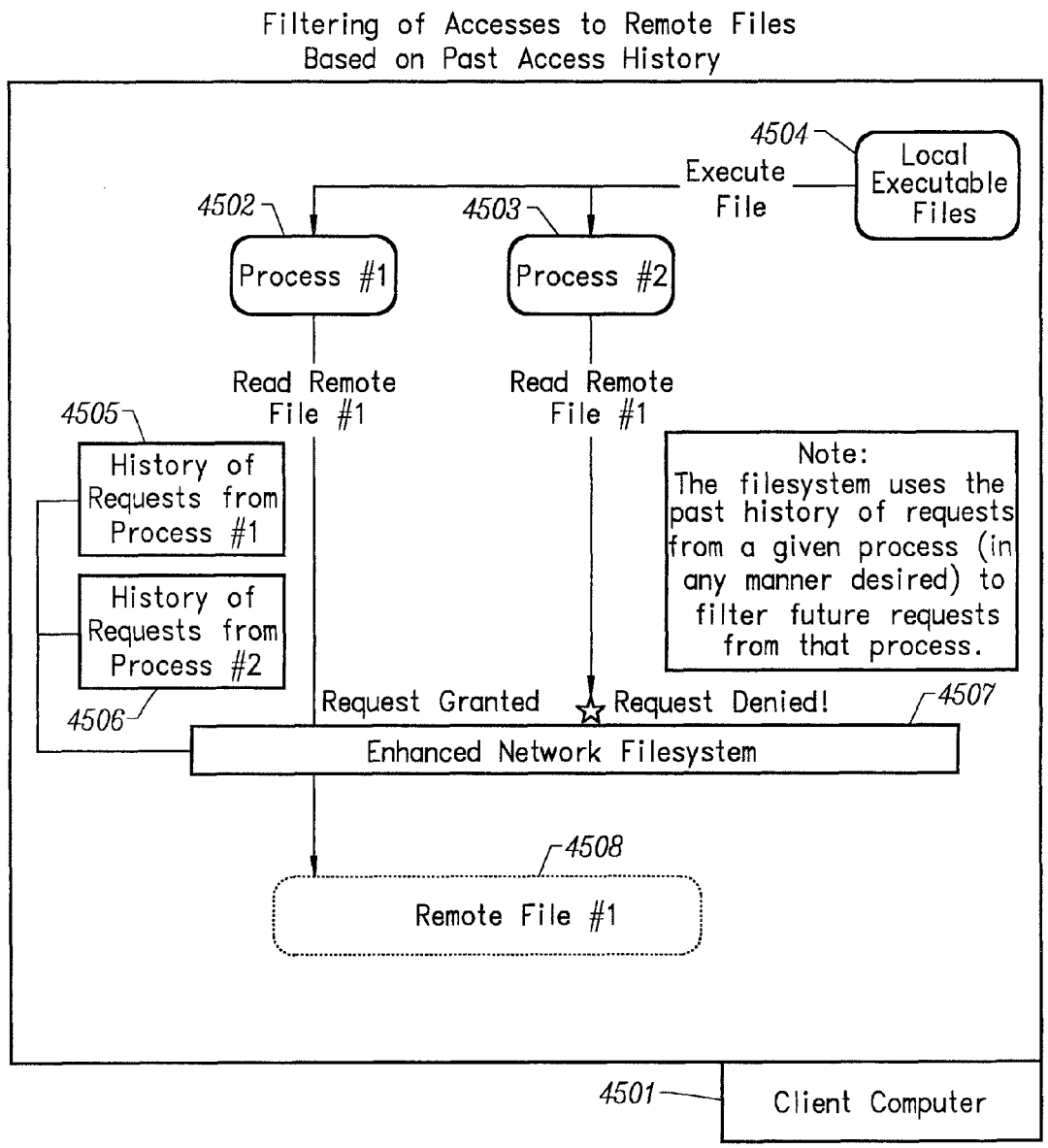
FIG. 45 is a block schematic diagram showing the filtering of accesses to remote files based on past access history according to the invention.

Referring to FIG. 45, the filtering of accesses to remote files based on past access history. illustrating New Technique #5 as described above, is shown. Here, two processes 4502, 4503 run from a local executable 4504 are attempting to access a remote file 4508. The enhanced network filesystem 4507 keeps around a history of previous file accesses by these processes 4505, 4506, which it consults to make decisions about permitting/denying further accesses. Process #1's 4502 access attempt is granted, while Process #2's 4503 is denied, because the filesystem 4507 detected a suspicious pattern in Process #2's 4503 previous access history 4506.

Anti-Piracy Details of the Invention

Five anti-piracy embodiments are disclosed below that can be used by an ASP-installed network filesystem to combat piracy of remotely served applications. The ASP installs a software component on the client that is able to take advantage of local knowledge, e.g., which process on the client originated a request for data, and permit or deny requests for remote files before sending the requests to the server. That is, a network filesystem is installed on the local user's computer that manages access to these remote files. All input/output requests to these files must pass through this filesystem, and if the filesystem determines that a given request is suspicious in some way, it has the freedom to deny it.

Anti-Piracy Embodiment #1

Client-side fine-grained filtering of file accesses directed at remotely served files, for anti-piracy purposes.

Referring again to FIG. 41, the approach of the first anti-piracy embodiment is that a software component 4102 executing locally on a client computer 4101 has available to it much more information about the state of this computer than does a server providing access to remote files. Thus, the server can filter access only on a much coarser level that can this client component. An ASP can take advantage of this by installing a network filesystem 4103 on the client computer that is designated to handle and forward all requests directed at files located on a given remote server. This filesystem 4103 examines each request, and either grants or denies it depending on whether the request is justifiable from a security perspective. It can use information such as the nature of the originating process, the history of previous access by the process, the section of the targeted file being requested, and so on, in order to make its decision.

The best way known of implementing this approach is to write a network redirector filesystem component 4103 for the operating system that the ASP's clients' machines will be running. This component will be installed, and will make visible to the system a path that represents the server on which the ASP's application files are stored. The local computer can now begin accessing these files, and the filesystem 4103 will be asked to handle requests for these files. On most operating systems, the filesystem 4103 will register dispatch routines to the system that handle common file operations such as open, read, write and close. When a local process 4102 makes a request of an ASP-served file, the OS calls one of these dispatch routines with the request. In the dispatch routine, the filesystem 4103 examines the request and decides whether to deny it or grant it. If granted, it will forward the request to the remote server and send back the response to the operating system.

Anti-Piracy Embodiment #2

Filtering of file accesses based on where the code for the process that originated the request is stored.

Referring again to FIG. 42, when a filesystem 4205 receives a request for access to a given file, the request always originates from a given process on the computer. By determining where the executable file that the process was run from is located, the network filesystem 4205 can make a more informed decision about the security risk associated with granting the request. For example, if the executable file 4204 is located on the local computer 4202, then it may contain any code whatsoever, code that may attempt to copy and store the contents of any remote files it can gain access to. The filesystem 4205 can reject requests from these processes as being too risky. However, if the executable file 4206 is being served by the ASP's remote server 4207, then the process can assume to be well-behaved, since it is under the control of the ASP. The filesystem 4205 can grant accesses that come from these processes 4202 in confidence that the security risks are minimal.

The best way known of implementing this approach is to modify a network filesystem 4205 to determine the identity of the process that originated a relevant open, read, or write request for a remote file. On some OSes a unique process ID is embedded in the request, and on others, a system call can be made to get this ID. Then, this ID must be used to look up the pathname of the executable file from which the process was run. To do this, upon initialization the filesystem 4205 must have registered a callback that is invoked whenever a new process is created. When this callback is invoked, the pathname to the process executable and the new process ID are provided as arguments, data which the filesystem 4205 then stores in a data structure. This data structure is consulted while servicing a file request, in order to match the process ID that originated the request with the process's executable. Then the root of the pathname of that executable is extracted. The root uniquely identifies the storage device or remote server that provides the file. If the root specifies an ASP server that is known to be secure, as opposed to a local storage device that is insecure, then the request can be safely granted.

Anti-Piracy Embodiment #3

Identification of crucial portions of served files and filtering file access depending on the portion targeted.

Referring again to FIG. 43, a served application usually consists of many files. In order to steal the application, a pirate would have to copy at least those files that store the code for the application's primary executable, and perhaps other files as well. This leads to the conclusion that some files are more important that others, and that some portions of some files are most important of all. Ordinarily, the best solution would be to deny access to the primary executable file and its associated executables in its entirety, but this is not usually possible. In order to initially run the application, the filesystem 4304 must grant unrestricted access to some portions of the primary executable. In order to prevent piracy, the filesystem 4304 can grant access selectively to just those portions that are needed. Additionally, the running application 4302 itself does not usually need to read its own code section, but does need to read other sections for purposes such as resource loading. Therefore, additional security can be introduced by denying access to the code sections 4306 of ASP-served executables 4307 even to those executables themselves.

To implement this, modify a network filesystem's 4304 open file dispatch routine to detect when a remotely served executable 4307 is being opened. When this is detected, the executable file 4307 is examined to determine the offset and length of its code section 4306, and this information is stored in a data structure. On most OSes, executable files contain headers from which this information can be easily read. In the read and write dispatch routines, the network filesystem 4304 checks if the request is for a remote executable 4307, and if so, the offset and length of the code section 4306 of this executable 4307 is read from the data structure in which it was previously stored. Then the offset and length of the request are checked to see if they intersect the code section 4306 of this executable 4307. If so, the request can be denied.

Anti-Piracy Embodiment #4

Filtering of file accesses based on the surmised purpose of the file access, as determined by examining the program stack or flags associated with the request.

Referring again to FIG. 44, the approach of the fourth embodiment is that identical requests from the same process for a remotely served file can be distinguished based on the reason the request was issued. For example, on a computer with a virtual memory subsystem 4404, the VMS's own code will be invoked to page-in code for a process that attempts to execute code in pages that are not currently present. To do this, the VMS 4404 must issue a read request to the filesystem 4405 that handles the process' 4402 executable file 4408. Since this request is not for any ulterior purpose, such as piracy, and is necessary for the application to execute, the request should be granted. If the filesystem 4405 gets the originating process ID for such requests, the process whose code is being paged in will be known. However, this same process ID will also be returned for requests that originate as a result of an attempt by the process itself to read its own code (perhaps for the purpose of piracy). Many applications have loopholes that allow the user to execute a macro, for example, that reads and writes arbitrary files. If the filesystem 4405 simply filters requests based on process IDs, it will mistakenly allow users to pirate remotely served applications, as long as they can send the necessary reads and writes from within the remote application itself.

However, even if the process IDs are the same for two apparently identical requests, there are ways the filesystem 4405 can distinguish them. There are two known ways to do this in a manner relevant to combating anti-piracy. The way to implement the first method is to have the filesystem 4405, upon receiving a read request, check for the presence of the paging I/O flag that is supported by several operating systems. If this flag is not present, then the request did not come from the VMS 4404, but from the process itself 4403, and thus the request is risky and not apparently necessary for the application to run. If the flag is present though, the request almost certainly originated from the VMS 4404 for the purpose of reading in code to allow the process to execute. The request should be allowed.

Another way to make this same determination is to have the filesystem 4405 examine the program stack upon receiving a read request. In several operating systems, a process will attempt to execute code that resides in a virtual page regardless of whether the page is present or not. If the page is not present, a page fault occurs, and a structure is placed onto the stack that holds information about the processor's current state. Then the VMS 4404 gets control. The VMS 4404 then calls the read routine of the filesystem 4405 that handles the process's executable file to read this code into memory. The filesystem 4405 now reads backwards up the stack up to a certain point, searching for the presence of the structure that is placed on the stack as a result of a page fault. If such a structure is found, the execution pointer register stored in the structure is examined. If the pointer is a memory address within the boundary of the virtual memory page that is being paged in, then the filesystem 4405 knows the read request is legitimate.

Anti-Piracy Embodiment #5

Filtering of file accesses based on the surmised purpose of the file access, as determined by examining a history of previous file accesses by the same process.

Referring again to FIG. 45, if one looks at the series of file requests that are typically made as a result of attempting to copy an executable file, as opposed to those made in the course of executing that file, one can see certain patterns. The copy pattern is usually a sequence of sequentially ordered read requests, while the execution pattern tends to jump around a lot (as the result of code branches into non-present pages). A filesystem can be enhanced to keep around a history of requests made by specific processes on remotely served files. Then, for every subsequent request to such a file, the history for the originating process can be examined to check for certain patterns. If a file-copy pattern is seen, then the pirate may be attempting to steal the file, and the request should be denied. If an execution type pattern is seen, then the user is simply trying to run the application, and the request should be granted.

To implement this, a filesystem 4507 will tell the operating system, via an operating system call, upon initialization, to call it back whenever a new process is created. When it is called back, the filesystem 4507 will create a new data structure for the process that will store file access histories 4505, 4506. Then, in its read-file dispatch routines, the filesystem 4507 will determine the process ID of the originating process, and examine the process's access history 4505, 4506. It will only examine entries in that history 4505, 4506 that refer to the file currently being requested. It will then run a heuristic algorithm that tries to determine if the pattern of accesses more closely resembles an attempted file copy than code execution. An effective algorithm is to simply see if the past n read requests to this file have been sequential, where n is some constant. If so, then the request is denied. If not, then the request is granted. In either case, an entry is made to the filesystem's process access history 4505, 4506 that records the file name, offset, and length of the request made by that process to this file.

CONCLUSION

Although the present invention has been described using particular illustrative embodiments, it will be understood that many variations in construction, arrangement and use are possible within the scope of this invention. Other embodiments may use different network protocols, different programming techniques, or different heuristics, in each component block of the invention. Specific examples of variations include:

The proxy used in Proxy Caching could be anywhere in the Internet along the network path between a Client and the Server; and Concurrent Requesting and Smart Requesting can be implemented in hardware instead of software.

A number of insubstantial variations are possible in the implementation of anti-piracy features of the invention. For example, instead of modifying the filesystem proper to provide anti-piracy features, a network proxy component can be placed on the client computer to filter network requests made by a conventional local network filesystem. These requests generally correspond to requests for remote files made to the filesystem by a local process, and the type of filtering taught by the present invention can be performed on these requests. A filesystem filter component can also be written to implement these methods, instead of modifying the filesystem itself.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising:
receiving, by a server system including a plurality of application service providers' servers, a request to stream a program from the server system to a client system;
performing load balancing across the server system, further comprising:
maintaining a server list that includes the plurality of application service providers' servers ordered according to response times of the plurality of application service providers' servers for fulfilling responses to client requests;
sending the server list to the client system, the server list used by the client system to determine to which of the plurality of application service providers' servers to send requests;
receiving, by at least one application service provider's server of the plurality of application service providers' servers based on the server list, a plurality of requests, generated by the client system, to retrieve a plurality of program page segments of the program that are stored on the plurality of application service providers' servers, the plurality of requests forming a pattern of page segment requests;
retrieving the plurality of program page segments;
sending the plurality of program page segments to the client system;
retrieving, based on the pattern of page segment requests, a specific program page segment, stored on the at least one application service provider's server of the plurality of application service providers' servers, to be sent to the client system.

2. The method of claim 1, wherein the specific program page segment is further retrieved based on program locality or program history.

3. The method of claim 1, further comprising:
generating, by the client system, a request to retrieve the specific program page segment based on the pattern of page segment requests;
retrieving the specific program page segment based on the request to retrieve the specific program page segment.

4. The method of claim 3, wherein the client system receives the pattern of page segment requests from the server system.

5. The method of claim 1, further comprising:
generating, by the server system, information of the specific program page segment to retrieve based on the pattern of page segment requests;
retrieving the specific program page segment based on the information of the specific program page segment.

6. The method of claim 1, wherein the specific program page segment is further retrieved based on fetching patterns of the client system in receiving previously streamed programs.

7. The method of claim 1, further comprising determining, by the server system, based on the pattern of page segment requests, whether the client system is copying an executable file of the program or executing the executable file of the program.

8. The method of claim 7, further comprising avoiding sending the specific program page segment to the client system when it is determined that the client system is copying the executable file.

9. The method of claim 1, further comprising:
determining whether a cache of the client system contains the specific program page segment;
avoiding sending the specific program page segment to the client system, when the cache of the client system contains the specific program page segment.

10. A system comprising:
a server side monitor configured to perform load balancing across a plurality of application service providers' servers by maintaining a server list that includes the plurality of application service providers' servers ordered according to response times of the plurality of application service providers' servers for fulfilling responses to client requests, the server list used by a client system to determine to which of the plurality of application service providers' servers to send requests;
a server system, including the plurality of application service providers' servers, configured to:

send the server list to the client system, the server list used by the client system to determine to which of the plurality of application service providers' servers to send requests;

receive from the client system, according to the server list, a plurality of requests to retrieve a plurality of program page segments of a program stored on the plurality of application service providers' servers, the plurality of requests forming a pattern of page segment requests;

retrieve the plurality of program page segments;

send the plurality of program page segments to the client system;

retrieve, based on the pattern of page segment requests, a specific program page segment, stored on at least one application service provider's server of the plurality of application service providers' servers, to be sent to the client system.

11. The system of claim 10, wherein the server system is further configured to retrieve the specific program page segment based on program locality or program history.

12. The system of claim 10, wherein:

the client system is further configured to generate a request to retrieve the specific program page segment based on the pattern of page segment requests:

the server system is further configured to retrieve the specific program page segment based on the request to retrieve the specific program page segment that is generated by the client system.

13. The system of claim 12, wherein the client system receives the pattern of page segment requests from the server system.

14. The system of claim 10, wherein the server system is further configured to:

generate information of the specific program page segment to retrieve based on the pattern of page segment requests;

retrieve the specific program page segment based on the information of the specific program page segment.

15. The system of claim 10, wherein the server system is further configured to retrieve the specific program page segment based on fetching patterns of the client system in receiving previously streamed programs.

16. The system of claim 10, wherein the server system is further configured to determine whether the client system is copying an executable file of the program or executing the executable file of the program, based on the pattern of page segment requests.

17. The system of claim 16, wherein the server system is further configured to avoid sending the specific program page segment to the client system when it is determined that the client system is copying the executable file.

18. The system of claim 10, wherein the server system is further configured to:

determine whether a cache of the client system contains the specific program page segment;

avoid sending the specific program page segment to the client system, when the cache of the client system contains the specific program page segment.

19. A system comprising:

means for receiving a request to stream a program from a server system, including a plurality of application service providers' servers, to a client system;

means for performing load balancing across the server system, further comprising:

means for maintaining a server list that includes the plurality of application service providers' servers ordered according to response times of the plurality of application service providers' servers for fulfilling responses to client requests;

means for sending the server list to the client system, the server list used by the client system to determine to which of the plurality of application service providers' servers to send requests;

means for receiving, by at least one application service provider's server of the plurality of application service providers' servers based on the server list, a plurality of requests, generated by the client system, to retrieve a plurality of program page segments of the program that are stored on the plurality of application service providers' servers, the plurality of requests forming a pattern of page segment requests;

means for retrieving the plurality of program page segments;

means for sending the plurality of program page segments to the client system;

means for retrieving, based on the pattern of page segment requests, a specific program page segment, stored on the at least one application service provider's server of the plurality of application service providers' servers, to be sent to the client system.

* * * * *